United States Patent
Ouali

(10) Patent No.: US 10,324,690 B2
(45) Date of Patent: *Jun. 18, 2019

(54) AUTOMATED ENTERPRISE SOFTWARE DEVELOPMENT

(71) Applicant: Vermeg Services SARL, Tunis (TN)

(72) Inventor: Badreddine Ouali, Carthage (TN)

(73) Assignee: Vermeg Services SARL, Tunis (TN)

( * ) Notice: Subject to any disclaimer, the term of this patent is extended or adjusted under 35 U.S.C. 154(b) by 34 days.

This patent is subject to a terminal disclaimer.

(21) Appl. No.: 15/675,238

(22) Filed: Aug. 11, 2017

(65) Prior Publication Data

US 2018/0024814 A1    Jan. 25, 2018

Related U.S. Application Data

(63) Continuation of application No. 13/955,362, filed on Jul. 31, 2013, now Pat. No. 9,823,900, which is a continuation of application No. 12/839,243, filed on Jul. 19, 2010, now abandoned.

(60) Provisional application No. 61/251,420, filed on Oct. 14, 2009.

(51) Int. Cl.
| | | |
|---|---|---|
| G06F 9/44 | (2018.01) |
| G06F 8/20 | (2018.01) |
| G06F 8/10 | (2018.01) |
| G06F 8/35 | (2018.01) |
| G06F 11/36 | (2006.01) |
| G06F 8/36 | (2018.01) |

(52) U.S. Cl.
CPC .......... *G06F 8/20* (2013.01); *G06F 8/10* (2013.01); *G06F 8/35* (2013.01); *G06F 11/36* (2013.01); *G06F 8/36* (2013.01)

(58) Field of Classification Search
CPC ........................................ G06F 9/44
USPC ................. 717/104–105, 106, 112
See application file for complete search history.

(56) References Cited

U.S. PATENT DOCUMENTS

| | | |
|---|---|---|
| 6,018,627 A | 1/2000 | Iyengar et al. |
| 6,557,100 B1 | 4/2003 | Knutson |
| 7,032,180 B2 | 4/2006 | Wilkinson et al. |
| 7,085,928 B1 | 8/2006 | Schmid et al. |
| 8,209,657 B1 | 6/2012 | Sawyer et al. |
| 2001/0017632 A1 | 8/2001 | Goren-Bar |
| 2002/0010909 A1 | 1/2002 | Charisius et al. |

(Continued)

FOREIGN PATENT DOCUMENTS

WO    02/37261 A2    5/2002

OTHER PUBLICATIONS

Dupuy-Chessa et al ("Validation of UML models thanks to Z and Lustre"), Mar. 16, 2001 (Year: 2001).*

(Continued)

*Primary Examiner* — Jae U Jeon

(57) ABSTRACT

The preferred embodiment provides a system and method for automatically generating enterprise software applications with minimal level of manual coding. The preferred embodiment provide a graphical design tool that models an application using Unified Model Language (UML), validate the UML model, and automatically generate deployable application The preferred embodiment also provides a framework of libraries that the target application ca be build from.

8 Claims, 42 Drawing Sheets

(56) References Cited

U.S. PATENT DOCUMENTS

| | | | |
|---|---|---|---|
| 2002/0103869 A1* | 8/2002 | Goatly | G06Q 10/10 |
| | | | 709/206 |
| 2003/0233631 A1 | 12/2003 | Curry et al. | |
| 2004/0078777 A1 | 4/2004 | Bahrami | |
| 2005/0071805 A1 | 3/2005 | Lauterbach et al. | |
| 2005/0261884 A1 | 11/2005 | Sakamoto et al. | |
| 2006/0236289 A1* | 10/2006 | Zhu | G06F 17/50 |
| | | | 716/139 |
| 2008/0295068 A1 | 11/2008 | Kendall et al. | |
| 2009/0132562 A1* | 5/2009 | Mehr | G06F 8/10 |
| 2010/0138808 A1 | 6/2010 | Kim et al. | |
| 2011/0088011 A1 | 4/2011 | Ouali | |
| 2011/0270595 A1 | 11/2011 | Salehi et al. | |

OTHER PUBLICATIONS

Beek ("Detecting policy conflicts by model checking UML state machines"), Jan. 2009 (Year: 2009).*

Dupuy-Chessa, S. et al. (Mar. 2001). "Validation of UML Models Thanks to Z and Lustre"; 17 pages.

Brambilla, M. et al. (Jun. 2009). "An Online Platform for Semantic Validation of UML Models"; 4 pages.

Intellectual Property Office of Singapore Examination Report for Corresponding Application No. 201202720-7 dated Aug. 10, 2014; 6 pages.

International Search Report and Written Opinion dated Nov. 18, 2010, directed to International Application No. PCT/IB2010/002037; 9 pages.

Ober, L. et al. (Apr. 2006). "Validating Time UML Models by Simulation and Verification"; 18 pages.

Office Action dated May 16, 2017, directed to Canadian Patent Application No. 2,777,443; 5 pages.

Omaghi, M. et al. (Sep. 2009). "Applying ASP to UML Model Validation"; 7 pages.

Ter Beek, M. H. et al. (Jan. 2009). "Detecting Policy Conflicts by Model Checking UML State Machines"; 16 pages.

* cited by examiner

FIG. 18

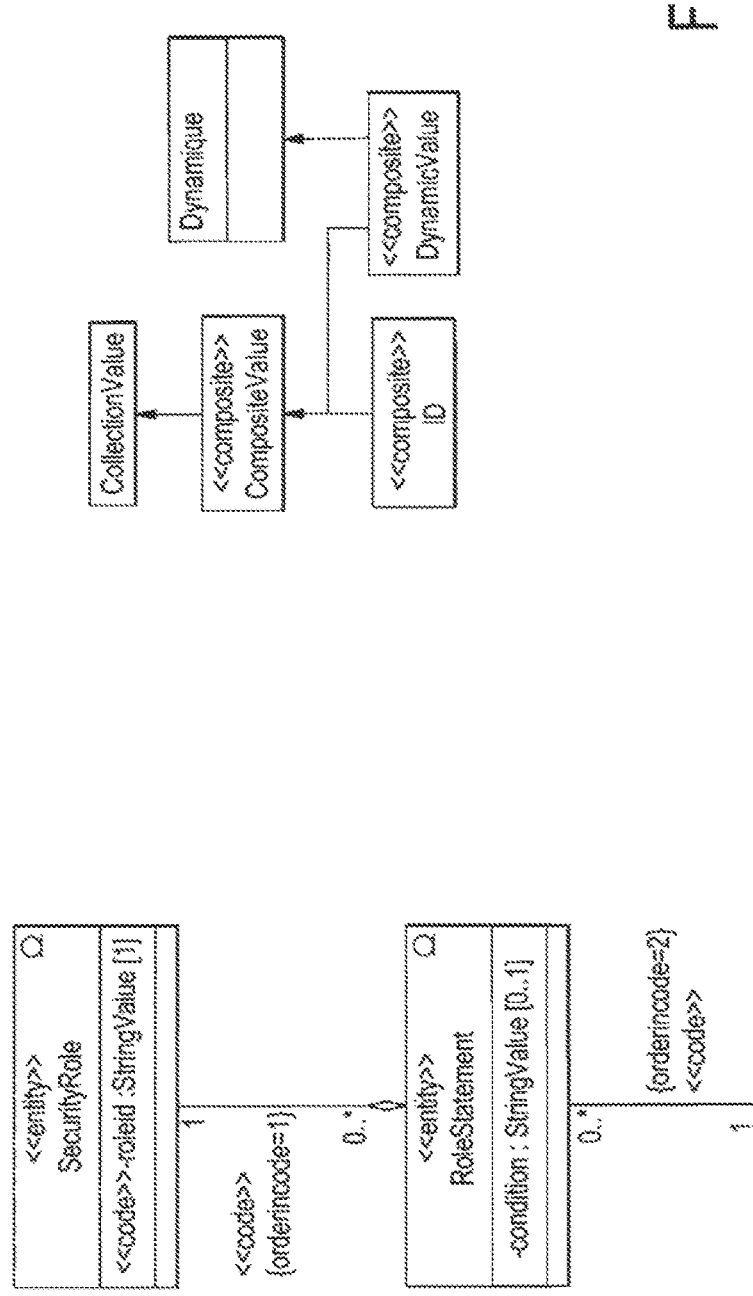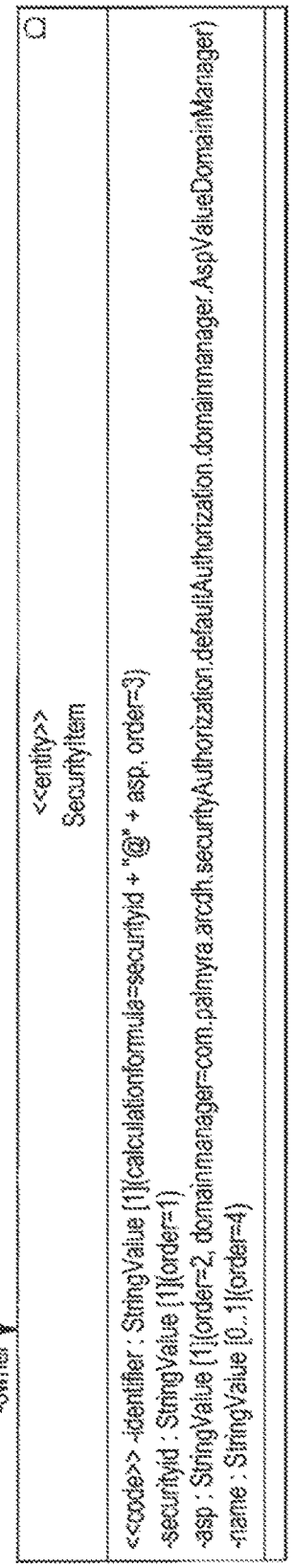

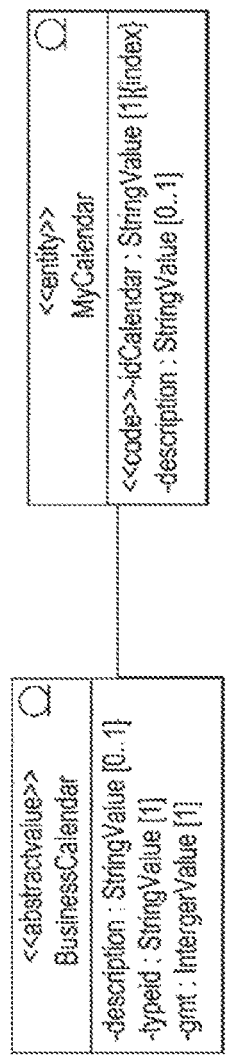
FIG. 47A
F1: SCHEDULER PART OF A PALMYRA APPLICATION UML MODEL
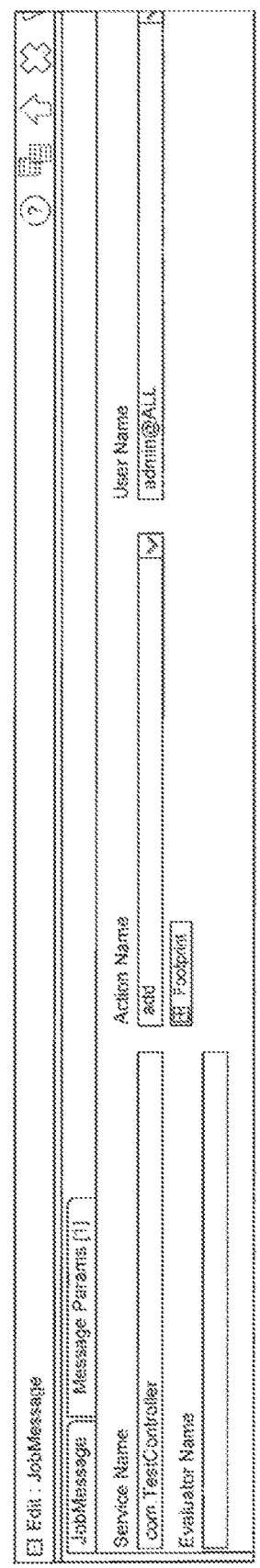
FIG. 47B

```
Dec 9, 2009 3:07:28 PM  IMegaAccounting-[palmyra Scheduler Thread];megara:Scheduler:The
work jobs list size is [1]
Dec 9, 2009 3:07:28 PM  IMegaAccounting-[Palmyra Scheduler Thread];megara:Scheduler:First job
in the registered jobs is [COD_Impact_Reimpact comptable], validate date [09/12/2009
13:00:00:000], old date [null], is phantom [false], is executable [false]
Dec 9, 2009 3:07:28 PM  IMegaAccounting-[Palmyra Scheduler
Thread];megara:Scheduler:Handling registered job ... [COD_Impact_Reimpact comptable], validate
date [09/12/2009 13:00:00:000], status [Executing], new validate date [09/12/2009 18:35:00:000],
new status [Executing]
Dec 9, 2009 3:07:28 PM  IMegaAccounting-[palmyra Scheduler Thread];megara:Scheduler:The
work jobs list size is [1]
Dec 9, 2009 3:07:28 PM  IMegaAccounting-[Palmyra Scheduler Thread];megara:Scheduler:First job
in the registered jobs is [COD_Impact_Reimpact comptable], validate date [09/12/2009
18:35:00:000], old date [null], is phantom [false], is executable [true]
Dec 9, 2009 3:07:28 PM  IMegaAccounting-[Palmyra Scheduler Thread];megara:Scheduler:The
scheduler [PalmyraScheduler]is waiting for [12451167] milliseconds to [09/12/2009 18:35:00:000]
Dec 9, 2009 3:39:10 PM  IMegaAccounting-[Palmyra Scheduler Thread];megara:Scheduler:The
scheduler [Palmyra Scheduler] is notified at date [09/12/2009 15:39:10:369]

Dec 9, 2009 3:39:10 PM  IMegaAccounting-[Palmyra Work Jobs Loader
Thread];megara:Scheduler:Palmyra Work Jobs Loader Thread : notified at [09/12/2009
15:39:10:369], end date [09/12/2009 17:02:18:280]
Dec 9, 2009 3:39:10 PM  IMegaAccounting-[Palmyra Work Jobs Loader
Thread];megara:Scheduler:Palmyra Work Jobs Loader Thread : stopped at [09/12/2009
15:39:10:369]
```

FIG. 52

AUTOMATED ENTERPRISE SOFTWARE DEVELOPMENT

RELATED APPLICATIONS

This application is a continuation application of U.S. application Ser. No. 13/955,362 filed on Jul. 31, 2013, which is a continuation of U.S. application Ser. No. 12/839,243, filed Jul. 19, 2010, entitled Automated Enterprise Software Development; which application claims benefit of priority of U.S. Provisional Patent Application No. 61/251,420, filed Oct. 14, 2009. The above-identified related applications are incorporated herein by reference.

FIELD OF THE INVENTION

This invention relates generally to methods and systems for automated enterprise software development. Specifically, it relates to methods and systems for automating computer software development process in connection with graphical modeling approaches.

BACKGROUND OF THE INVENTION

Business enterprises rely on increasingly sophisticated software to manage their internal operation and provide goods and services to their clients and customers. The development, deployment, maintenance, and updating of enterprise level software has become essential to carry out almost all business processes.

Traditionally, software development involves extensive manual coding and testing. As software complexity increases, this traditional manual approach is not ideal. Enterprise software applications are usually comprised of— millions of lines of computer code and have traditionally required teams of programmers and several years to create, test, and debug. To implement a system, a programmer must face a chore of repetitive coding. The software code generated by this manual method is prone to contain error, and manual testing may be inadequate to cover all possible user scenarios. The resulting software product may contain latent bugs that cause disruption of services and great economic losses.

Model-Based Development (MBD) methodologies have emerged that shift the focus of the software development process. Modeling happens in the software application process before coding. A model serves as blueprints in software development. A carefully constructed model can help those responsible for a software development project's success to assure that business functionality is complete and correct, end-user needs are met, and program design supports requirements for scalability, robustness, security, extensibility, and other characteristics, before implementation in code. Implementation in code after the fact of design usually renders making changes difficult and expensive. MBD allows verification of the software specification at the model level and reduces the amount of manual coding. Modeling tools also make it possible to visualize a design and compare it against the design requirement.

The Unified Modeling Language (UML) is a graphical language for visualizing, specifying, constructing, and documenting the artifacts of a software-intensive system. The UML offers a standard way to write a system's blueprints, including conceptual things such as business processes and system functions as well as concrete things such as programming language statements, database schemas, and reusable software components. TABLE 1 presents a list of standard UML elements.

TABLE 1

STANDARD UML ELEMENTS

| Element | Properties | Standard UML Stereotype |
|---|---|---|
| Package | Name | |
| Interface | Name | Abstract |
| Class | Name | Abstract |
| Attribute | Name | Final |
| | Type | |
| | Initial value | |
| | Multiplicity | |
| Method | Name | |
| | Parameters | |
| | Return type | |
| Relation: Realization | Realized Interface | |
| Relation: Inheritance | Inherited Class (Super Class) | |
| Relation | Type: Simple/ Aggregation/ Composition | |
| | Role | |
| | Symmetric Role | |
| | Cardinality | |
| | Navigability | |

Automatic code generation (ACG), but not application generation, has also become available to the enterprise software development process. ACG gives an engineer the opportunity to focus on the high-level design issues and on better understanding of the business process. ACG can bring enterprise software to market faster, but cannot pull the entire application together with all its necessary parts such as the interface and data components with the processing components. The ACG process usually comprises an automated code generator that reads meta-data for a specific set of designed patterns and generates software code in a specified programming language. An automatic code generator may also be used to capture knowledge and business rules for enterprise software applications and generate the millions of lines of codes in a short amount of time in any desired computer language and for any platform. The process of ACG makes a software development project more agile. A change in implementation can be treated as a different rendering of the same meta-data. Once a portion of the source code is generated, a programmer is then free to fill in the gaps that are left by the code generator, and to concentrate on the parts of the system that matter. This improves development speed and reliability via code generation process.

Service Oriented Architecture (SOA) is an architectural approach for constructing complex software-intensive systems from a set of universally interconnected and interdependent building blocks. SOA is used to build applications out of software services. Services are intrinsically unassociated units of functionality, which have no call to another service embedded within them. These software services typically implement functionalities a human would recognize as a service, such as filling out an online application for an account or viewing an online bank statement. Instead of having services with embedded calls to each other in their source code, SOA defines protocols which describe how one or more services can communicate with each other. A flexible, standardized architecture is required to better support the connection of various applications and the sharing of data. SOA unifies business processes by structuring large applications as an ad hoc collection of smaller modules called services. These applications can be used by different groups of people both inside and outside the company, and new applications built from a mix of these services from the global pool exhibit flexibility and uniformity. Building all applications from the same pool of services makes achieving this goal much easier and more deployable for affiliate companies. This architecture can help business respond more quickly and cost-effectively to changing conditions and it promotes reuse at macro level service level rather than micro class level.

It would be beneficial and desirable to have a streamlined enterprise software development tool that incorporates portions of these past methods to provide a graphical modeling and design tool, automate most or all of the coding, and has a framework of reusable components and services that facilitates the generation of custom enterprise applications. Currently, there is no known process for automatically producing a software application that designs, generates, and integrates all the elements of an executable application. For example, there are products that may create a design outline for an executable application, but will not then create the elements specified in the design, such as the user interface, persistence (database design, data storage and data transfer) and processing steps to name a few. The current invention accomplishes this desired need, of design, generation, integration and production in one system, which need has not been provided in prior systems.

SUMMARY OF THE INVENTION

It is therefore an object of the invention to provide such a tool, to achieve the above and other objects, the present invention presents a method for generating a software application which comprises the steps of: modeling a business process in a graphical design tool; creating at least one UML model to formalize the described processes by using one or more state diagrams to represent the modeled business processes, and one or more class diagrams to represent data models and to represent predetermined business rules that are applied to the described business processes; validating at least one UML model by detecting syntax errors using a predetermined syntax, in order to validate either at least one state diagram or class diagram, or combination thereof; and transforming at least one validated UML model into metadata that is used to generate functional and non-functional aspects of the software application.

In one aspect of the present invention, the transforming step includes generating the software application.

In another aspect of the present invention, the generated software application is combined with pre-existing libraries.

In another aspect of the present invention, the generated software application is combined with manually written code.

In another aspect of the present invention, the metadata includes one or more application code, or constraint models, or automate files, or documentation, or some combination thereof.

In another aspect of the present invention, the generated application includes a predefined set of functional requirements.

In another aspect of the present invention, the generated application includes a predefined set of non-functional requirements.

In another aspect of the present invention, the predefined set of non functional requirements includes security management, or load balancing, or transaction management, or user interfaces, or a skeleton to build the algorithms on, or some combination thereof.

In another aspect of the present invention, the generating step includes adding manually written code to the generated application.

In another aspect of the present invention, the method further includes the step of deploying the target application by means of a deployment tool 490.

BRIEF DESCRIPTION OF THE DRAWINGS

A preferred embodiment will be set forth in detail with reference to the drawings, in which:

FIG. 18 illustrates an example of the user interface of the Menu Editor Tool;

FIG. 22C illustrates an exemplary SecurityItem's Roles UML Model;

FIG. 34A illustrates the subclasses of the CompositeValue class;

Figures 47C, 47D, 47E:
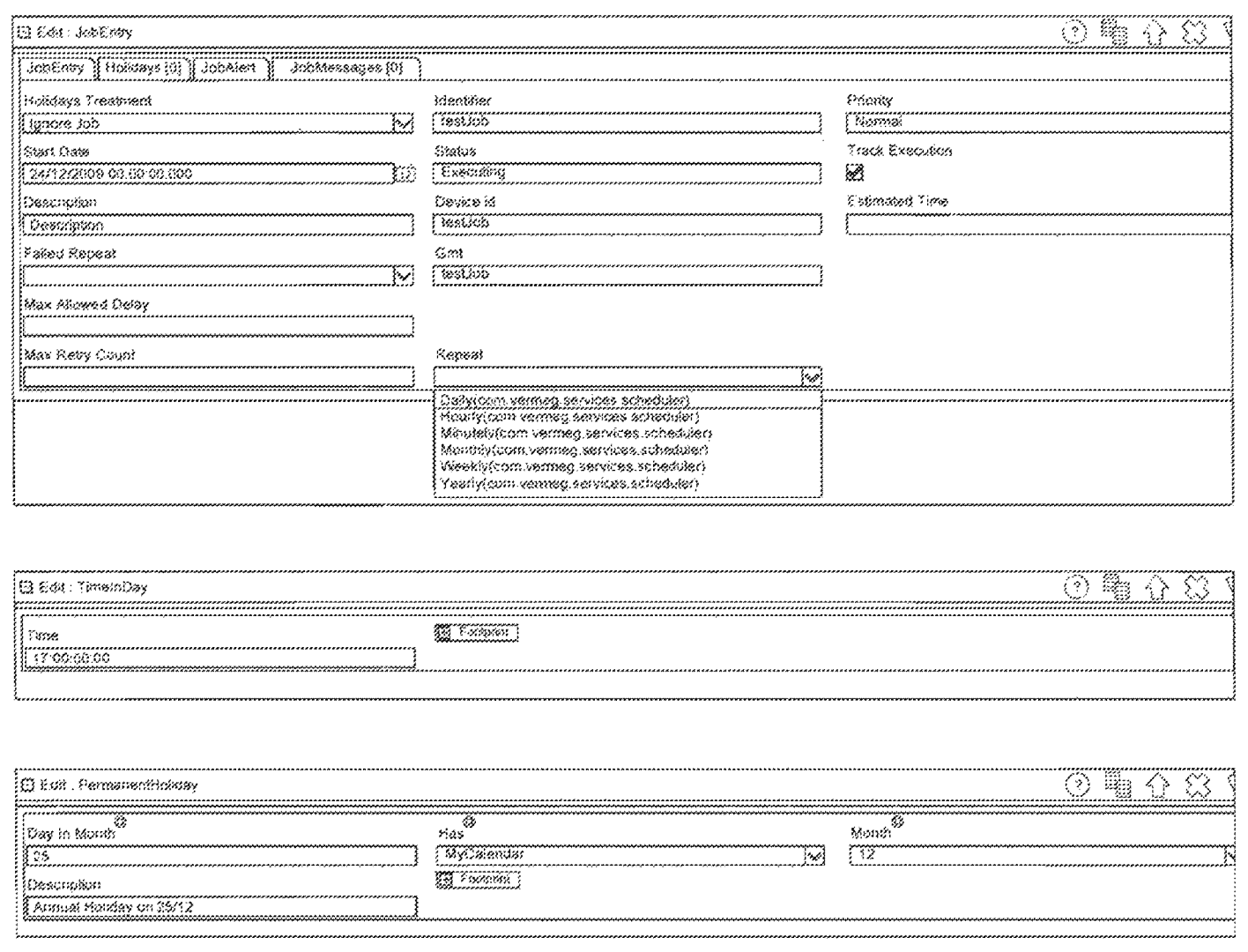
Figures 47F, 47G, 47H, 47I:
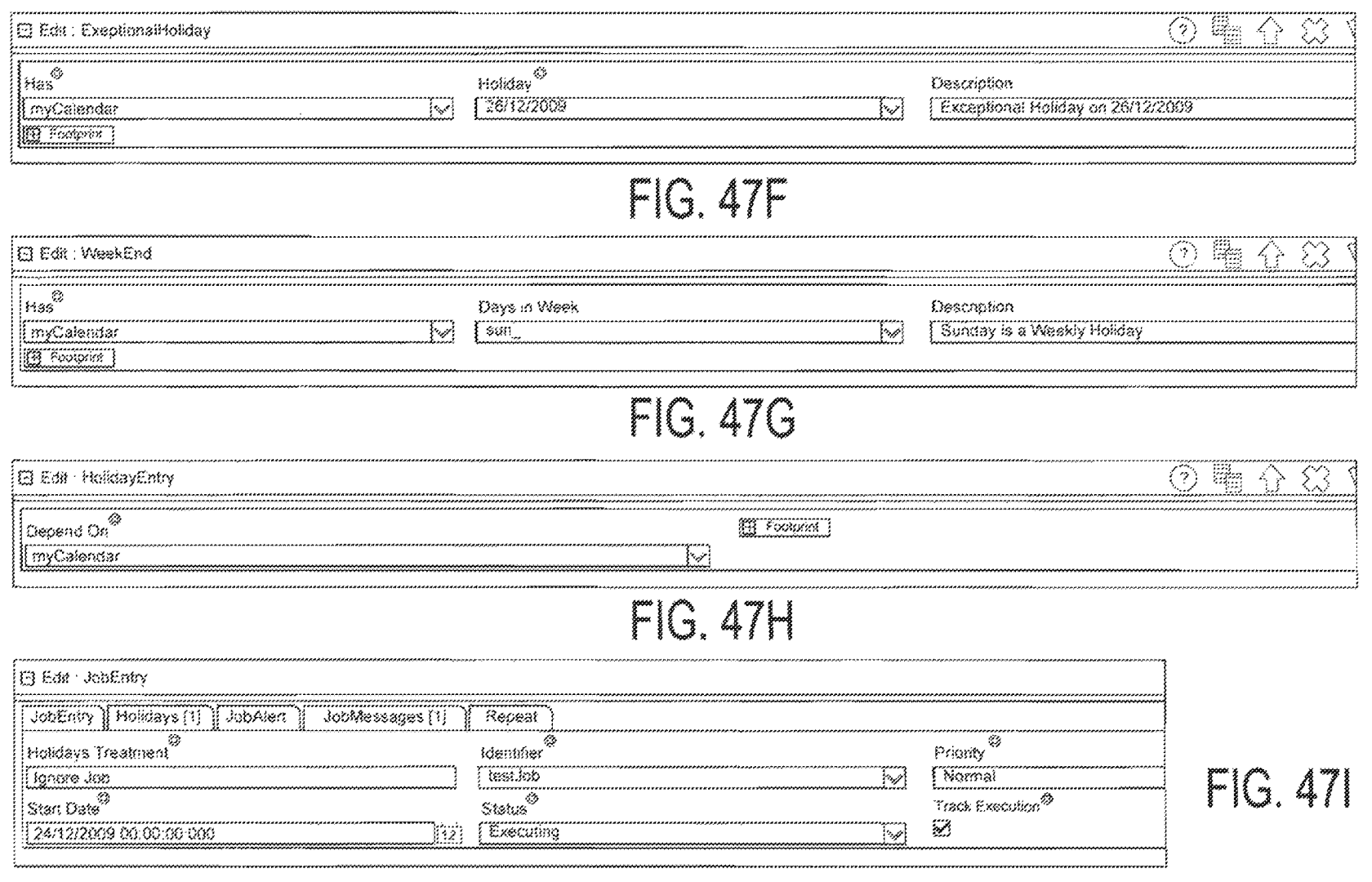

FIG. 47A is an exemplary UML diagram illustration of how to use the scheduler module in the design of an application;

FIG. 47B is an exemplary screen of a job message configuration;

FIG. 47C is an exemplary screen of how to configure a job to be repeated daily;

FIG. 47D is an exemplary screen of how to configure a time of day in a job daily repeat;

FIG. 47E is an exemplary screen of how to assign an annual holiday to a calendar" FIG. 47F is an exemplary screen of how to assign an exceptional holiday to a calendar;

FIG. 47G is an exemplary screen of how to assign a weekly holiday to a calendar; FIG. 47H is an exemplary screen of how to define the dependency between a job and a calendar FIG. 47I is an exemplary screen of how to configure a job to be tracked;

FIG. 52 illustrates an example of a Palmyra Schedule Trace.

DETAILED DESCRIPTION OF THE PREFERRED EMBODIMENTS

Figure 1:
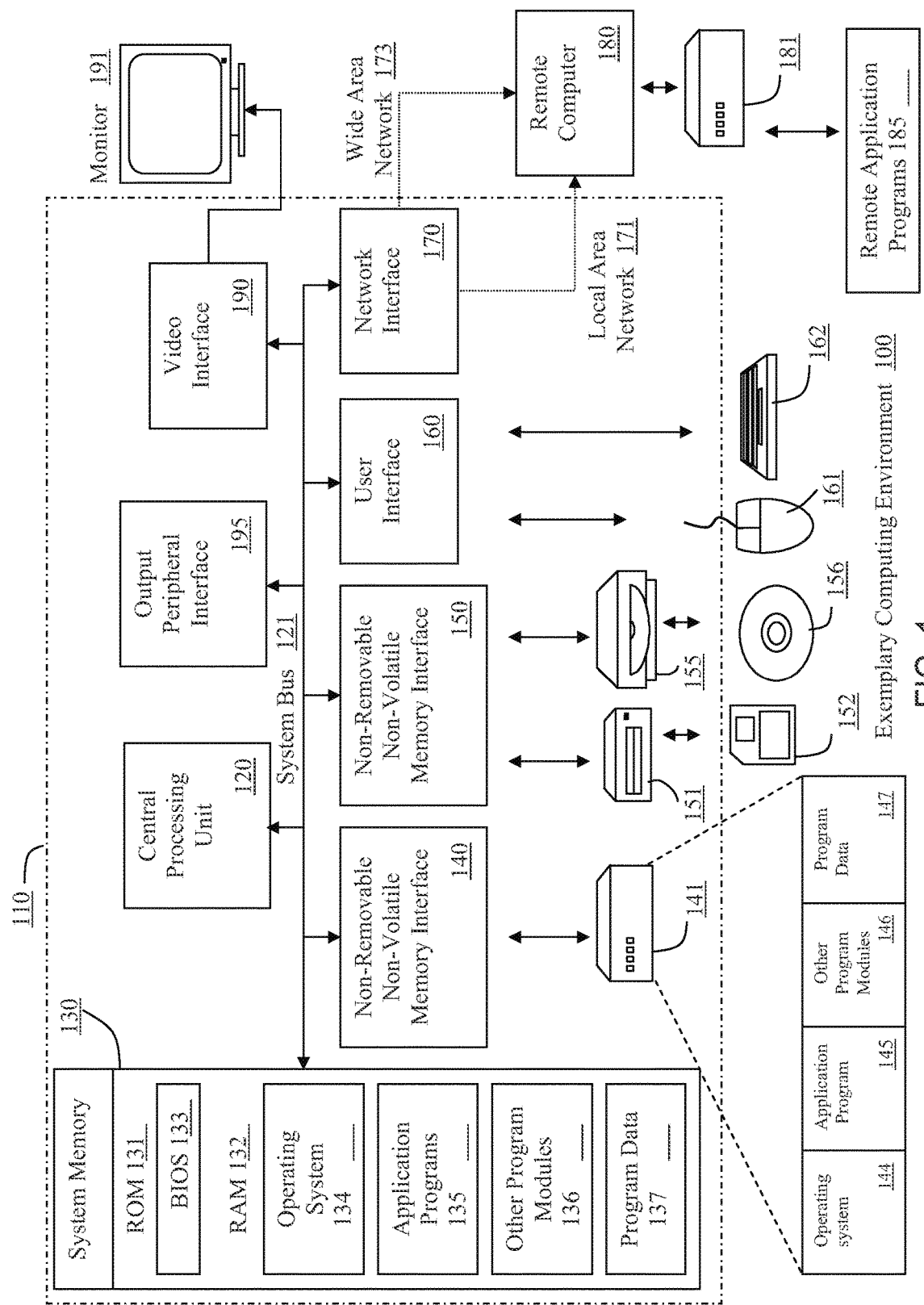
FIG. 1 is a schematic diagram of an exemplary computing environment.

A preferred embodiment will be set forth in detail—with reference to the drawings, in which like reference numerals refer to like elements or steps throughout.

Example Computing Environment

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the preferred embodiment. While a general purpose computer is described below, this is but one example. The preferred embodiment also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/of included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules maybe combined or distributed as desired in various embodiments.

Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or a combination of components illustrated in the exemplary operating environment 100.

With reference to FIG. 1, an example system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI-Express bus.

The computer 110 typically includes a variety of computer readable media. Computer readable media can be any available media that can be accessed by the computer 110 and include both volatile and nonvolatile, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically contain computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and or program modules that are immediately accessible to and/or presently being operated on by the processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical medium. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, the hard disk drive 141 is illustrated as the storing operating system 144, application programs 145, other program modules 146, and program data 147. Note that these components can either be the same as or different from the operating system 134, application programs 135, other program modules 136, and program data 137. Operating system 144, application programs 145, other program modules 146, and program data 147 are given different numbers here to illustrate that, at a minimum, they are different. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to a monitor 191, computers may also include other peripheral output devices such as speakers and a printer (not shown), which may be connected through an output peripheral interface 1 5.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, hut may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes means for establishing communications over the WAN 173, such as the Internet, hi a networked environment, program modules depicted relative to the computer 110, or portions thereof, may be stored in the remote memory storage device. By way of example, and not limitation, FIG. 1 illustrates remote application programs 185 as residing on a memory device 181. Remote application programs 185 include, but are not limited to web server applications such as Microsoft® Internet Information Services (ITS)® and Apache HTTP Server which provides content which resides on the remote storage device 181' or other accessible storage device to the World Wide Web. It will be appreciated that the network connections shown are exemplary and other means of establishing a communications link between the computers may be used.

One of ordinary skill in the art can appreciate that a computer 110 or other client devices can be deployed as part of a computer network. In this regard, the preferred embodiment pertains to any computer system having any number of memory or storage units, and any number of applications and processes occurring across any number of storage units or volumes. An embodiment of the may apply to an environment with server computers and client computers deployed in a network environment, having remote or local storage. The preferred embodiment may also apply to a standalone computing device, having programming language functionality, interpretation, and execution capabilities.

Example Network Environment

Figure 2:
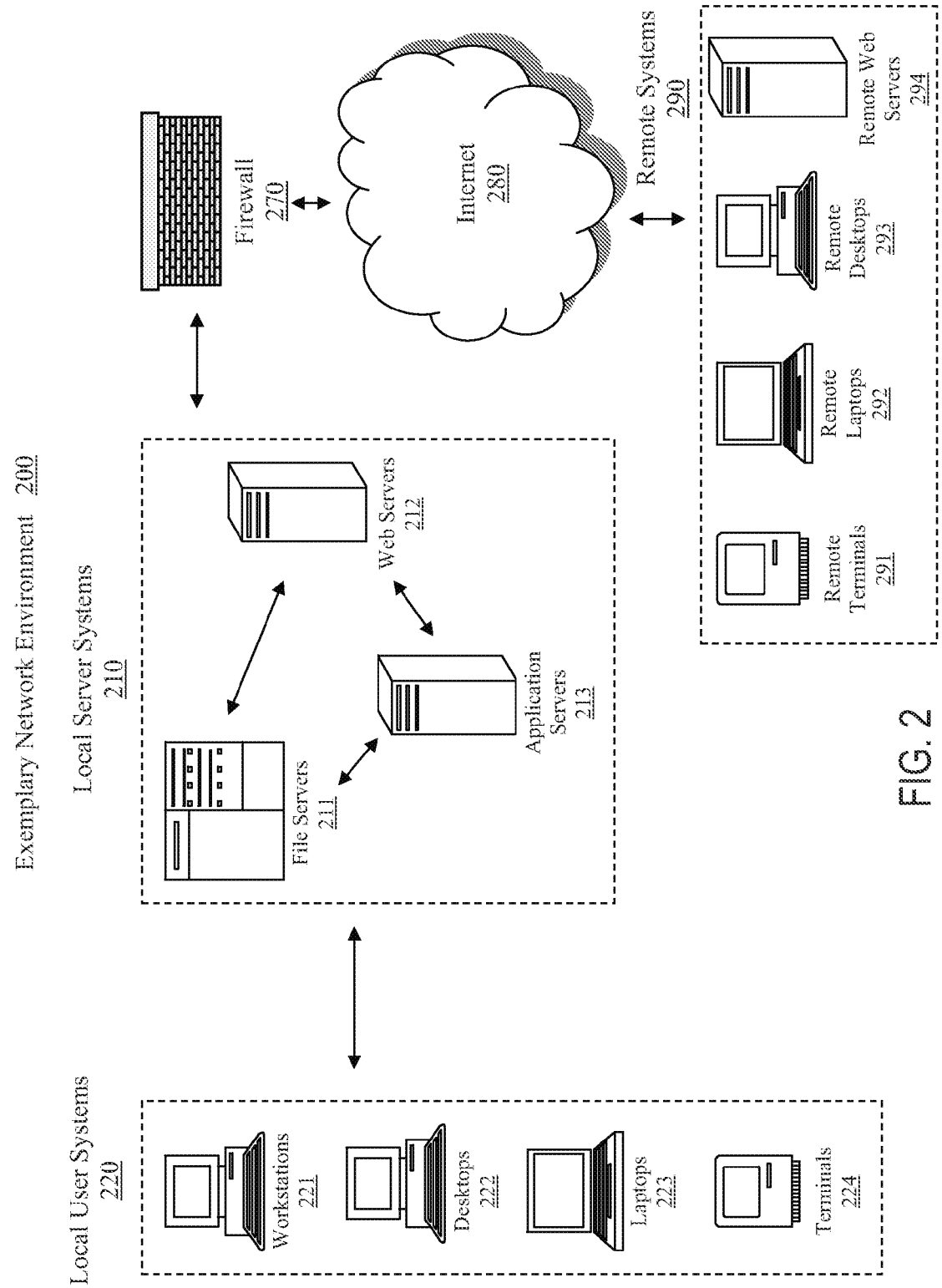
FIG. 2 is a schematic diagram of an exemplary network environment.

FIG. 2 illustrates an embodiment of a network environment in which an embodiment of the present invention can be implemented. The network environment 200 contains a number of local server systems 210, which may include a number of file servers 211, web servers 212, and application servers 213 that are owned and managed by the owner of the local network. These servers are in communication with local user systems 220 which may include a large variety of systems such as workstations 221, desktop computers 222, laptop computers 223,—and thin clients or terminals 224. The local user systems 220 may contain their own persistent storage devices such as in the case of workstations 221, desktop computers 222, and laptop computers 223. They can also have access to the persistent storage, such as a database, provide by the local servers 210. In the case of thin clients and terminals 224, network storage may be the only available persistent storage. The users within the local network usually get access to the . . . wider area network such as the Internet 280 though the local server systems 210 and typically some network security measures such as a firewall 270. There might also be a number of remote systems 290 that can be in communication with the local server systems 210 and also the local user systems 220. The remote computer systems can be a variety of remote terminals 291, remote laptops 292, remote desktops 293, and remote web servers 294. FIG. 2 illustrates an exemplary network environment. Those of ordinary skill in the art will appreciate that the teachings of the present invention can be used with any number of network environments and network configurations.

Client-Server Environment

The client-server software architecture model is a versatile, message-based and modular infrastructure that is intended to improve usability, flexibility, interoperability, and scalability as compared to centralized, mainframe, time sharing computing. Client-server describes the relationship between two computer programs in which one program, the client is defined as a requester of services, which makes a service request from another program, the server is defined as the provider of services, which fulfills the request. A client-server application is a distributed system comprised of both client and server software. A client software process may initiate a communication session, while the server waits for requests from any client.

In a network, the client-server model provides a convenient way to efficiently interconnect programs that are distributed across different locations. Transactions among computers using the client-server model are very common. Most Internet applications, such as email, web access and database access, are based on the client-server model. For example, a web browser is a client program at a user computer that may be used to access information at any web server in the world. For a customer to check a bank account from a remote computer, a client program, which may run within a web browser, forwards a request to a web server program at the bank. The web server program may in turn forward the request to a database client program that sends a request to a database server at another bank computer to retrieve the requested account balance information. The balance information is returned back to the bank database client, which in turn serves it back to the web browser client in the customer's computer, which displays the information to the customer.

Figure 3:
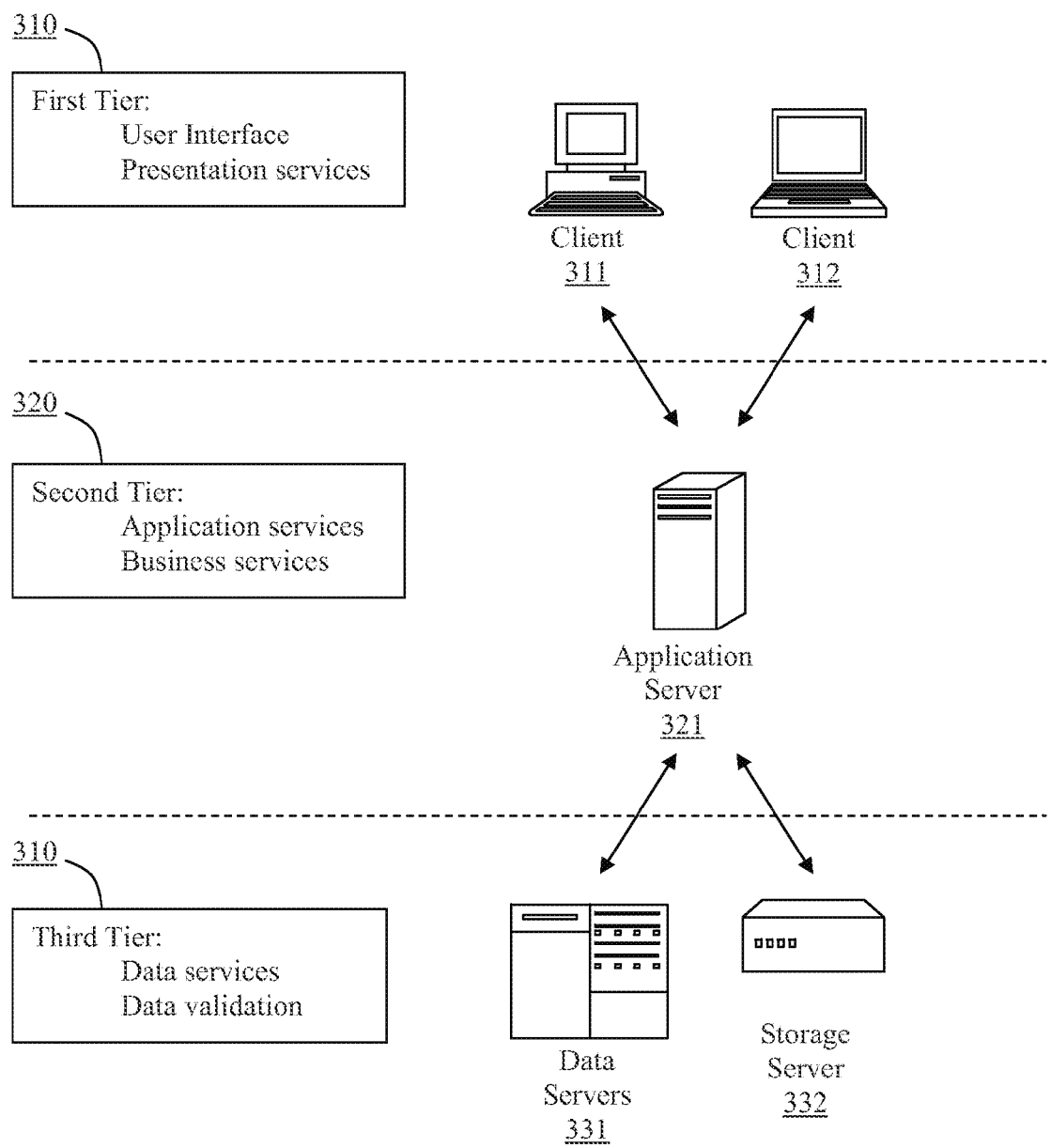
FIG. 3 is a schematic diagram of multi-tiered client-server environment.

FIG. 3 illustrates an example of multi-tier client server architecture. Multi-tier client-server architecture allocates different tasks and services to different tiers. In the example multi-tier architecture of FIG. 3, there are three logical tiers. The first tier 310 is one or more clients 311, 312, the second tier is an application server 321, and the third tier 330 is a data server 331 332. At the client tier, the clients 311, 312 provide the application's User interface and also act as presentation servers. The application's graphical user interface is generally a custom-generated web page to be displayed by a web browser on the client computer. There can be one or more application servers 321 that host the business logic, and one or more data servers 3 1, 332 to provide data storage and validation services. The main body of an application is run on a shared host 321. The application server 321 does not drive the graphical user interface, rather it shares business logic, computations, and a data retrieval engine. The presentation of data retrieved is handled by the presentation server at. the client tier. With less software on the client systems, there are fewer security concerns. Application scalability, support costs, and installation costs are all more favorable when the software is concentrated on a single server than when the software is distributed amongst a number of desktop clients. There are many different implementations that may be produced using component technology in the application server tier, such as CORBA (Common Object Request Broker Architecture), EJB (Enterprise Java Beans) and DCOM (Distributed Component Object Model).

In one preferred embodiment, the system implements Enterprise JavaBeans (EJB) technology in its architecture. EJB is a Java Application Programming Interface (API), which allows developers to focus on the actual business architecture of the model, rather than having to worry about endless amounts of programming and coding needed to connect all the working parts. The developer can design (or purchase) the needed EJB components and arrange them on the server as needed. EJB is a component architecture for developing and deployment of component-based distributed applications. Applications written using EJB are scalable, transactional, and multi-user secure. These applications may be written once, and then deployed on any server platform that supports the EJB specification.

In an EJB multi-tier environment, the client provides the user interface logic, the business rules are separated to the middle tier, and the database is the information repository. The client does not access the database directly. Instead, the client makes a call to the EJB Server on the middle tier, which then accesses the database. EJB Server provides a framework for deploying the middle-tier logic of distributed component-based applications. EJB Server's high-performance transaction server provides efficient management of client sessions, threads, database connections, and transaction flow. The Web browser connects to EJB Server or a Web server via HTTP to download an HTML page containing a Java applet that performs presentation functionality. The applet communicates with EJB Server, calling middle-tier components that perform business logic. Data servers and storage servers stores, processes, and protects the corporate data. EJB Server manages a pool of connections to the database, coordinating the transaction processing to those servers.

The Preferred Embodiment

Figure 4:
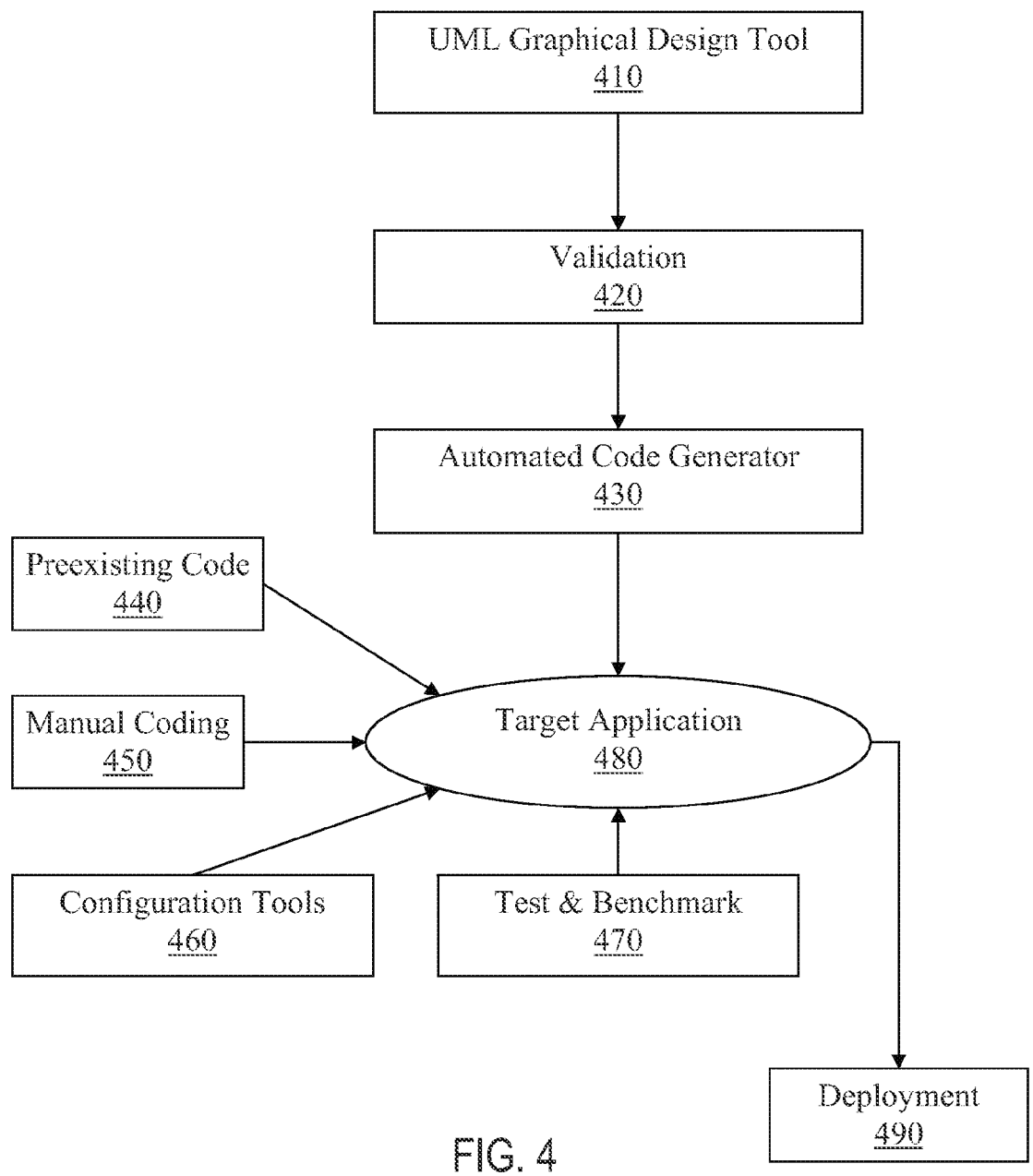
FIG. 4 is a flow chart of the general process of developing a enterprise software using the preferred embodiment.

This form of preferred embodiment teaches methods and systems for automated development of a software application. The method includes various processes for defining the application, modeling the specific business process or function to be performed by the software application, creating uniquely specialized UML models to further define the process or function, and validating the models against a set of predefined unique syntax rules. The validated models are then uniquely transformed into a unique metadata form that comprises generated application code and XML files used by the target application. FIG. 4 provides a general schematic of the major steps of the software engineering process of according to the preferred embodiment method. In general, the software engineering process using the preferred embodiment comprises the steps of first designing and modeling a business process using the UML graphical design tool 410. The business process is modeled using an enhanced version of UML provided by the invention with metadata. The UML model and metadata are validated 420 and serve as input for the automated code generation engine 430. The automated code generation engine parses the UML model and metadata and generates deployable source code for the target application 480 utilizing an enterprise application development framework, referred to as the Palmyra Framework. Some manual coding 450 is sometimes needed to supplement the automatically generated code, but the amount of manual coding is dramatically less than prior methods and usually directed to specific or specialized features of the application. The preferred embodiment can also include configuration tool(s) 460 and a test and benchmark tool 470. Once configured and tested, the target application is ready for deployment 490.

I. Graphical Design of Software Model Using UML Diagrams

This form of a preferred embodiment provides an easy-to-use graphical software engineering tool. The automatic code generation process starts with a standard modeling approach using UML design tools such as MagicDraw or Rational Rose. These tools are applied to create UML diagrams to represent the desired business process and the desired data model. The graphical modeling and design tool can be used by both users and consultants. The preferred embodiment facilitates the reuse of existing components, which include both business and technical components.

In one embodiment of the present invention, the graphical modeling and design tool is based on a commercial UML visual modeling tool such as MagicDraw. MagicDraw alone is not sufficient to function as the graphical modeling and design tool of the preferred embodiment. Although MagicDraw functions as a visual diagramming tool, it does not check for design errors, control Stereotypes and Tagged Values, reject wrong data, or provide warnings. When using MagicDraw as a tool to build and design UML models, the invention create the Designer tool as a plug-in for MagicDraw to enhances its function. The enhanced UML Designer, referred to as a Palmyra UML Designer, constitutes an additional layer that sits on top of MagicDraw in order to overcome the limitation of creating UML models that do not conform to the pre-defined rules and to avoid errors during and after the design process. The Palmyra UML Designer tool employs several steps to achieve this. First, the Palmyra UML Designer tool checks whether the designed models conform to pre-defined Palmyra rules by validating initial values, multiplicities, types, etc. Second, the Palmyra UML Designer tool makes diagrams ready for the generation process without human error. Third, the Palmyra UML Designer tool enables the addition and change of relations and simple fields uniformly throughout the application with precision. Fourth, the Palmyra UML Designer tool checks for Palmyra elements, and adds or corrects new eligibility between their Stereotypes in order to avoid conflict and design errors. Finally, the Palmyra UML Designer tool makes use of value references for Tagged Values instead of String Values.

The preferred embodiment is not limited to MagicDraw, or any other particular UML design tool. Accordingly, one can implement this validation functionality through the use of other design tools, such as a stand-alone application, or an add-on for another UML visual design tool. The UML Designer also provides usability features that help a user to create a UML model. The UML Designer provides user friendly interfaces for panels, classes and Tagged Value input.

It automatically loads models conforming to the preferred embodiment within projects. The UML Designer simplifies the use of the Palmyra classes by grouping them into four main categories, which are Entities, Interfaces, Controllers, and Simple Values. The UML Designer adds needed Stereotypes to the classes de ending on the type selected. The UML Designer also displays available parent types at runtime.

Figure 5:
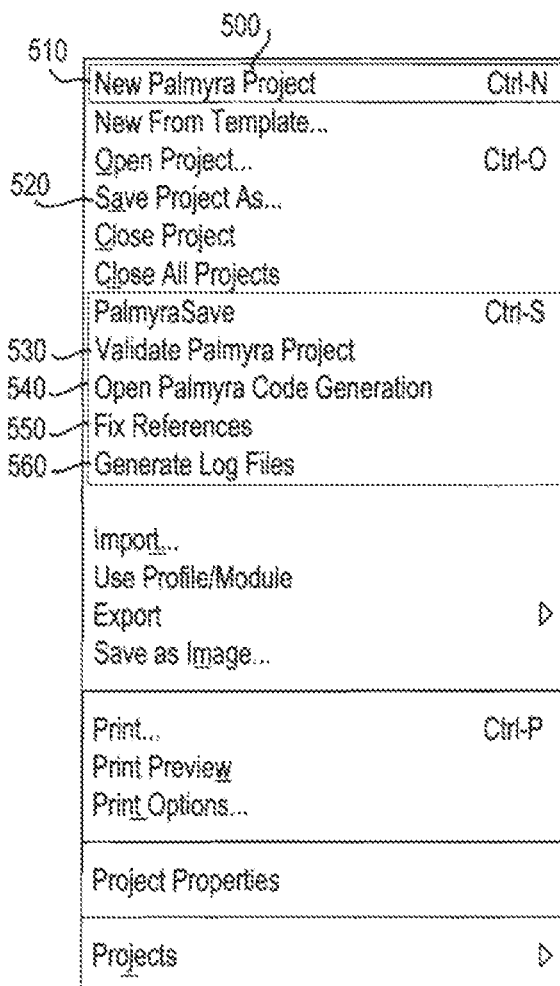
FIG. 5 is an exemplary Pahnyra UML Designer File menu.

Palmyra UML Designer can also provide a set of new actions to the selected design tool. FIG. 5 represents a UML Designer File menu 500 having example new actions.

New Palmyra Project 5 JO:

This sub-menu is used to create a new Palmyra project. A Palmyra project contains the Palmyra UML model and removes all conflicting Stereotypes.

Palmyra Save 520: saves the active project.

Validate Palmyra Project 530:

This sub-menu is used to validate the Palmyra Rules of the project.

Open Palmyra Code Generation 540:

This sub-menu is used to open the Code Generation Tool and passes to it the full path of the related UML model (in Palmyra XML format). This sub-menu is used when the project is validated. The path of the Code Generation Tool is specified with the installation of the plug in.

Generate Log Files 560:

This sub-menu is used to generate log files. A first log file contains the list of entities without code in the current model. Its name is the concatenation of the name the model and "_EntitiesWithoutCode.log". A second log file contains the list of fields which do not have the Tagged Value 'currpath' and do not have a simple value (the field must have at least one '.'). Its name is the concatenation of the current model name and "_FieldsWithCurrPath.log". This sub-menu comes available when the project is validated.

Figure 6:
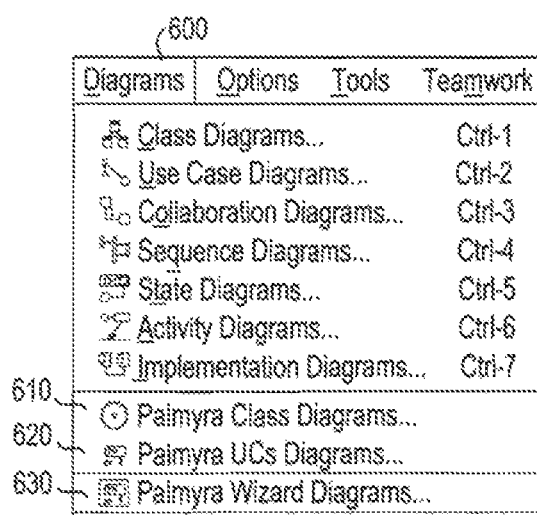
FIG. 6 is an exemplary Palmyra UML Designer provides additional menu options.

There are several types of diagrams that are created using the UML design tools, such as class diagrams, process diagrams, and use-case transition diagrams. Palmyra UML Designer provides additional menu options to MagicDraw's Diagram menu 600 (FIG. 6).

A. Class Diagram

The class diagram is uniquely created using class diagram modeling techniques where specific predefined types of classes and decorations are applied to provide unique functionality allowing the system to interpret the diagram and to generate the data structure at generation time. The specific predefined types of classes are uniquely created in a standard UML model that is provided by the framework of the invention. The classes are organized into types of classes such as Entities, Controllers, Simple Types, and Interfaces. The classes in the model are a part of the f amework libraries. Palmyra UML Designer provides direct access to graphical tools for creating UML class diagram through the Palmyra Class Diagrams submenu 610.

The specific predefined decorations are uniquely created in the same standard UML model that is provided by the framework. The decorations are also organized into types such as Tagged Values and Stereotypes that are designed to facilitate the creation of the target software application.

1. Class Types

Palmyra consists of four class types, Simple, Entity, Controller, and Interface, a. Simple Types Simple class types are primitive structures that contain one single data element like a number or a date or list of characters. The simple types can be predefined by the standard model provided by the f amework, and they can also be defined in a specific model of a target application. Simple types are used as fields for more sophisticated classes like entity class-types or as parameters for the methods contained in the controller class-types. These simple class types can also be constrained in a way to provide limits and definitions of the data elements such as rounding for numeric elements and formatting for text elements and preset values.

An example of a predefined simple type is StringValue. A StringValue simple type is a text structure that may be constrained by a maximum number of characters. Another example of a predefined simple type is BooleanValue, where the data element can have a value of true or false.

Figure 7A:
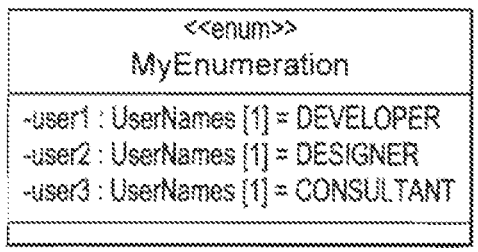
FIG. 7A is an example of an Enumeration class.

An example of a defined simple type is AgeValue. In this example, a simple type is—created using the name AgeValue that is defined to inherit attributes from another predefined or a newly defined Simple type. For example, AgeValue is set to inherit from IntegerValue, which is a predefined simple type that contains an integer between the range −2,147,483,648 to 2,147,483,647. In addition, a constraint can also be added to the newly defined AgeValue Simple type so that the range might be 0 to 150. Accordingly, the newly defined AgeValue inherits the attribute of an ability to provide a range of values and it can be further defined with specific values established by the needs of the target application. Simple class types also have an Enumeration class. An enumeration class describes an enumeration type. Possible values of this type are defined within the class attributes. FIG. 7A illustrates an example of an enumeration class. In this particular example the class contains a list of users with their attributes. In this example user1 had a list of properties such as UserName[i]=Developer, TJserNamep+1]=Designer. The Enumeration class can be represented in a Combo Box in the generated application.

i. TypeName Class

Figure 7B:
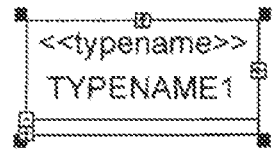
FIG. 7B is an example of a TypeName class.

A Type Name Class is an enumeration filled at run-time that contains all sub class names of a specific class. FIG. 7B illustrates an example of a TypeName class. For example, if a type name extends "Constraint TypeName" and the Tagged Value "classname" has as value a class "X", at runtime the system will show in a combination box all sub classes' names of the class "X" having the Stereotype "constraints".

ii. DynamicTypeName

Figure 7C:
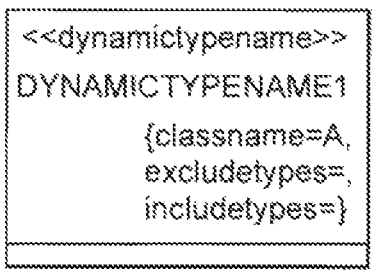
FIG. 7C is an example of a DynamicTypeName class.

A Dynamic Type Name Class is an enumeration filled at run-time that contains all sub classes of a given class with two additional properties. FIG. 7C illustrates an example of a DynamicTypeName class. For example, if the user defines a DynamicTypeName class that has as 'classname'Tagged Value the Class "X", the 'includetypes' as 'Type/\Abstract-Value' and the 'excludetypes' as 'Type_Constraintable the system will show all sub classes of "X" extending "Abstract-Value" and that do not have the Stereotype 'constrainable'. The description of all possible types is detailed in Palmyra Stereotypes & Rules {infra).

iii. Attribute Class

Figure 7D:
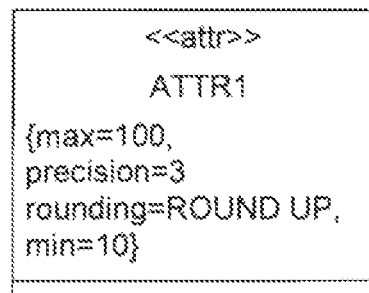
FIG. 7D is an example of an Attribute class.

An Attribute class is used to customize a simple type that extends one of the Palmyra Simple types and adds specific properties that the user needs. FIG. 7D illustrates an example of an Attribute class. The Attribute class defines a set of properties for a specific object. In the example shown in FIG. 7D, four properties are defined for a specific attribute attr1. In another example, the user can define anew attribute having as type AmountValue, give to this attribute the precision and the defaultformat Tagged Values, and after that define all attributes, parameters, and returned values of operations in the application.

iv. ControllerName

Figure 7E:
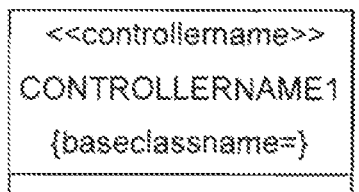
FIG. 7E is an example of a Controller class.

A controller name is like a type name, except that the baseclassname is a controller. FIG. 7E illustrates an example of a Controller class. For example, if a controller name has the Tagged Value "baseclassname" as value a controller "C", at runtime the system will show in a combo box all sub classes' names of the controller "C".

v. Action Enumeration

Figure 7F:
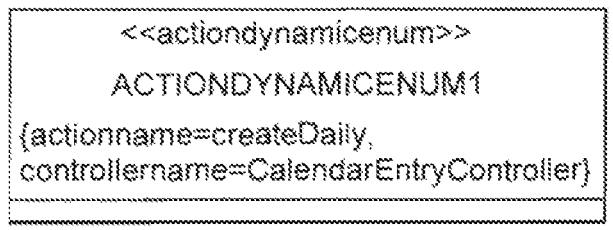
FIG. 7F is an example of ActionEnumerationClass.

An Action Enumeration Class is a dynamic enumeration that is filled at runtime by the execution result of a method in a controller. FIG. 7F illustrates an example of Action Enumeration Class. For example, to fill a market Transaction Type from file (Property file in an Enterprise Application Archive (EAR), the user creates a controller, defines a method that returns a Collection Value, and then creates an Action Enumeration Class with Tagged Value "controlema?ne" equal to the name of the new controller and "actionname" equal to the name of the method that will fill at runtime the values of Market Operation Type. When some values of the Market Operation Type are added, modified, or deleted, the changes will be done only in the file.

b. Entity Types

Entity class types are heterogeneous structures that contain fields having one or more Simple class types, and Entity class types can have relations with other Entity class types. Like Simple types, the Entity types can be predefined by the standard model provided by the framework or they can be defined in a specific model of a target application. Entity types are data elements that compose the data structure of the target application that also can be used as parameters for the methods contained in the Controller class-types. These Entity class types can also be constrained, enhanced, and modified in a way to provide more precise data elements in accordance with the needs established by the target application.

Entity class types can have multiplicity of definitions for the fields and relations. The integrity of the instances of Entity classes, referred to as objects, is checked at runtime for the correctness of those objects in accordance with the predefined multiplicities.

The relations between Entity classes types are categorized into four groups referred to as generalization, aggregation, composition, and association.

Generalization relations are used to express inheritance. The inheriting class is considered an extension of the existing class that can add more fields or relations and/or can modify some features such as multiplicities of existing fields and relations. Aggregation relations are used to make it possible for a data structure defined by one Entity class to point to other data structures defined by other Entity classes.

Composition relations are used to indicate that a data structure defined by one Entity class is composed of other data structures defined by other Entity classes.

Association relations are used to associate the data structure defined by an Entity class with other data structures defined by other Entity classes according to conditions related to the contents of the related classes.

Relation dependencies are categorized into six groups known as In, Contains, SameAs, Or, Xor, and Exclusive. Relation dependencies are applied to a pair of relations, the two relations are called the source and the target. The relations eligible for such dependencies are Aggregation or Composition relation types.

In relation, dependency is used to indicate that the element belonging to the source relation is simultaneously a member of the target relation-collection.

Contains relation dependency is used to indicate that the collection of elements belonging to the source relation includes the collection of elements that belong to the target relation.

SameAs relation dependency is used to indicate that the element(s) belonging to the source relation is the same element that belongs to the target relation.

Or relation dependency is used to indicate that at least one of the two relations, source or target, should be assigned at runtime.

Xor relation dependency is used to indicate that one and only one of the two relations, source or target, should be assigned at rantime.

Exclusive relation dependency is used to indicate that at most one of the two relations, source or target, should be assigned at runtime.

There are different types of entities:

i. Entity Class

Figure 9A:
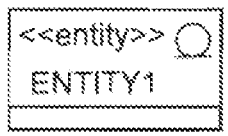
FIG. 9A is an example of an Entity class.

An Entity class is a persistent class in the database (realizes the "AbstractValue" interface), having attributes (inherits from "CompositeValue") and relations with other classes. FIG. 9A illustrates an example of entity class.

Figure 8:
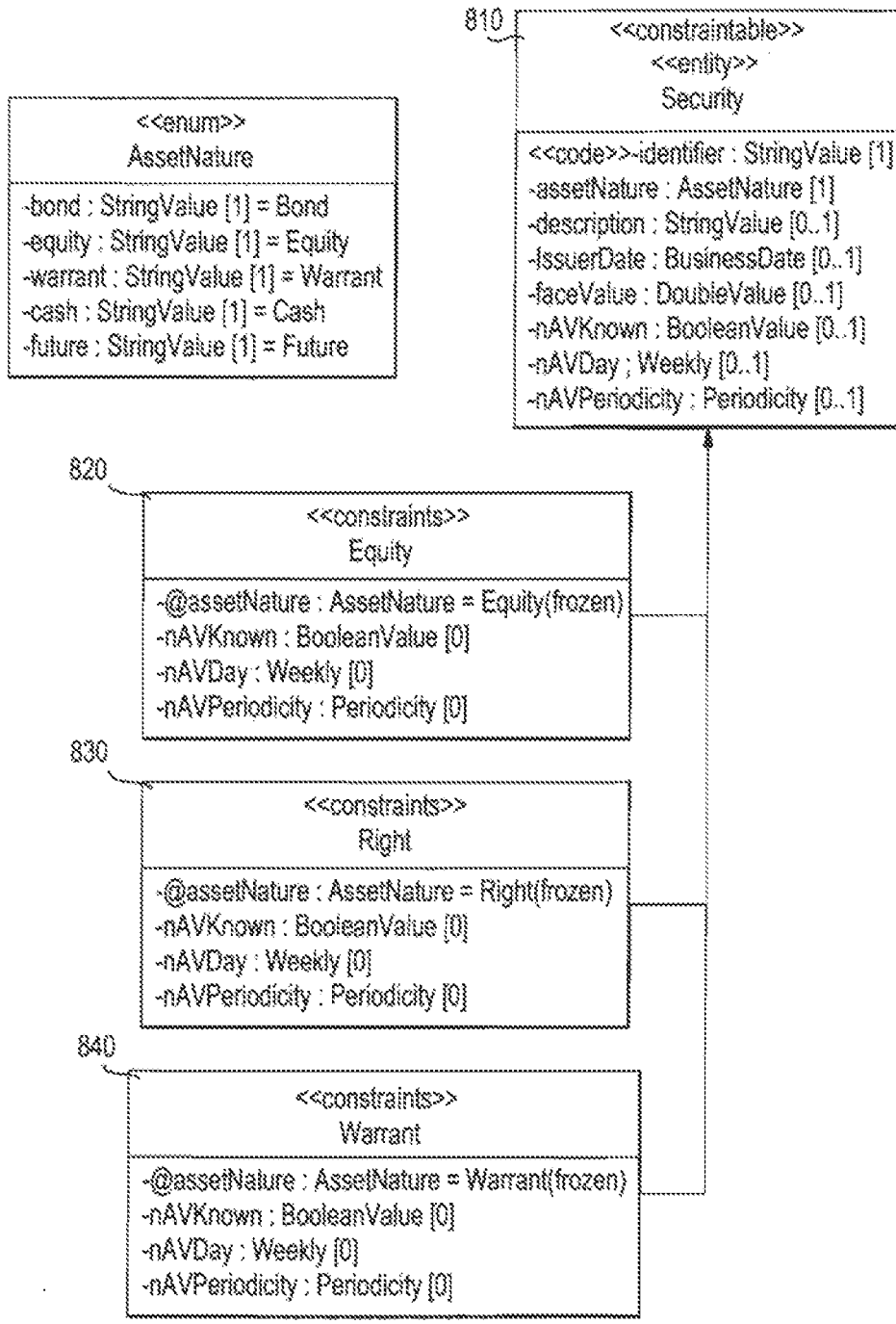
FIG. 8 is an example of a Constrainable class.

Entities can have Stereotypes such as constrainable, cached), Tagged Values such as {expandable, non expandable, and Business Tagged Value), and Attributes, ii. Constrainable Classes A Constrainable class is a persistent class in the database on which we can define constraints. It is an "entity" that has the Stereotype "constrainable". FIG. 8 illustrates an example of a Constrainable class 810.

iii. Constraints Classes

The objective of a constraints class is to define constraints on a Constrainable class: The "constraints" class should inherit from the constrained class (which should have the Stereotype "Constrainable" or "constraints" also).

FIG. 8 illustrates the use of Constraints/Constrainable classes. lie classes Equity 820, Right 830, and Warrant 840 are securities that have specific properties (fixed value, multiplicity). The constraints are:

Equity 820: In this class the attributes: assetNature is frozen, read only, and has fixed value "Equity."

Right 830: In this class the attributes: assetNature is frozen, read only, and has fixed value "Right."

Warrant 840: In this class the attributes: assetNature is frozen, read only, and has fixed value "Warrant."

iv. Composite Class

Figure 9B:
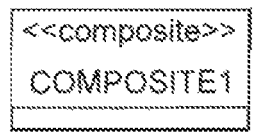
FIG. 9B is an example of a Composite class.

A Composite class is not persisted in the database, which does not realize the "AbstractValue" interface), and it has attributes and relations. It inherits from "CompositeValue". It also can have Stereotypes and Tagged Values. FIG. 9B provides an example of a Composite class.

v. Macro Class

Figure 9C:
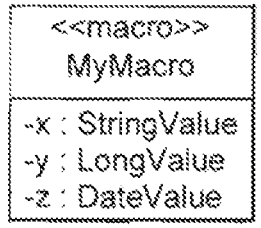
FIG. 9C is an example of a Macro class.
Figure 9D:
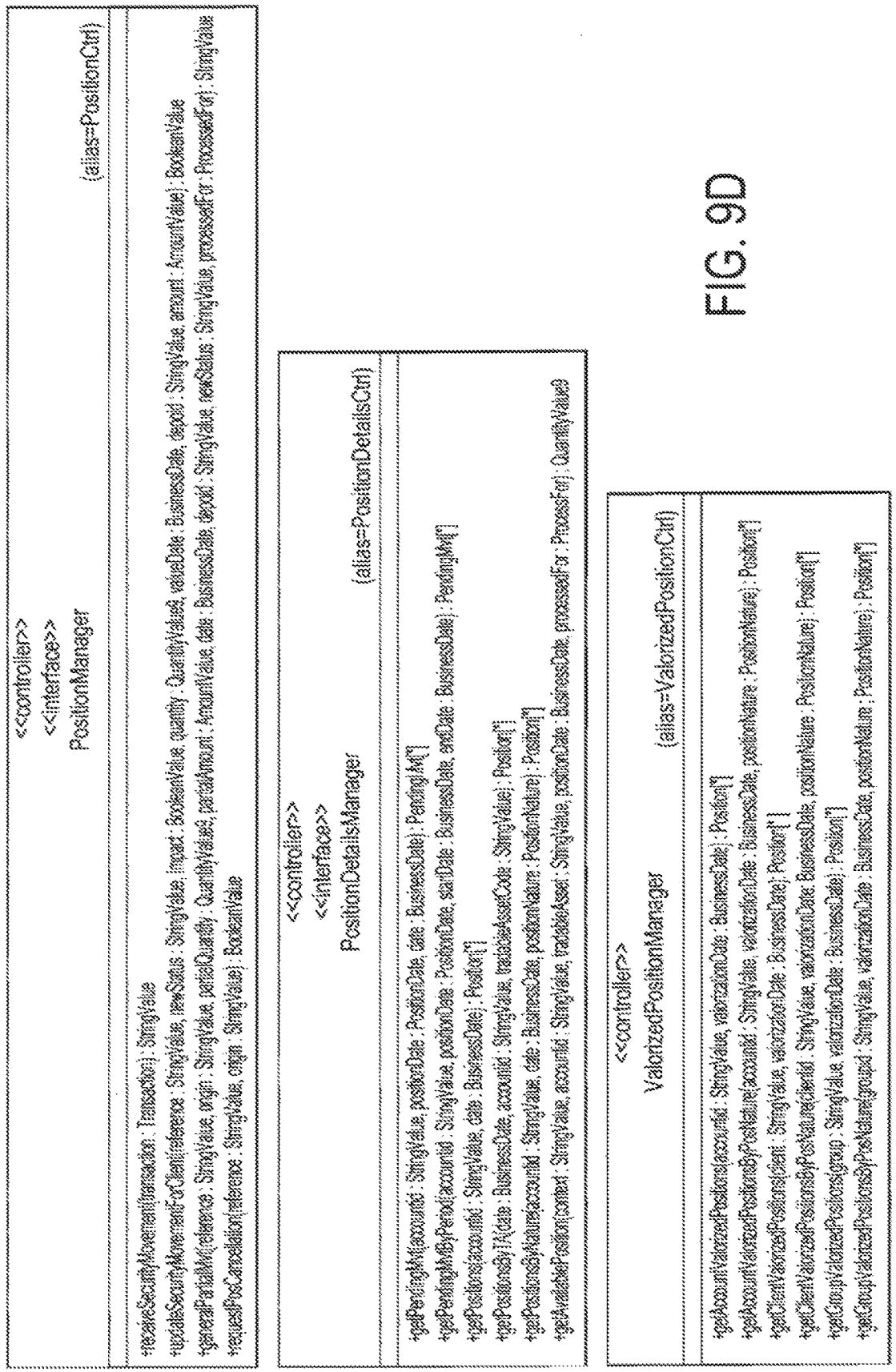
FIG. 9D is an example of a Controller class.

The Macro class is used to optimize the repetition of some attributes in the class diagram. When some attributes (from different classes) are common for many classes, the definition of a macro can be very useful. In fact, a macro expresses a semantic grouping of some attributes—within the same class in order to be used by other classes. FIG. 9C provides an example of a Macro class.

d. Controller Class Controller class types are algorithm definition structures; they contain one or more written algorithms that are called Methods. Like Simple types and Entity types, Controller class types can be predefined by the standard model provided by the framework or they can be defined in a specific model of a target application. A Method may have one or more input data elements referred to as input parameters and may return at most one output element called the return value. Both input parameters and return value represent instances of the Simple class types, Entity class types or interfaces. A controller may have a short name known by an alias; this alias is used by the application code or by the expressions used as calculation formulas to refer to a specified Controller. FIG. 9D provides an example of a Controller class.

e. Interfaces

Interfaces are heterogeneous structures that serve as templates containing fields having one or more Simple class types and can have relations with other Entity class types or interfaces. Like Simple types and Entity types, interfaces can be predefined by the standard model provided by the framework of they can be defined in a specific model of a target application.

Figure 10:
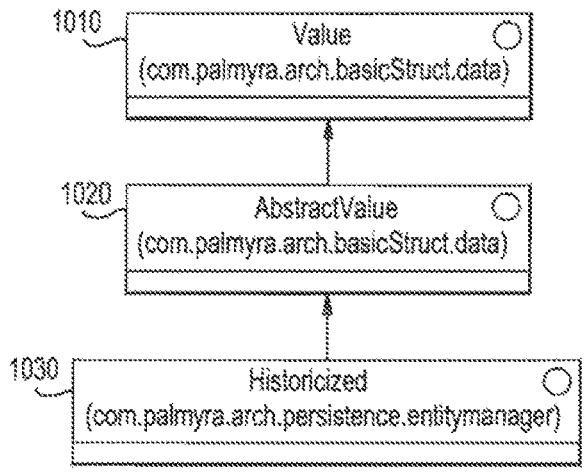
FIG. 10 is an interface class containing Value Interface, Abstract Value Interface, Storage Interface, Historicized Interface, and the hierarchy of these interfaces.

The Interface category contains the following interfaces, which are illustrated in FIG. 10:

i. Value Interface

"Value" 1010: this interface is the super interface of all elements in the framework. All implementing classes are not persistent by default The user can define its own 'value' interface that extends Value or one of it sub-interfaces. The new interface is used to define attributes and make relations with other interfaces or classes. All implementing classes are not persistent (having the 'composite' stereotype for example)

ii. Abstract Value Interface

"Abstract Value" 1020: This interface is the super interface of all persistent entities in the database, It defines the technical fields (pk, creationDate, creatorUserId, updateDate, updatorUserId, accessPoint, type). All sub-interfaces of AbstractValue must have the stereotype 'abstractvalue' and all sub-classes must have the stereotype 'entity'. If the user defines an 'abstractvalue' interface, it can define attributes (but not operations) and make relations with other classes or interfaces.

iii. Storage Interface

"Storage": An interface with the stereotype 'storage' specifies storage of implementing entities. A storage Interface must inherit from AbstractValue interface. The user must add the related Tagged Value "datasource". All classes that implement the created interface will be stored in the specified data source. The mapping between the value of the tagged value 'datasource' and the real database will be performed when deploying the application.

Example: A client has bought a Palmyra business application that has an interface with another application but this application has it own database. The designer needs to create a new storage entity that inherits from Storage interface and assigns to it the corresponding data source.

iv. Historicized Interface

"Historicized" 1030: indicates that the implementing entity will be historicized. The system defines two interfaces: Historicized and HistoricizedOnDelete. A Historicized entity is a class that inherits from one of the two mentioned interfaces. The system will maintain the history of all modifications made on instances of this entity. The user can define its own 'historicized' interface that defines the tagged value 'historydatasource'. All classes that implement the created interface will be historicized in the specified history data source. The mapping between the value of the tagged value 'historydatasource' and the real database will be performed when deploying the application.

The hierarchy of these interfaces is given in FIG. 10.

3. Class Decoration Types

The specific predefined decorations are uniquely created Tagged Values and Stereotypes designed to facilitate the creation of the target software application.

Decorations for class diagrams provide additional information for elements like interfaces, classes, relations, and fields. The decorations are categorized into Tagged Values and Stereotypes. Tagged Values are used to add information to an element by means of a desired value such as a number or character. Stereotypes are added to classify these elements into groups such as Entities and Constraints, or to add information like the Stereotype Constrainable, however no values are assigned to Stereotypes. The list of available Tagged Values and Stereotypes differs in accordance to the type of element All the Stereotypes are defined exclusively in the standard UML model provided by the framework. In addition, some of the Tagged Values are defined in the standard UML model and others may be defined by a specific model of a target application. TABLE 2 lists Palmyra Stereotypes and Tagged Values:

TABLE 2

Palmyra Stereotypes and Tagged Values

| Element | Properties | Palmyra Stereotype | Palmyra Tagged Value |
| --- | --- | --- | --- |
| Class | Name | entity | context |
|  |  | constrainable | descriptionkeyes |
|  |  | constraints | domainmanager |
|  |  | composite | fieldconfig |
|  |  | cached | indexgroup |
|  |  |  | sameas |
|  |  |  | slaname |
|  |  |  | uniquegroup |
|  |  | macro |  |
|  |  | controller | Alias |
|  |  | utility |  |
|  |  | enum | domainmanager |
|  |  | typename | classname |
|  |  |  | domainmanager |
|  |  | dynamictypename | classname |
|  |  |  | excludetypes |
|  |  |  | includetypes |
|  |  |  | domainmanager |
|  |  | attr | defaultformat |
|  |  |  | domainmanager |
|  |  |  | mask |
|  |  |  | max |
|  |  |  | min |
|  |  |  | precision |
|  |  |  | rounding |
|  |  | controllername | baseclassname |
|  |  | actionenum | actionname |
|  |  |  | controllername |
|  |  |  | domainmanager |
| Interface | Name | value | context |
|  |  | abstractvalue | domainmanager |
|  |  |  | indexgroup |
|  |  |  | sameas |
|  |  |  | maxgroup |
|  |  |  | slaname |
|  |  |  | uniquegroup |
|  |  | storage | datasource |
|  |  | historicized | historydatasource |
| Attribute | Name | code | Active |
|  | type | asp | calculationformula |
|  | initial | unique | calendarpath |
|  | value | sequence | curpath |
|  | multiplicity | transient | defaultformula |
|  |  |  | domainmanager |
|  |  |  | exclusivetarget |
|  |  |  | index |
|  |  |  | invisible |
|  |  |  | label |
|  |  |  | order |
|  |  |  | ortarget |
|  |  |  | orderincode |
|  |  |  | originalname |
|  |  |  | ownerclassname |
|  |  |  | ownerclasspath |
|  |  |  | readonly |
|  |  |  | rounding |

TABLE 2-continued

Palmyra Stereotypes and Tagged Values

| Element | Properties | Palmyra Stereotype | Palmyra Tagged Value |
|---|---|---|---|
| | | | style |
| | | | skewed |
| | | | wordsize |
| | | | xortarget |
| Operation | Name | | |
| | Return type | | |
| | Parameters | | |
| | (name and type) | | |
| Relation: Dependency | Between tow Association relations | In sameas contains exclusive or Xor | Root source target |
| Relation | Type: Simple/ Aggregation/ Composition Cardinalities Navigability | | |
| | Role Symmetric Role | code set list map transient Unique | Active asp calculationformula defaultformula domainmanager index indexisunique indexname invisible joincondition order orderincode originalname possiblevaluesformula readonly style skewed |
| | Role Symmetric Role | | For relations between constraint classes: originalName | a. Introduction to Tagged Values

Palmyra elements can have properties that are called Tagged Values. Tagged Values are properties given to elements like interfaces, classes, relations, and fields. Tagged Values can be mandatory or optional. All specific Tagged Values (defined in a specific model of a target application) are optional. Once a Tagged Value is added to an element, a value should be assigned to that Tagged Value. An example of a Tagged Value is the Calculation Formula. When a Calculation Formula is added to a field, an expression is assigned as a value to that Calculation formula.

b. Introduction to Stereotypes

Stereotypes are also properties given to elements. Unlike the Tagged Values, no values are assigned to Stereotypes when they are used. The target Stereotype merely expresses that a value is desired. For example, the Constrainable Stereotype, when added or assigned to an Entity class type, informs the system that constraints could be added to that Entity class type later at runtime. Palmyra Stereotypes and Tagged Values can be classified according to the level of applicability. They can be defined at attribute level, class level, a relation level, or a dependency relation level. TABLE 2 lists Palmyra Stereotypes and Tagged Values, c. Class Stereotypes "entity": a class with the Entity Stereotype is persistent.

"composite": a class with the Composite Stereotype is not persistent.

"macro": a class with the Macro Stereotype has a group of attributes that could be repeated in more than one class. These attributes will be part of the attributes of each class having an additional attribute having as type this Macro class. Every attribute having as type Macro class will be replaced by all the attributes of this Macro class in the generation step.

"controller": a class with the Controller Stereotype can have only operations (actions).

"typename": a class with the Typename stereotype is used to list all the subclasses of one class. This information is set in the Tagged Value classname. If the user adds a typename class having the classname Tagged Value as 'StringValue' for example, every field having this typename class as type will have as values all subclasses of 'StringValue'.

"dynamictypename": a class with the Dynamictypename Stereotype is a variation of a Typename class. In addition to the classname, the user can specify the included and excluded types. There are 9 types that the user can specify: ty e_AbstractValue, ty e_Interface, type_CompositeValue, type_Constraintable, type_Constraints, type_Collection-Value, type_SimpleValue, type_BusinessEntity, type_Ex-cludeAll, and typeJfocludeAll.

"attr": a class with the Attr stereotype can have an added restriction to an element of a Palmyra Simple type. The user can specify a customized simple type with all required properties, such as default format, mask, max, min, precision, and rounding.

"enum": a class with the Enum Stereotype represents an enumeration. Its attributes present all possible values for a field having as type "enum." Every Enum class element should inherent from a Palmyra StringValue type or one of its subclasses.

"controllername": a class with the Controllername Stereotype can list all the subclasses of a controller. This information is set in the Tagged Value baseclassname.

"ctionenum": a class with the Actionenum Stereotype has values dynamically assigned at run time. An Actionenum has two Tagged Values: controllername and actionname. The possible values for an Actionenum class are the result of the execution of the action specified in the Tagged Value actionname related to the controller specified in the Tagged Value controllername.

d. Interface Stereotypes

"value": A 'value' interface is a non persistent interface.

"abstractvalue": an interface with the 'abstractvaluea' stereotype is a persistent interface All it sub-classes can be saved to any storage service.

"Storage": an interface with the stereotype storage is used to identify a 'datasource' (database), which is used by all implementing entities.

"historicized": an interface with the stereotype 'historicized' is used to identify an 'historydatasource' (database), which is used to store the history tables of all implementing' entities.

e. View Related Elements

These elements help define the default view of their entity attributes and relations. These properties will be added to the meta-data of the element that is used by the Palmyra Presentation service.

"invisible": an attribute with the Invisible Tagged Value can be used to make an associated object not viewable in all service paths. If the user wants the object to be visible for a certain path, the user must add it using the view format.

"jiy e": an attribute with the Style Tagged Value can be used to have an object be viewed using the specified layout. The value of the style is one of the supported layouts in Palmyra. The value may also contain criteria determining the condition that must be verified in order to apply the specified layout.

"order": an attribute with the Order Tagged Value contains an integer value giving the position within the view order in which of the specified object will be viewed within the viewed class. The user must be careful to not use the same order for two different objects.

"label": an attribute with the Label Tagged Value will be viewed using the specified value in the label.

"readonly": an attribute with the Read only Tagged Value may not be modified. "frozen" (defined using changeability property in the UML editor): when set as an attribute, the UML designer must give the attribute an initial value, and its default view will be a Read Only mode.

f. Database Related Elements

"mandatory" (defined using multiplicity property in the UML editor, see TABLE 1): when set at attribute level, this attribute indicates that a value of this field must be set to a value other than null.

"index": an attribute with the Index Tagged Value set must be indexed in the database to accelerate search performance. When defined at a class level, it is used as a Tagged Value and is set to the group of attributes that must be indexed (ex: index=key1, key2, key3). If more than one group must be indexed, several Tagged Values must be set).

"unique": an attribute with the unique Stereotype set indicates that this element has a unique constraint in the database. When defined at a class level, it is used as a Tagged Value, and is set to the group of attributes that must be unique (e.g., unique=key1, key2, key3. If more than one group must be unique, several Tagged Values must be set), "unique" verifies also the "mandatory" property and the "index" tagged value.

"datasource": used with the Storage Stereotype, this interface Tagged Value specifies the database to use for all entities (and their subclasses) that realize this interface. The values specified in the UML will be mapped to real database when running Palmyra Setup tool.

"historydatasource": this is a Tagged Value used in interfaces that extends the

"Historicized" interface. It is used to specify the data source to be used for the history.

"code": A code is a string that uniquely represents an object. It comprises of one or a concatenation of a set of its attributes and relations. The default entity code is its database primary key. When an attribute or a relation has code as a Stereotype, this indicates that this attribute or relation is part of the object code. If the code is composed, the Stereotyped attributes must be ordered using the 'orderincode' Tagged Value, "code" also verifies the "mandatory" property and the "index" and "unique" Stereotypes.

"asp": this is a stereotype used in attributes to manage the sharing of global entities between different users. The user is allowed to access only a subset of the associated entities. An administrator must set the user properties to transparently map it to the asp attribute, which determines the allowed subset to access. "indexgroup": this Tagged Value is used to indicate that the associated group of attributes must be indexed in the database to accelerate search performance.

"uniquegroup": this Tagged Value is used to indicate that this group of attributes have a unique constraint in the database.

"skewed": when this Tagged Value is set to true, the object will be passed to the SQL query as the content of its value and not as a pre red statement.

"transient": indicates that this attribute or relation is transient and will not be mapped to the database.

g. Constraint Model Related Elements

"constrainable": this Stereotype indicates a class is subject to be constrained. This Stereotype is mandatory in the creation of constrained classes from a super class.

"constraints": this Stereotype indicates a class has a constraint on its super class. The constrained class can change some of its super properties at run time such as Attribute ranges and relation cardinality.

"originalname": this Tagged Value is associated with a relation of a constrained class to indicate the original name of the overridden relation (or role). The Stereotyped class is a constraint on its super class.

h. Model Related Elements

"sequence": tins Stereotype is associated with an attribute that will be dynamically assigned a unique sequenced value.

"set": A set is the default Stereotype applied to 1 to n composition and aggregation relations.

"list": A list is a Stereotype that applies to 1 to n composition and aggregation relations. It indexes the owned elements according to a user-defined order. These elements are displayed in order and can be re-ordered using either the up and down arrows or the "order list" action.

"map": A map is a Stereotype that applies to 1 to n composition and aggregation relations. It indexes the owned elements according to a user-defined role (key).

"indexname": this Tagged Value indicates the name of the index applied to an attribute. "indexisunique": this is a Tagged Value that defines a uniqueness condition that groups both the index field and the symmetric role of the owner in a "map" relation. When such a unique condition is applied only one collection item is returned for each possible value of the indexed field. When no unique constraint is applied, more than one item can match each possible value of the indexed field. In such case the relation will be invisible and it is impossible to create or update the collection via Palmyra default presentation interface.

i. Dependency Relations Related Elements

For all dependency relations three Tagged Values are mandatory:

"root": indicates the basic class to which the dependent relations belong.

"source": indicates the role of the source relation.

"target": indicates the role of the target relation.

Stereotypes define the type of the required dependency relation:

"sameas": indicates that the target class of the dependent relations are identical.

"in": indicates that the source relation must be one of the collection of the target class.

"contains": indicates that the collection of target relation is included in the collection of source relation.

"exclusive": indicates that at most one of the source and target relation can be set. "or": indicates that at least one of the source and target relations must be set.

"xor": indicates that only one of the source and target relations must be set.

j. SLA Tagged Values

"slaname": This Tagged Value contains the name of the Class that inherits from the Palmyra interface SLAInterface.

"context": This Tagged Value contains the parameters to find the SLA.

k. SOA Stereotypes

"interface": This Stereotype is applicable only on classes having the stereotype 'controller'. For a method which belongs to an 'interface' controller, all the parameters and the return value cannot be an Interface or the CompositeValue, CollectionValue, ListValue and Map Value. This restriction is not applicable for any sub class of the methods. Interface indicates that the methods of this controller can be used by a non-Palmyra application.

"reference": This Stereotype is applicable only on classes having the stereotype 'controller'. Reference indicates that the implementation of this controller method can exist in non-Palmyra application.

l. Other Tagged Values

"orderincode": This Tagged Value is an integervalue giving the order of the specified code within the group of attributes composing the code. This stereotype is related to the stereotype "code".

"alias": This Tagged Value is used for the controller to specify a unique alias to it. It can be useful to call a controller by its alias instead of its full name. A controller can have more than one alias.

"controllername": This Tagged Value is used with the Stereotype "actiondynamicenum". It indicates the controller class name, which contains the method that returns a list of values (enum).

"actionname": This Tagged Value is related to "actiondynamicenum" stereotype. It indicates the method that returns the list of values.

"possiblevaluesformula": This tagged value is applicable on aggregation relations only. Its value must be a valid criteria and it will be used when retrieving the possible values of the relation.

"rounding": this tagged value is applicable on attributes having as type DoubleValue. It's used to specify a rounding type which will be applied to the value of the attribute.

"wordsize": This Tagged Value indicates a number value giving the max length of a word shown in presentation side. It is useful in the search result of a very long string.

"defaultformula": This Tagged Value contains an expression that will be calculated as a default value. "calculationformula": Calculation formulas are used to indicate that a field or a relation is assigned automatically according to a calculation expression. The formula can depend on other fields or relations that are defined in the Entity class. An expression is a list of arithmetical or logical operators, applied on field or relation values, or on results of calling methods defined in Controller class types. If a field or a relation has a calculation formula this means that the value of the field or relation cannot be assigned manually at runtime.

"calendarp-ath": This Tagged Value contains the full path of the business calendar.

"c rpath": This Tagged Value contains the full path of the currency class.

domainmanager": This Tagged Value contains the full path of the java class that implements the interface DomainManager.

"active": The Tagged Value active is set as true when a field is in focus. It will be refreshed each time this field loses focus.

"ownerclassname": This Tagged Value must be specified when the type of the field is KeyNameValue, CriterionValue or ExpressionValue. It will contain a reference of the owner class for the key.

"ownerclasspath": This Tagged Value must be specified when the type of the field is KeyNameValue, CriterionValue or ExpressionValue. It will contain the full path of the owner class for the key.

"BusinessTaggedValue" This is a special Stereotype defined by the Business Team. All defined Tagged Values under this Stereotype will be shown in the Tagged Value subcategory BusinessTaggedValue for all the UML elements such as Class, Field, Relation End, Interface.

"storename": This is a Tagged Value in which the user can specify a logical store name. This one is used to store the value of an attribute having as type FileName or one of its subclasses. The user can associate a specific storage to every storename using the Setup tool. The storage can be a folder or a remote storage service, such as ftp.

"fieldconfig": This Tagged Value is used to specify the configuration related to a class that realize the interface HasIncompleteState. The user can select a list of fields related to the selected entity.

"descriptionkeys": This Tagged Value allows the user to specify the list of keys that describe the entity. In the presentation side, the list of keys specified in this Tagged Value will be used to present the entity. "oriarget": The user can use this Tagged Value to define an 'or' dependency between the current field and another field in the same entity or in another one with a relation.

"xortargef: The user can use this Tagged Value to define an 'xor' dependency between the current field and another field in the same entity or in another one with a relation.

"exclusivetarget": The user can use this Tagged Value to define an 'exclusive' dependency between the current field and another field in the same entity or in another one with a relation.

m. Palmyra Types i. Palmyra Simple Types

Palmyra Simple Types have the capability to personalize tuning according to business needs. The user can define his own type, inherited from a simple type, and add the attribute (with Stereotype "attr") with the appropriate value of his required toning. TABLE 3 lists Palmyra Simple Types.

TABLE 3

Palmyra Simple Types

| Attribute name | Attribute Type | Description |
| --- | --- | --- |
| StringValue and its subclasses | | |
| Max | Integer | max length of the string. |
| Mask | String | mask on the contents of the StringValue instance. |
| NumberValue and its subclasses | | |
| Min | Number | Minimum valid value for the numeric number represented by subclasses of NumberValue. |
| Max | Number | Maximum valid values for the numeric number represented by subclasses of NumberValue. |
| Precision | int | The number of digits after the float point, which will be saved in the database. Palmyra default value is 6. |
| defaultformat | string | It is the format used to input and output the value of the Number object. The format must be the supported pattern in Palmyra (java standard patterns). Palmyra default value is "###0.######; ###0.######" |
| AmountValue | | |
| Min | Number | Same as NumberValue |
| Max | Number | Same as NumberValue |
| Precision | int | A default value = 8 is mandatory |

TABLE 3-continued

Palmyra Simple Types

| Attribute name | Attribute Type | Description |
| --- | --- | --- |
| | | QuantityValue |
| Min | Number | Same as NumberValue |
| Max | Number | Same as NumberValue |
| Precision | int | A default value = 16 is mandatory |
| defaultFormat | String | It is the format used to input and output the value of the Number object. The format must be the supported pattern in Palmyra (java standard patterns). Palmyra default value is "###0.######; ###0.######" |
| | | DateValue and its subclasses |
| max | Date | The maximum date allowed |
| min | Date | The minimum date allowed |
| precision | String | The precision allowed is one of the following: DAY, MONTH, YEAR, HOUR, MINUTE, SECOND, MILLSECOND. When using this precision in the UML the related data will be saved with the defined precision in the database. |
| defaultFormat | String | It is the format used to input and output the value of the Date object. The format must be the supported pattern in Palmyra (java standard patterns). There is no relation between the precision and the format but it is recommended that you use the format compatible with the chosen precision. Palmyra default format is MILLSECOND. |
| | | BusinessDate |
| min | Date | Same as Date type |
| max | Date | Same as Date type |
| precision | String | A default value = DAY is mandatory |
| defaultFormat | String | Same as Date type |
| | | UserDate |
| min | Date | Same as Date type |
| max | Date | Same as Date type |
| precision | String | Same as Date type |
| defaultFormat | String | Must be set by the regional settings configuration | ii. Palmyra Specialized Types

Specialized typos are provided by Palmyra in order to allow the implementation of specific functions. These types include entity types and interfaces. TABLE 4 lists Palmyra Special Types.

TABLE 4

Palmyra Special Types

| Status | Type of attribute representing a Lifecycle Status |
| --- | --- |
| AbstractValue | A type used to define a persistent object. It is equivalent to the "entity" Stereotype. |
| CompositeValue | A type used to define a non persistent object |
| Value | An interface used to define a non persistent object. |
| Historicized | An interface allowing enabling histerization of the entity implementing it |

C. Process Diagram

The process diagram is uniquely created using state diagram modeling techniques where specific predefined decorations are applied to provide unique functionality allowing the system to interpret the diagram and to run the process later at runtime. The specific predefined decorations are uniquely created Tagged-Values and Stereotypes designed to facilitate the creation of the target software application.

A process diagram represents a Process Definition. A Process Definition lists what happens between the start and end points. It includes all the activities performed by the system and the users. A process comprises a number of steps. Using the state diagram modeling technique, the steps are expressed by states, and their interconnectivity is expressed by transitions. Two predefined states are used to define the start and the end of a process. The transitions between states can be triggered by events and guarded by conditions. One event may trigger multiple transitions defined in a specific order. When a first condition is satisfied, the process moves to the next step defined by the transition having that satisfied condition.

States are classified into two types, persistent and non persistent. The persistent steps are checkpoints in which the process may stop waiting for an external event, and non persistent steps represent activities carried on by the system.

1. Process Decoration List

Decorations for process diagrams provide additional information for elements like states and transitions. Here also, the decorations are categorized into Tagged Values and Stereotypes.

a. Tagged Values

Tagged Values are properties given to elements like interfaces, classes, relations, and fields. Tagged Values can be mandatory or optional. All specific Tagged Values (defined in a specific model of a target application) are optional. Once a Tagged Value is added to an element, a value should be assigned to that Tagged Value. An example of a Tagged Value is the Calculation Formula. When a Calculation Formula is added to a field, an expression is assigned as a value to that Calculation Formula.

Analogously to Tagged Values in class decorations, Tagged Values in process decorations are properties given to elements like states and transitions. Tagged Values can be mandatory or optional. No specific Tagged Values can be defined in a specific model of a target application. Once a Tagged Value is added to an element, a value should be assigned to that Tagged Value. An example of a Tagged Value is the Order applied to the transitions. A number like 1, 2, 3, etc., is assigned to this Tagged Value in order to express the order, b. Stereotypes Stereotypes are also properties given to elements. Unlike the Tagged Values, no values are assigned to Stereotypes when they are used. The target Stereotype merely expresses that a value is desired. For example the Constrainable Stereotype, when added or assigned to an Entity class type, informs the system that constraints could be added to that Entity class type later at runtime.

Here also, analogously to Stereotypes in class decorations, Stereotypes are properties given to elements such as states and transitions. No values are assigned to Stereotypes when they are used. The target Stereotype merely expresses that a value is desired. For example, the Persistent Stereotype, when added or assigned to a state, informs the system to stop the process in that step and causes it to wait for an event.

2. Use Case Transition Diagram

The use-case transition diagram is uniquely created using state diagram modeling techniques where specific predefined decorations are applied to provide unique functionality allowing the system to interpret the diagram and to create use-case actions to be used at run time. The specific predefined decorations are uniquely created Tagged-values designed to facilitate the creation of the target software application.

A use-case transition diagram represents an interaction scenario between the system and a user through the user interface. The interaction scenario consists of a group of use-cases represented by states in the state diagram, and the interconnectivity between them is expressed by transitions. At runtime the use-cases are represented by the user screens and the transitions are represented by actions like buttons displayed on the screen. By clicking on those buttons the system displays another screen determined by the transition represented by the button.

Decorations for use-case transition diagrams provide additional information for elements like states and transitions. The decorations for use-case transition diagrams are limited to Tagged Values only. An example of a Tagged Value is the Action name, which when added to a transition gives a label to the button to be displayed later on the screen.

3. Use Case Diagram: Palmyra UML Designer tool used the state diagram modeling techniques in order to create the UML Use Case Diagram. It allows the definition of use cases, navigation between use cases and definitions of actions to be allowed by use case at design time. The generation tool will use this design to generate the registration code relative to all of the defined use cases and actions. The designer can define all actions by a simple drawing of use cases and the different action that is allowed for each use case.

Figure 11:
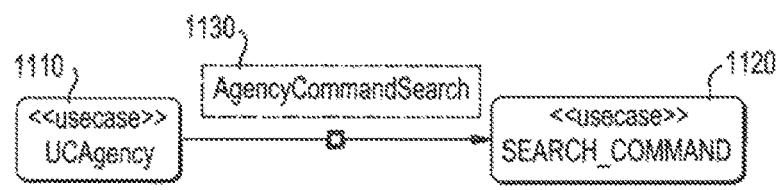
FIG. 11 shows the action handler "Agency Commands search" that is registered in the use case "UCAgency.

A new submenu, "Palmyra UCs Diagrams" 620 is added to the UML Designer named Diagram menu 600 (FIG. 6). This diagram allows the designer to draw his own use cases and to define the different actions allowed for it. The user can create this diagram by simple click to the menu in the item "Palmyra UCs Diagram." (FIG. 6). After creating the new diagram the user can add manually the Stereotype "usecase" to it. After that the designer can add his specific use cases and actions.

a. Use Case:

The generation tool gives a default name to the use case, for example "USECASE 1." This name can be modified, in this case, to "UCAgency" 1110. (FIG. 11). The user can consult and modify its properties. Here are the descriptions of the fields:

Use Case: Contains the name of the use case.

Class Name: Contains the class on which the use case will be registered, it can be empty, in that case the use case will be registered for any classes.

Super Use Case: Contains the super use case name: It can be the default Palmyra (e.g., edit, searchInput, view, etc.) or the user-defined use cases.

Button Input Configuration: Allows the user to define the information used to prepare the use case.

The user can also fill in some expert information using an expert button provided by the Palmyra UML Designer interface.

Use Case Result: It is a set of parameters that can be returned by this use case.

b. Action Handler:

To create an action handler, the designer must click to the related button in the tool bar. After that he must specify by drag and drop the source and the target use cases. FIG. 11 shows the action handler "AgencyCommandSearch" 1130 that is registered in the use case "UCAgency" 1110. The user can consult and modify the properties of a use case. Here are the descriptions of the fields:

Name: Contains the name of the action handler.

Action Name: By default this contains the identifier of the action, it depend on the action type.

View Order. Contains the order of the action.

Position: Contains the position of the action in the screen, possible values are top, bottom or both.

Navigation Type: Indicates the type of the navigation between the source use case and the target use case.

To Be Overridden: Indicates whether the programmer is allowed to override some methods of the action handler.

Button Show Expert: Shows the action handler advanced information.

If the user is expert in the action properties information, he can click to the button "Show Expert" to customize some properties.

The fields of the context are as follows:

Action Type: represent the type of the action:

Technical: The actions of this type aren't visible;

Submission: The actions of this type are represented in the view;

RowOperation: The actions of this type are represented for each row in a collection;

ColumnOperation: The actions of this type are represented for each column in a collection;

TableOperation: The actions of this type are represented in the header of collection, the navigation actions (next, last) belong to this type Action Name: This field contains the identifier of the action when the action type is submission. It contains the name of role.

Class Name: This field contains the name of the class that this action will register.

Use Case: This field contains the name of the source use case.

In Collection: This field indicates whether or not the action will be executed from collection.

A separate screen shows the target information, which is related to the target use case:

Navigation Type: After executing the action, this property indicates whether the application will stay or move forward to the new page.

On Return Action: The name of the action that will be executed when returning from the target use case.

On Return Action Type: The type of the action that will be executed when returning from the target use case.

Action Type: represent the type of the action:

Technical: The actions of this type aren't visible

Submission: The actions of this type are represented in the view

RowOperation: The actions of this type are represented for each row in a collection ColumnOperation: The actions of this type are represented for each column in a collection TableOperation: The actions of this type are represented in the header of collection, the navigation actions (next, last) belong to this type Action Name: This field contains the identifier of the action.

Class Name: This field contains the name of the class of the target use case.

Use Case: This field contains the name of the target use case.

In Collection: This field indicates whether or not the destination use case is for collection.

The user can modify the appearances of the action by modifying parameters, such as:

Key: The identifier of the view.

Label Key: The key of the label within the labels resource file.

Label Provider: The full path of the provider to get the labels resource file.

Image Src: the name of the image.

Confirmation Message Key: The key of the confirmation message within the confirmation message resource file.

Confirmation Message Provider: The fall path of the provider to get the confirmation message resource file.

Access Key: Key board short cut.

Figure 12A:
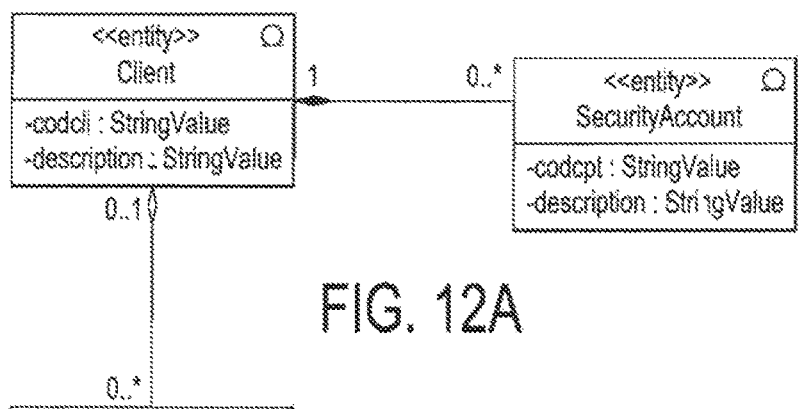
" FIG. 12A is an exemplary Palmyra class diagram that demonstrates the use case diagram wizard.

Access Key Provider: The full path of the provider to get the access key resource file Collapse Current Screen: Specify whether the screen must be collapsed or no after the execution of the action c. Wizard Use Case:

The preferred embodiment provides another method to generate the use case diagrams by using the WIZARD method. With the UML Designer, the designer can define a wizard by a simple drawing of use cases and the different action that is allowed for each use case. FIG. 12A illustrates an exemplary Palmyra class diagram that demonstrates how the wizard works.

When a new diagram is added to the UML Designer named Palmyra Wizard Diagram 630 (FIG. 6), this diagram allows the designer to draw his own wizard and the different step of the wizard. The user can create this diagram by simple click to the menu in the item 'Talmyra Wizard Diagram" 630 (FIG. 6).

After creating the new diagram, the UML Designer tool automatically adds the Stereotypes "usecase" and "wizard". The user gives a name to the new diagram, and this name will be at the run time the name of the menu item under the menu "Wizard." Next, the designer can add his specific steps (FIG. 12B).

Figure 12B:
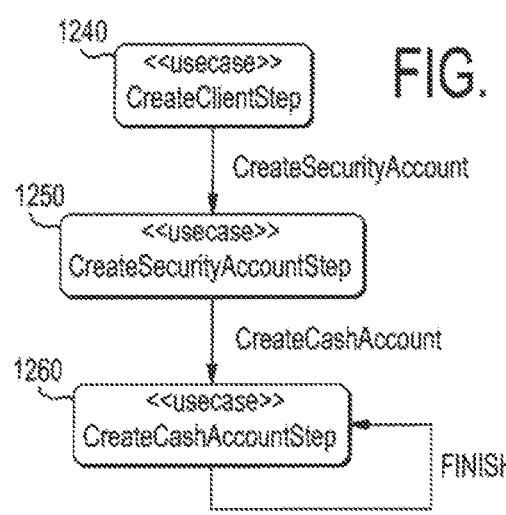
FIG. 12B is an exemplary Palmyra use case diagram wizard with three steps.

In the example of FIG. 12B, there is a wizard with three steps. The first step allows the user to create a client, "CreateClientStep;" 1240 the second step allows the user to create a security account "CreateSecurityAccountStep" 1250; and the last step allows the user to create a cash account 1260.

After creating a use case by clicking on the related button in the tool bar, the user can put this use case in his preferred position by drag and drop. By default, the tool gives a name to the use case for example "USECASE1." This name can be modified, for example the use case can be called "CreateClientStep" 1240.

The user can consult and modify the properties of the use case. Here are the descriptions of the fields:

Use Case: Contains the name of the use case.

Class Name: Contains the class on which the use case will be registered. The field cannot be empty. Input Parameters: A set of parameters that are used by this use case for filling fields. The user can add more than one parameter in the related grid. This grid contains two columns, as follows:

(1) Key Name: The keyname of the value or the context in case of the SLA;

(2) Formula: Contains the formula that will be evaluated of the related Key Name Output Parameters: A set of parameters that represent the result of the current step.

The user can add more than one parameter in the related grid, The evaluations of the output parameters are done before the input parameters. This grid contains two columns, as follows:

(1) Key Name: The key of a global map of all the wizards steps;

(2) Formula: Contains the formula that will be evaluated of the related Key Name. After the design the user must validate the project with the button "Validate Palmyra Project" and then save the UML with the button "Save Generated UML". Finally, in Palmyra Generation tool, the user loads the generated UML and generates the java classes related to his model.

d. Wizard Action Handler:

To create a wizard action handler the designer must click to the related button in the tool bar. After that he must specify by drag and drop the source and the target wizard use cases.

FIG. 12B shows the action handler "CreateSecurityAccount" 1250.

The user can consult and modify the properties of the action handler by double clicking. Here are the descriptions of the fields:

Name: This field contains the name of the action handler.

Action Name: This field can have four different values:

(1) Next: When the Action Name is Next, this action performs the action save and then evaluates the parameters and finally sets them to the next value;

(2) viewSLA: When the Action Name is viewSLA, this action constructs a context from the parameters and does a search of the SLA;

(3) createNewSLA When the Action Name is createNewSLA, this action creates a new SLA with the result of the evaluation of the parameters; finish: When the Action Name is finish, the action terminates the wizard. Position: This field contains the position of the action in the screen. To Be Overridden: The value stored at this field indicates whether the programmer is allowed to override some methods of the action handler.

Input Parameters:

The user can add more than one parameter in the related grid. This grid contains two columns, as follows:

(1) Key Name: The key name of the value or the context in case of the SLA;

(2) Formula: Contains the formula that will be evaluated of the related Key Name.

Output Parameters: The user can add more than one parameter in the related grid. The evaluations of the output parameters are done before the input parameters. This grid contains two columns, as follows:

(1) Key Name: The key of a global map of all the wizards steps;

(2) Formula: Contains the formula that will be evaluated of the related Key Name.

After the design the user must validate the project with the button "Validate Palmyra Project" and then save the UML with the button "Save Generated UML". Finally, in Palmyra Generation tool, the user loads the generated UML and generates the java classes related to his model.

III. Validating

Validation is accomplished by automatic creation and validation, or validation as you go, much like spell checking in word processing documents. In addition, manual project level validation can be implemented. Warning and error notifications are provided for guidance and correction as required.

After the design phase the user can validate the entire project, or some portion, with a single step, or through an interface, provided by the system such as "Validate Palmyra Project". Following validation, the generated UML is saved in a single step, or through an interface, provided by the system such as "Save Generated UML". Using a single step, or an interface, provided by the system such as a Palmyra Generation tool, the user loads the generated UML and generates the java classes related to the model.

IV. Code Generation

A. Palmyra Code Generation Tool

The Palmyra code generation tool is an application that generates an Enterprise Application Archive (Ear) file from a UML model. The generated Ear file is ready to be deployed in an application server. The code generation will include by default in the generated Ear all Palmyra jar files required to deploy an application. The new Ear also includes all the default configurations related to the folder XML of Palmyra. Palmyra generation tool can generate the java classes related to the UML model of the application and the interfaces related to the controllers. The system can also show a list of Generation Steps in the Lqgs part of the user graphical interface.

1. Select Palmyra Application Screen

The first step of the code generation is to create a new Enterprise Application Archive (Ear) file or select an existing Ear file.

a. Create a New Application

Figure 13A:
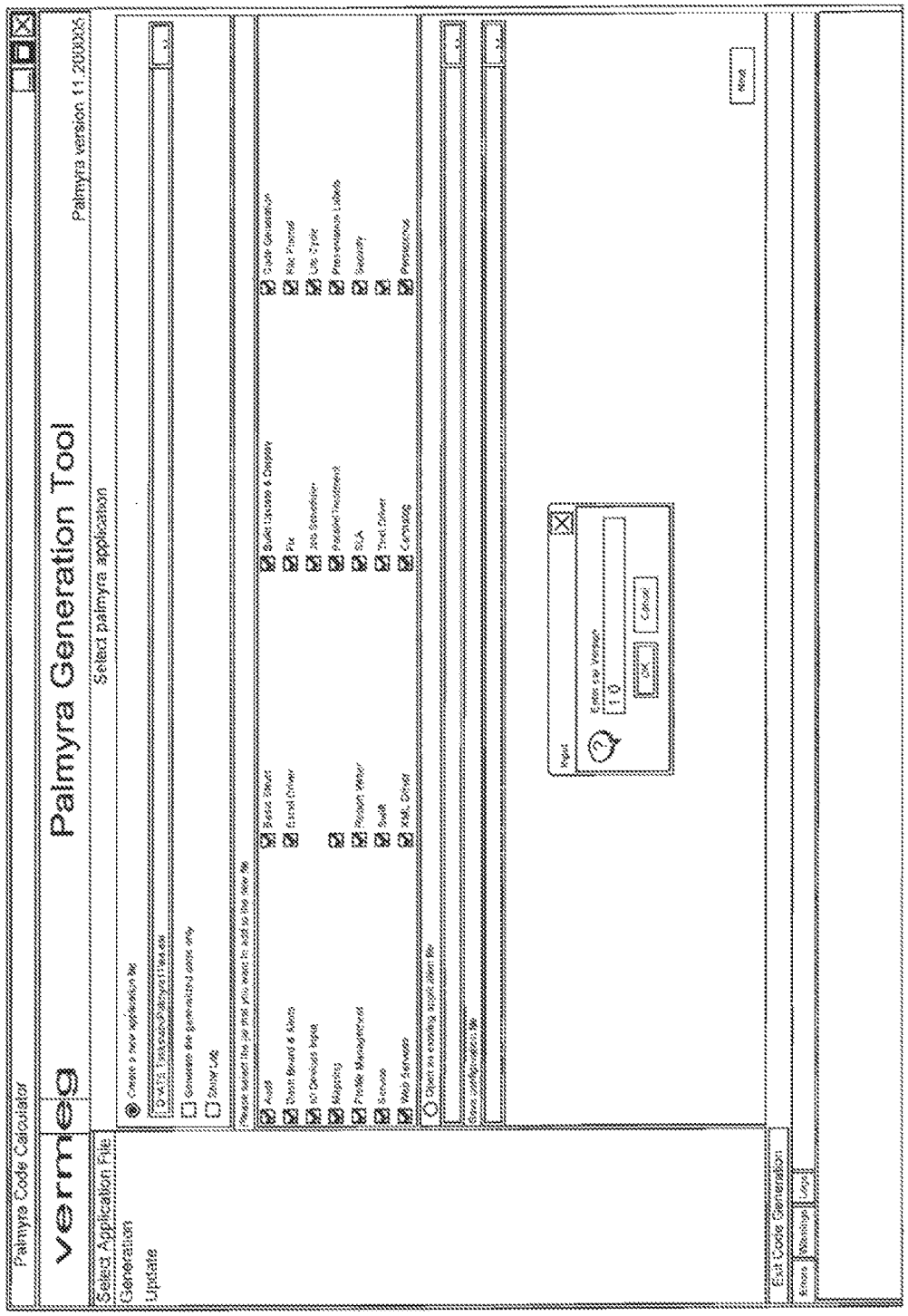
FIG. 13A illustrates creating new application using Pahnyra generation tool.

This option allows the creation of a new Ear in a folder specified by the user. This new application contains the default services and configurations (FIG. 13A). The code generation will include by default in the new Ear all Palmyra jar files required to deploy an application. The new Ear includes also all the default configurations related to the folder XML of Palmyra.

There are two other settings for the generation.
Generate the generated code only: If this option is selected, the code generation will generate only the java classes related to the UML model of the application and the interfaces related to the controllers.

Show Log: If this option is selected, the system will show the list of Generation Steps in the Logs part of user graphical interface.

When the user select the path of the new ear file to generate, then press the Next button, he will enter the version of the ear. When he presses OK, the new ear will be generated in the specified path. FIG. 13A illustrates creating new application using Palmyra generation tool.

b. Open an Existing Application

When the user selects the option to open an existing application, he must first select the old Ear in the system folders. Then the user selects the next button to go to the screen of Generation or the screen update. Save Configuration File: If the user needs to save all the configuration steps, he must specify a path for the configuration file that contains the related properties:

earPath: The full path of the Ear file.
sharedPack: A string holding the list of shared packages separated by commas. For example: com.pahnyra.arch.broker, com.palmyra.arch.devices.input, com.palmyra.arch.devices.output, com.pahnyra.arch.niapping, . . . .
 generate JavaDoc Can be set to true or false.
 is Creation: Indicates whether the file is a creation of new Ear or an update of an existing one.
 prefix: The name of the prefix if one exists, else it is set to an empty string.
classPath: The list of Palmyra jars used to compile the generated java classes. listJarWar: List of added jars and wars.
 generationPack; The selected packages to be generated.
 umlFilePath: The full path of the XML file to be generated.
 generatedCodeOnly: If hue, the java classes will be generated and compiled without updating an Ear file.
 verify: If true, the XML file will be verified only without generating any java classes
businessServicesPath: The path of the business services directory that will be added automatically in the ear file.
 sequenceStore: If true, the user can specify her own sequence data store in the Setup side.

2. Generation Screen

Once the user created a new Ear file or chose an existing Ear file, the user can set generation options on the generation screen. Two sub-screens compose the generation screen, one is called UML Source and the other is called Generation Options.

a. UML Source

In the UML Source screen (FIG. 13 A), the user can select the UML file to be generated (mandatory), select the business services path (optional), exclude or include some packages of the application to be generated, and add or remove shared packages. By default, all packages will be generated, and there are no shared packages.

b. Generation Options

Figure 13B:
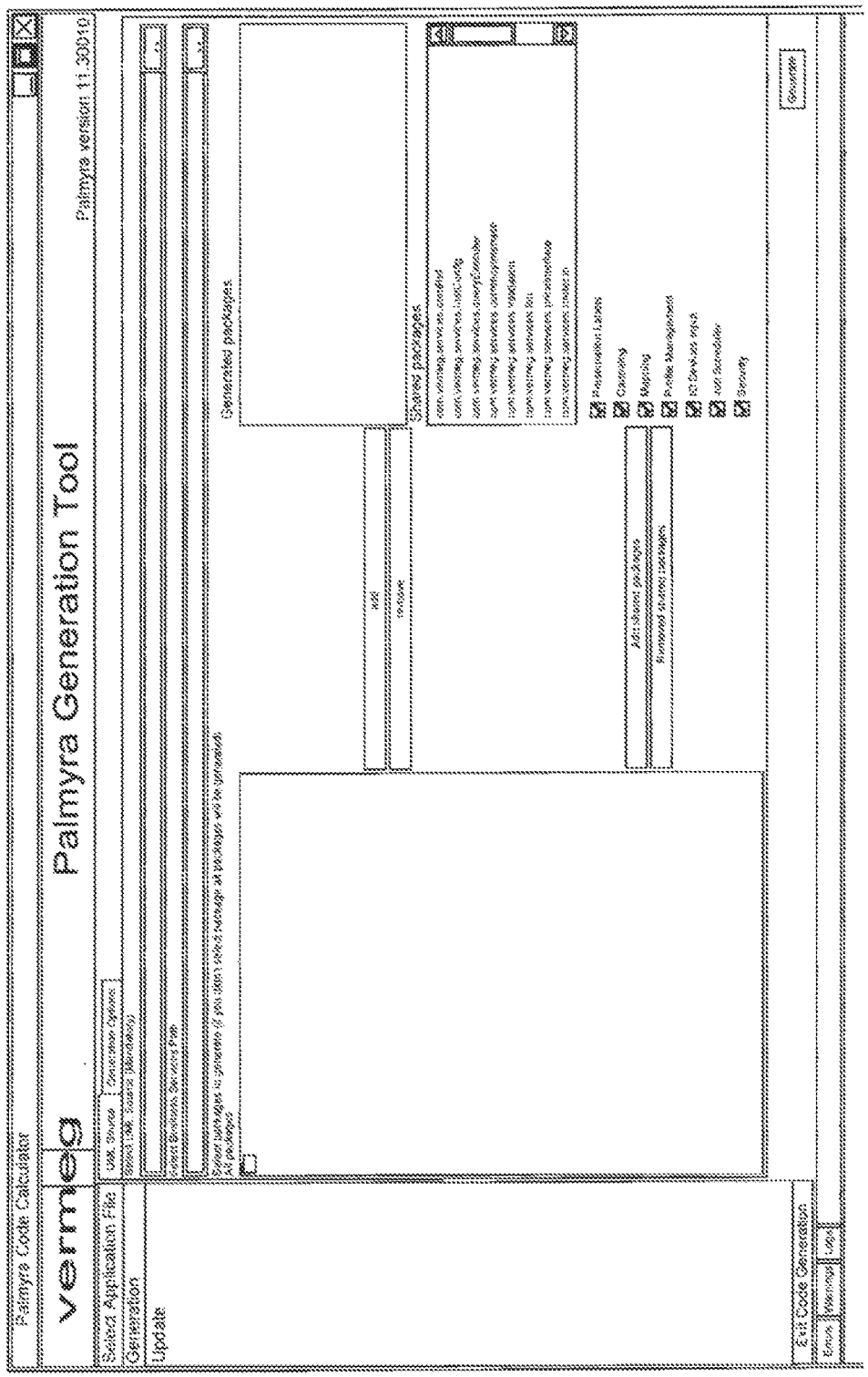
FIG. 13B illustrates generation options using Palmyra generation tool.

In this screen (FIG. 13B), the user can add or remove some jar files mat will be used to compile the generated java classes, and it can check the related options:
Generate JavaDoc. This option allows the generation of the Java Documentation of the generated java classes.
 Configurable Sequence store: This option allows the user to configure the sequence data store in the Setup side.
 Only Verification: If this option is checked, the code generator will check only the validity of the UML model. In this case it will not affect the modifications in the Ear. But when this option is not checked the code generation will affect the new modifications in the Ear. FIG. 13B illustrates generation options using Palmyra generation tool.

3. Update Screen

The update screen provides the user the functionality of updating an existing Ear file. Two sub-screens compose this screen, one is called Services and the other is called Configurations.

a. Services Screen

Figure 13C:
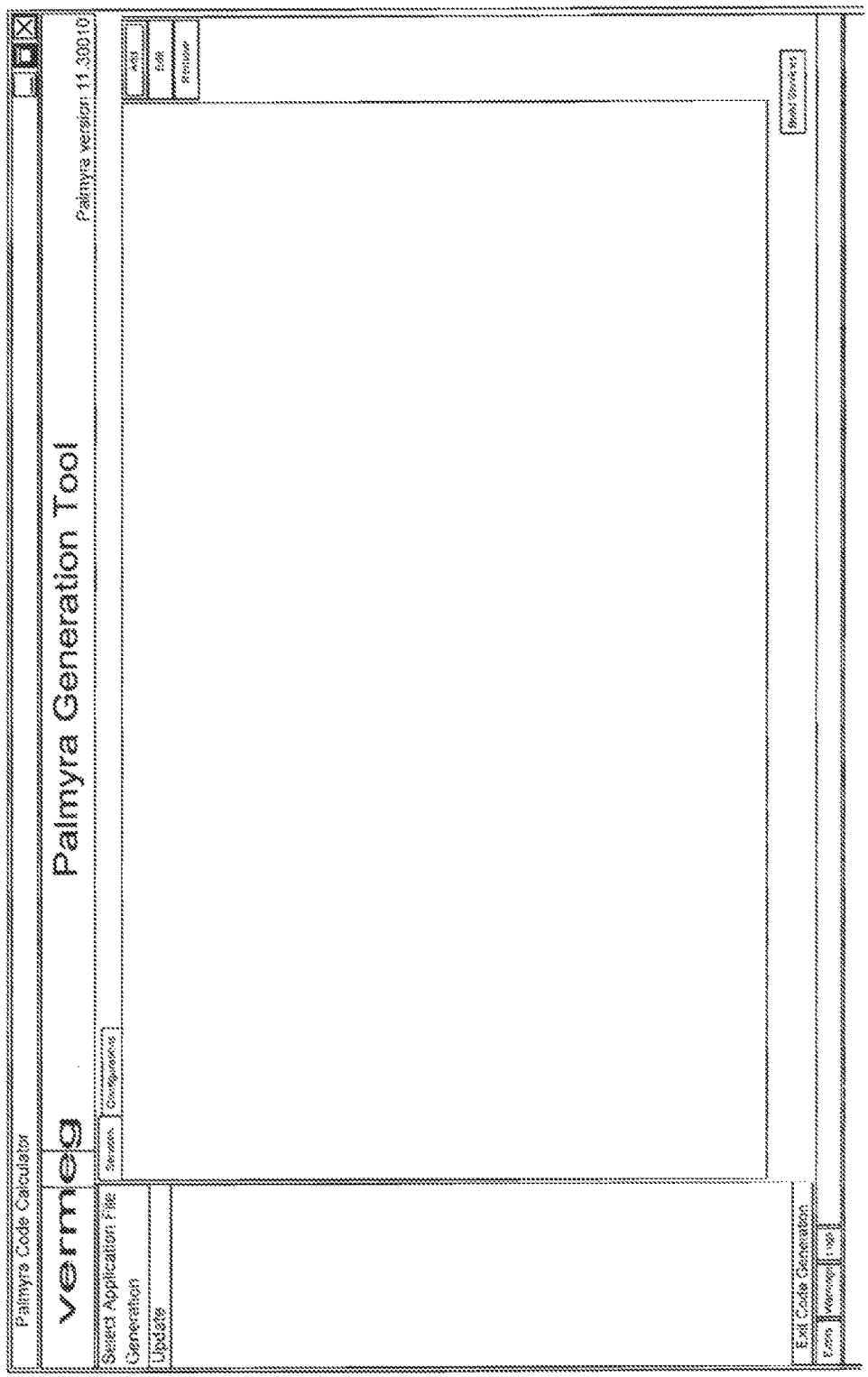
FIG. 13C illustrates screen Services, which is used to add, edit or remove services, the button "Build Services" applies the modifications in the selected Ear file.

The screen Services is used to add, edit or remove services, the button "Build Services" will apply the modifications in the selected Ear file (see FIG. 13C).

b. Configurations Screen

Figure 13D:
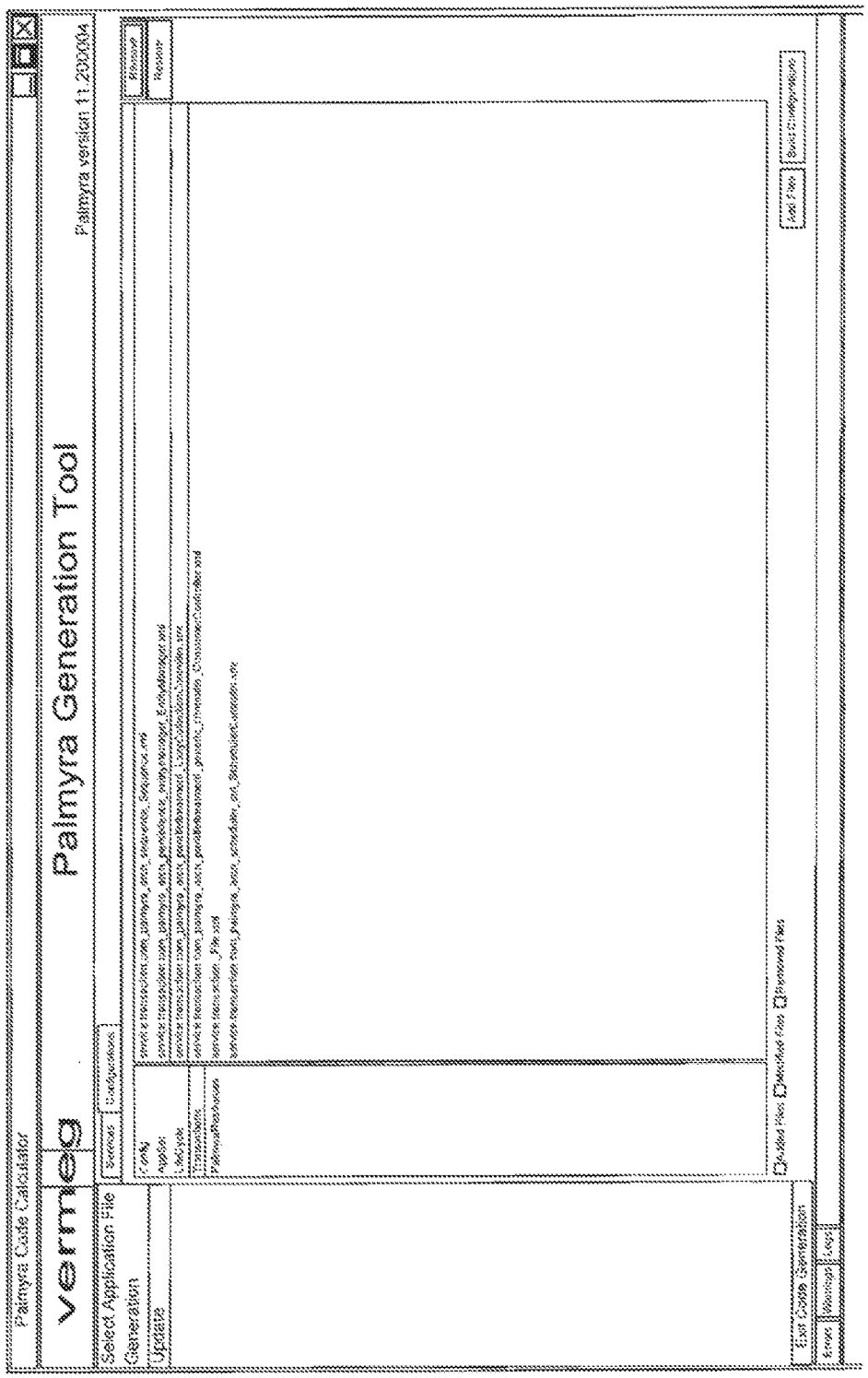
FIG. 13D illustrates configurations options using Palmyra generation tool.

The screen Configurations is used to add, remove, or restore configurations files. It also permits the building of configurations. The user can add or remove the configuration of the view format, application server configuration, labels configurations, life cycle configuration, reports configuration, and transactions configuration (see FIG. 13D). The button remove will remove a selected file from the Ear and the button restore is used to cancel a modification made by the user. When the user clicks on the button 'Build Configuration', all modifications made by the user will take effect FIG. 13D illustrates configurations options using Palmyra generation tool

4. Output Files

Once the generation process succeeds, it generates several files: the ear file; the generate source and lib jars named respectively GeneratedCodeSrcjar and GeneratedCodejar, the folder classes contain the unzipped file GeneratedCodejar; the folder sre contains the unzipped file GeneratedCodeSrc.jar; and the folder MucSrc contains the controllers declared in the UML to be implemented by the programmers.

B. Palmyra Code Generation
1. Palmyra Automatic Code Generation

Figure 14:
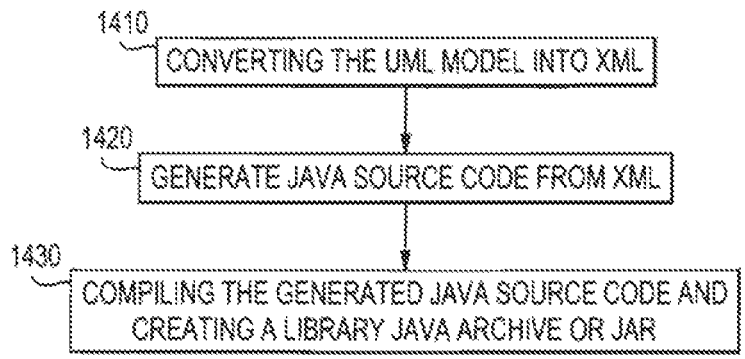
FIG. 14 illustrates the main steps of the automatic generation process.

The Automatic Generation is a way to generate an Ear, generate java classes from an XML file, update the Ear with a list of jars and wars and update the Ear with a list of configuration files without using the Code Generation tool. FIG. 14 illustrates the main steps of the automatic generation process, which comprises: 1) converting the UML model into an XML file 1410, 2) using the XML file to generate Java source code (known as generated source code) 1420, and 3) compiling the generated Java source code using JSDK compiler and creating a library Java Archive or JAR 1430. The converting of UML model into an XML file can be achieved through the use of the Palmyra UML Designer.

Elements:

Code:
 Java classes for the simple types and entities
 Java interfaces for the UML Interfaces
 Abstract controller classes correspond to the controllers (to be manually extended later to provide the implementation of the methods)
 Action handler classes to manage screen-level actions (maybe enhanced by adding manually written code if necessary).

XML Files:
 Constraint model description file: contains the definitions of the constraints to be loaded later in the system at runtime
 Process description files: One for each process contains the definition of the process to be loaded later at runtime.

There are two ways to use the Automatic Generation: a simple call to a static method or using a property file.

a. Using the Automatic Generation with a Call to a Static Method

Using the code generation Tool or processing an automatic generation, the developer has the possibility to generate an ear, generate java classes from an XML file, update the ear with a list of jars and wars and update the ear with a list of configuration files. This document describes the steps performed for every option. The generation is performed using the Automatic Generation. The same scenario is reproduced if the code generation tool is used.

The first way to use the Automatic Generation is to call the static method generateQ in the class AutomaticGeneration.

This method has 19 parameters. The relevant parameters are listed in TABLE 5.

TABLE 5

Palmyra Auto Generation Parameters

File earFile: the ear file that will be created or updated.
String codeGenre iitonPath: the path of the code generation containing all jars of Palmyra. It must contain four directories which are: 'exf, 'extLib', 'xml' and 'lib'. These directories are used in the generation of a new ear.
boolean isCreation: if it is true, a new ear will be created. The new one will contains all jars in the 'exf' and 'extLib' folders. Also, all xml files in the folder 'χιηP will be set to Configs_config.jar and PalmyraRessources.jar.
String umlFilePath: the path of the xml file generated by the UML Designer plug in. this file will be used to generate java files and the ' GeneratedCodejar'.
boolean sequenceStore if it is true, the sequence data store will be configurable. So the user can indicate the data source of the sequence table in the Setup side.
boolean verifyOnly: if it's true, the generated code will not be created, the UML model will be verified only.
String generationPackages this string holds the list of packages that will be generated (separated by a comma). If this string is null, all packages in the UML model will be generated.
String sharedPackages: this string holds the list of shared packages (separated by a comma). This string will be set to the file 'sharedPackages.proper ties' in the
 ' GeneratedCodejar'.
String prefix: string presents the prefix name of the sheared packages.
String version: the version of the ear file. -boolean generatedCodeOnly: if it's true, only the generation of java classes will be done.
String classPath: the classPatli required in the compilation of the generated java classes. If it's null, the class path will be calculated automatically: it will contains all existing jars in the code generation directory.
boolean generatedJavaDoc: if it's trae, the j ava doc of the generated j ava classes will be created. A new jar will be generated: 'GeneratedCodeLib.jar' .
String businessServicesPath: the path of business services jars that will be added automatically to the ear. Only the jars corresponding to the used modules in the UML will be added. If a there is some missing jars in the specified path, a warning will be wriitten in a log file called ' GenerationWarnings.log' that will be found in the path of the ear.
Collection updatedServices: a collection of Files that contains the list of jars and wars added or updated in the ear.
Collection updatedConfig rationFiles: a collection of Files that contains the list of configuration files that will be added to the ear. Every file will be added to
 iConfigs_config.jar' or 'PalmymRessources ar' switch its name.
String logFilePath: the path of the log file. If it's null, it will take the value
 'AutomaticGeiieration. log'.
String compilerPath: the path of the compiler that will be used (when the usr wants to use a specific java compiler like the compile with a java 1.5 compiler).
String compilerVersion; the version of the compiler that will be used (when the user wants to use a specific java compiler like the compile with a java 1.5 compiler).
The combination of all these parameters allows the developer to execute one or many options:

i. Create an Ear File from Scratch.

If the parameter 'isCreation' equals true and the Ear file is not null, a blank Ear will be created. The list of parameters shown in TABLE 6 represents an example of this option:

TABLE 6

Exemplary Parameters for creating an ear file from scratch

String earFilePath = "D:/Test/Test.ear";
String codeGenreationPath = "D:/PALMYEA11.2 / codeGeneration";
boolean isCreation = true;
String umlFilePath = null;
boolean sequenceStore= false;
boolean verifyOnly = false;
String generationPack = "";
String sharedPack = "";
String prefix = "";
String version = "1.0";
boolean generatedCodeOnly = false;
String classPath = null;
boolean generateJavaDoc = false;
String businessServicesPath = null;
Collection updatedServices = null;
Collection updatedConfigurationFiles = null;
String logFilePath = "D :/BUG.log";
String compilerPath = null;
String compilerVersion = null;

AutomaticGeneration. generate (new File(earFilePath), codeGenerationPath, isCreation, umlFilePath, sequenceStore, verifyOnly, generationPack, sharedPack, prefix, version, GeneratedCodeOnly, classPath, generateJavaDoc, businessServicesPath, updatedServices, updatedConfigurationFiles, logFilePath, compilerPath, compilerVersion);

If the parameter codeGenerationPath is null or an empty string, it will be set to the parent of the project directory. In any case, the codeGeneration directory usually contains the following folders:

xml: contains the xml files used for service configuration,
ext: contains the Palmyra jars
extLib: contains external libraries. As previously mentioned, the ext directory contains all the Palmyra Jars required to install, to deploy and to use a generated application within the framework Palmyra. The picture below shows the content of the ext directory.

Unlike the ext directory, the extLib folder includes only non Palmyra Components. Such components are used by the framework for certain goals (For example, to parse an XML document or to manage templates).

The following picture shows the content of the folder extLib.

The xml folder contains the xml configuration files used by some of the framework components. The most commons are used to configure the presentation labels and view formats.

The object of this part of the document is to show how to create an ear without generating a GeneratedCode.jar or updating the ear because all parameters umMlePath, updatedServices and updatedConfigurationFiles are null. By the call of the method:

AutomaticGeneration. generate (new File (eeirFilePath), codeGenerationPath, isCreation, umlFilePath, sequenceStore, verifyOnly, generationPaclc, sharedPack, prefix, version, GeneratedCodeOnly, classPath, generateJavaDoc, businessServicesPath, updatedServices, updatedConfiguration-Files, logFilePath, compilerPath, compilerVersion, hasJsf, excludedSharedPack);

The parameter applicationName provides the name of the earfile without the extension ". ear". In this example applicationName="Essai"

The following steps are performed:

Step 1: Creation of the Temporary Folders

Create the directory TMP under the codeGeneration folder. In this example, TMP will be placed under:
"D:\Projects\PALMYRA11.0\FRAMEWORK\build\-out\codeGeneration".

In this new directory, we copy all the contents of the directories ext and extLib folders (those under the codeGeneration directory).

Create the directory Workingfolder under the codeGeneration folder.

Create the directory unEar under the new directory Workingfolder.

Create the directory basedir under the directory unEar.

Create the directory META-INF under the directory b sedir.

Create the directory config under the directory unEar.

Step 2: Building the Application Files

Copy the xml file "application-xml" of the current directory (under the package "com.palmyra.tools.builder") to the new directory config (codegenenration^worldng-Folder/uriEar/config).

The copied xml file will be parsed then the ignored lines (starting with "<!") will be removed. The values of the nodes "display-name" and "context-root", will be set to the value of applicationName (in this example "Essai") and the value of the node "web-uri" will be set to the earFile name (in this example: "Essai. ear").

The "application.xml" file is a deployment description for the J2EE application. This be located in the top level META-IF directory.

Copy the XML file "ibm-application-ext.xmi" of the current directory (under the package "com.palmyra.tools.builder") to the directory config and remove also the ignored lines. For the new-copied file, we focus on every item named "xmi: type" under any attribute of any element called "moduleExtensions". If we find an item which value is "applicationext: ebModuleExtension", we change the value of the attribute "aif oot" to "ALT-INF/"+applicationName+ ".war".

Copy the XML file "jboss-app.xml" of the current directory (under the package "com.pahnyra.tools.builder") to the directory config. For the new-copied file, we set the value of the node "loader-repositoryfocus" to "com.vermeg.services:loader=<applicationName>.ear".

The modified xml file will be then copied to the directory workingFolder/unEar/basedh/META-T F. The utility of such file is to isolate the class loader of every application by configuring a unique domain.

Copy all the modified application files (application.xml, ibm-application-bnd.xmi, ibm-application-extxrni, jboss-app.xml) to the directory workingFolder/uhEar basedir/META-INF. To this directory, we copy also the file "was.policy" (under the package com.palmyra-.tools.builder).

Create the directory unWar under the directory Workingfolder.

Create the directory config under the directory unWar.

Step 3: Building the web.xml File

Copy the xml file "web.xml" under codegenenration worldngFolder/unWar/coiiflg, for the new copy, the value of the property "display-name" will be set to the value of applicationName. (Remember that applicationName=¾ssai"). The same value will be set to the attribute id under the element "web-app".

Those modifications are shown in the following picture:
Create the directory basedir under unWar.
Create the directory config under Workingfolder.
Create the directory handleConfig under Workingfolder.
Create the eventual directory which will contain the earFile (here, we create the directory "D:\Essai_codegen")
Step 4: Handling the External Folders
Iterate on the contents of the directory TMP:
If the file is a war file:
If it is the war of the ear: its name is the name of the application, we retrieve the versions of wars in the manifest of the war, else (if it is just an added war), retrieve the value of the attribute "earversion" of the manifest file of such war. Then extract the content of such war file to the directory basedir (which is under the directory unWar).
If the file is an ear file:
Extract the content of such ear to the folder basedir (under uriEar), we then iterate on the content of this ear and we do recursively the same thing for the encountered files (ear, jar or war)
If the file is a jar file and if its name is different from "GeneratedCode.jar", it will be copied under the unEar basedir folder.
Create the META-INF directory under the directory unWar.
In this directory, create the manifest file 'MANIFEST.MF'.hi such file, we create the attribute "Created-By"for which we set the value:" Palmyra at <current Date>" and the attribute "Manifest-Version" for which we set the value "1.0". Then, for each retrieved war version, a related new attribute is created.
Extract the content of the jar file: unEar/basedir/service-.jar to the directory unEar/basedir/service.
Step 5: Updating the Unzipped service.jax
Parse the file worlringFolder/Unear asedir/sem^ to look for elements under the node "ejb-name" and which name is like "AsynchronousX", such elements will be renamed to "Asynchronous<applicationName>" (lxi this example "AsynchronousEssai").
For the XML file wor ngFolderUnearAjasedir/service/META-INF/weblogic-. ejb-jar.xml, then the following modifications will be performed:
Every element under "ejb-name" which name is like "AsynchronousX" will be renamed to "Asynchronous<application ame>".
The value of every element under "jndi-name" will be set to applicationName
The value of every element under "local-jndi-name" will be set to "Local <applicationName>".
The value of every node under "connection-factory-jndi-name" will be set to "ApplicationsQueueConnectionFactory".
The value of every node under "destination-jndi-name" will be set to "<applicationName>Pending".
The same modifications as the previous task will be applied to the XML file: urd ar/basedir/service META-INF/jboss.xml except that the value of every node under "destination-jndi-name" will be set to "queue/<applicationName>Pending".
For the XML file workingFolder/unEar/basedir/serviceM-ETA-IF/ibm-ejb-jar-bnd.xmi, under the element "ejbBindings", the eventual value of the attribute "jndiName" will be set to the applicationName and the eventual value of the attribute "listenerInputPortName"will be set to" application Name>ServiceListener".

Step 6: Creation of the Jar File service.jar
From the content of the directory worldngFolder/unEar/basedir/service, we create the jar service.jar having as manifest: orkingFolder/unEar/basedir/service/META-DST/Manifest-mf. Then we delete the folder service.
Step 7: Handling the Configuration Files
Copy all the contents of the folder xml under the codeGeneration directory to the folder worldngFolder/config.
For the XML file workingFolder/config/service.Resource.xml, we perform the following modifications:
The value of the attribute "dataSource" will be set to "DataSource"
The value of the attribute "JmsCormectionFactoryName" will be set to "ApplicationQueueConnectionFactory".
The value of the attribute "LocalJndiName" will be set to "Local<applicationName>"
The value of the attribute "nonXaDataSource" will be set to "<applicationName>NonXaD ataS ource".
The value of the attribute "ServiceQueueName" will be set to "<applicationName>Pending".
Those modifications are shown in the pictures below:
For the XML file workingFolder/config appServersConfig.xml, perform the following modifications:
For all the nodes under the root node: "AppServerConfigurations", focus on the value of the attribute: "initialContextFactory"
If it is equal to '*weblogicJndi_WLinitialContextFactory", set the value of the attribute "securityProvider" to "weblogic".
If it is equal to "orgjnp_interfaces_NamingContextFactory"", set the value of the attribute "securityProvider" to "jboss".
If it is equal to "com_ibm_webs here_naming_WsnInitial ContextFactory" set the value of the attribute "securityProvider" to "websphere".
Step 8: Creation of the Properties Folders Iterate on the Content of the Property File
'Vcom/palmyra/arch/tool/updator/config.properties." For every encountered property, create a new directory having as name the value of this property; the new folder will be created under worldngFolder/handleConfig.
In this example, under the directory:
D:\ProjectsVPALMYRA11^RAMEWOm\bmld\out\-codeGeneration/woridngFolder/handleConfig the following folders will be created:
Configs_config\Labels
Configs_config\Viewformat
Configs_config\AppViewformat
Configs_config\Reports
Configs_config\AppSer
Configs_config\Transactions
Configs_config\LifeCycle
Palmyra esources
Every file under workingFolder/config will be copied, switch its name to a correspondent directory: (a file which name starts by a property name (in the property file: config.properties) will be copied to the created directory having as name the value of this property).
For example, the xml file: appServersConflg.xml will be copied to the Directory: workingFolder/handleConfig/Conigs_config/AppS er.
If the name of the file doesn't much any property name, this file will be copied to the directory: workingFolder/handleConfig/Configs_coiifig
Step 9: Creation of the Config Jar Files
Under workingFolder/handleConfig, we create the directory "META-INF", then, under this folder, we create the manifest file "manifest.mf", in which we put the following attributes:

Manifest-Version="1.0"
Created-By="Pahnyra at <The system date>"
Version="Palmyra:Config:<version>" +
The value of version is given as parameter to the method generate.
This file will be used as manifest for the following jars that will be created:
The jar file workingFolder\unEar\basedir\Configs confi.g. jar that will be created from the content of the directory: workingFolder\handleConfig\Confi.gs confi.g.
The jar file workingFolder\unEar\basedir\ Deployment-Config.jar that will be created from the content of the directory workingFolder\config
The jar file workingFolder\unEar\basedir\ PalmyraResources.jar that will be created from the content of the directory worldngFolder\handleConfig\PahnyraResources.
Step 10: Creation of the War File
Extract the content of the jar file unEar/basedir/webService.jar to the directory unEar/basedir/webservice.
Create the war file <applicationName>.war (in this example: Essai.war) in the directory unEar/basedir from the content of this directory. The Web-Inf directory of the war will contain all the content of the folder unEar/basedir/webservice/com/palmyra/arch/webservice/web except the .class and the .sec files.
Step 11: Creation of the Ear File
We create the manifest file for the ear: workingFolder\unEar\basedir\METAINF\manifest.mf. In this manifest, we fill the following properties:
Manifest-Version="1.0"
Created-By"="Palmyra at <The system date>"
Class_Path=<list of all the jar files under workingPolder/unEar/basedir>
In the directory workingFolder/unEar/basedir, we
Write the manifest for the ear: We recreate the manifest file workingFolder\unEar\basedir\M:ET A-INF/manifest.mf and we fill it with the properties:
Manifest-Version="1.0"
Created-By"="Pahnyra at <System Date>"
Class Path=<list of all the jar files under workingFolder/unEar/basedir>
Under the element Palmyra Version Info, set the attribute version to the value of the parameter version (in this example 1.0).
Then we iterate on the jar files of the folder workingFolder/unBar/basedir, select every file that is not an external jar, so the files listed in Table ## for example will not be selected.
For every selected file, a new attribute under Pahnyra Version Info will be created.
The new attribute will have as name the name of the selected jar file (without ".jar") and as value the last modification date of the selected jar.
Take the jar file commons-codec-1.3 as an example, for this jar the attribute: connnons-codec-1.3 3 will be created having as value the date of the last modification in this jar.
This new manifest file will be used to update the manifest file of the jar service.jar
Create the ear file (in this example: D:\Essai_codegen/Essai.ear from the content of the directory workingFolder/unEar/basedir. This ear will have as manifest the file workingFolder\unEar\basedir\META-INF\manifest.mf and as application file the xml file workingFolder\unEar/con:f:ig/application.xml Delete the folders workingFolder and TMP (under the codeGeneration directory).

11. Generate the Generated Code Only

This option creates an Ear without generating a GeneratedCode.jar or updating the ear 25 because all parameters 'umlFilePath', 'updatedServices' and
'updatedConfigurationFiles' are
null.

In order to generate the 'GeneratedCode.jar' without updating the Ear and without
creating a new Ear, just set the parameter 'isCreation' to false, set the parameter 'umlFilePath'
with the path of the UML file and set the parameter 'generatedCodeOnly' to true.

Further, 'updatedServices' and 'updatedConfigurationFiles' must be null.

The parameters 'sequenceStore', 'verifyOnly', 'generationPack', 'shared.Pack',
'prefix, 'version, 'classPath', 'generate} avaDoc', 'businessServicesPath', 'compilerPath' and
'compilerVersion' are a set of switches for the case of generation.

The GeneratedCode.jar will be created in the root of the earFilePath (if there are no compilation errors). The list of parameters shown in TABLE 7 represents an example of this option.

TABLE 7

Exemplary Parameters for Generating the Generated Code Only

String earFilePath = "D:/Test/Test.ear";
String codeGenreationPath = "D:/P ALMYRAl 1.2 I codeGeneration";
boolean isCreation = false;
String umlFilePath = "D:/Test/test.xml";
boolean sequenceStore= false;
boolean verifyOnly = false;
String generationPack = "";
String sharedPack = 1111
;
String prefix= "a";
String version= "1 .O";
boolean generatedCodeOnly = false;
String classPath =null;
boolean generateJavaDoc =true;
String businessServicesPath = "D:/BS";
Collection updatedServices =null;
Collection updatedConfigurationFiles =null;
String logFilePath = "D:/BUG.log";
String compilerPath =null;
String compilerVersion= null;
AutomaticGeneration.generate (new File( earFilePath), codeGenreationPath,
isCreation, umlFilePath, sequenceStore, verifyOnly, generationPack,
shared.Pack, prefix, version, GeneratedCodeOnly, classPath,
generateJavaDoc, businessServicesPath,updatedServices,
updatedConfigurationFiles, logFilePath, compilerPath, compilerVersion);1

In order to generate the 'GeneratedCode.jar' without updating the ear and without
creating a new ear, the path of the UML file to be generated must be specified in the parameter
'umlFilePath', set the parameter 'is Creation' to false and the parameter 'generatedCodeOnly' to true. Also 'updatedServices' and 'updatedConfiguration.Files' must be null
Additional 5 parameters are listed in TABLE 8:

TABLE 8

Exemplary Parameters for Updating the ear with a list of jars and wars

```
    String earFilePath = "D:/Test/Test.ear";
    String codeGenreationPath = 11D:/P ALMYRAl 1.2 I codeGeneration";
    boolean isCreation =true;
    String umlFilePath =null;
    boolean sequenceStore= false;
    boolean verifyOnly = false;
    String generationPaclc = "";
    String sharedPack = "";
    String prefix= "";
    String version = 111. O";
    boolean generatedCodeOnly = false;
    String classPath =null;
    boolean generateJ avaDoc = false;
    String businessServicesPath =null;
    Collection updatedServices =new ArrayList( );
    updatedServices.add(new File("D:/Test/SmartPosition.jar"));
    updatedServices. add(new File("D :IT est/ statemoni toring.j ar"));
    Collection updatedConfigurationFiles =null;
    String logFilePath = "D:/BUG.log";
    String compilerPath =null;
    String compilerVersion = null;
    AutomaticGeneration.generate (new File( earFilePath), codeGenreationPath,
    30 isCreation, umlFilePath, sequenceStore, verifyOnly, generationPack, sharedPack,
prefix, version,
    GeneratedCodeOnly, classPath, generateJavaDoc, businessServicesPath,
updatedServices,
    updatedConfiguratio11Files, logFilePath, compilerPath, compilerVersion);
    -If the parameter codeGenerationPath is null or an empty string, it will be set to the
parent of the project directory. In any case, the code Generation directory usually contains the
folders xml, ext and extLib (see the paragraph: create an ear from scratch).
    -If the user didn't mention a path for the log file, it will take the value
'AutomaticGeneration.log'.
    -If the parameter classPath is not mentioned (null or""), the class path will be calculated
      automatically: it will contain all existing jars in the code generation directory and all
existing jars
      in the Business Service path if it is mentioned.
    By the call of the method:
AutomaticGeneration.generate (new File( earFilePath), codeGenreationPath, isCreation,
umlFilePath, sequenceStore, verifyOnly, generationPack, shared.Pack, prefix, version,
GeneratedCodeOnly, classPath, generateJavaDoc, businessServicesPath,updatedServices,
updatedConfigurationFiles, logFilePath, compilerPath, compilerVersion), hasJ sf,
excludedSharedPack):
```

The following steps are performed:

Step 1: Creation of the Temporary Folders

Create the directory TEMP under the parent of the earpath, (in this example,

TEMP will be created under: "D:\\Essai_codegen"

From the xml file (given in the parameter umlFilePath), load the object UMLApplication Delete the eventual folders (src and classes) under the parent of earFilePath (in this example, under "D:\\Essai_codegen")

If the parent of the earfile ("D:\\Essai_codegen") doesn't exist, create this directory.

Create the new folder doc under the earfile Parent (in this example "D:\\Essai_codegen\\doc").

Modify the loaded application in order to make it ready for the code generation (See the document Generation Mechanism).

Create me directory ucSrc under the parent of the earFile directory.

Generate the sources for classes and controllers in the directories "src" and "MucSrc" (See the document Generation Mechanism).

Step 2: Creation of the Property Files

Create the property file "datasource.properties" under the src directory .lh this file, the following attributes are defined:

AutotestDataSource

DataSource

SecurityStore

The values of those attributes will be set during the setup.

Create the property file "gcstorename.properties".In this file, the attribute ATFiles will be added.

Create the property file "sharedPackages.properties" under the "src" directory. In this file, we put the prefix mentioned as parameter and a list of shared packages.

Step 3: Compiling the Generated Code

If the compiler version and the compiler path are not mentioned, a default compiler is used having as path the value of the system class path variable. Before performing the compilation task, redirect the compiler's error output to a stream other than the standard error stream so that the compiler's error output can be read into the errors array list.

Then compile all the java sources under the directories "src" and "MuSrc"the" class" files resulting in the compilation will be added under the "classes" directory Step 4: Create the Generated Code and Source Jars.

Prepare the directory "classes" to the jar creation: A list of files have to be deleted from this directory before making the jar. Those excluded files are:

All the non-directory files under "MuSrc"

All the Palmyra classes.

Make the jar file, 'est1.jar" from the content of the directory "classes".

Make the jar file, "Test1Srcjar" from the content of the directory "src".

66—If a businessServicesPath is mentioned, (in this example biismessServicesPath="D:\Projects PALMYBAI 1.0\TECHNICALSE VICES\DtLt\lib")J iterate on the Umlapplication used modules, for each module, look for a jar file having as name (theusedmodulename) Genjar. For example, if the application has the used module "Calendar", look for a file named: "CalendarGeajar" under busmessServicesParh. If the file is found, copy it under the TEMP directory. Repeat the same for a 51e having as name (theusedmodulename)Impl.jar.

Delete the directory T|EMP.

iii. Update the Ear with a List of Jars and Wars

In order to update an Ear, the parameter 'updatedServices' must contain a collection of 'java.io.File' representing the list <f jars and wars to add. If the Ear file does not exist, an exception will be thrown. The list of j parameters shown in TABLE 8 represents an example of this option:

Create the directory "TEMPj under the parent of the ear file (here under D:\Essai_codegen).
Copy all the files of the collection updatedServices under the TEMP directory.

Step 1: Creation of the Temporary Folders

Create the directory AppTemp under CodeGenerationPath
Create the directory workingFolder under CodeGenerationPath—Create the directory ι nEar under workingFolder
Create the directory basedir under unEar
Create the directory config under unEar
Create the directory ι nWar under workhigFolder
Create the directory tjasedir under un War
Create the directory config under unWar Step 2: Building the web.ml File 67 This step is processed the same way as in case of creating a new ear (See the paragraph: create an ear from scratch).

Step 3: Copying the Ear Rile to a Temporary Directory

This step consists on copying the ear file to be updated, to the directory AppTemp under CodeGenerationPath.

Step 4: Handling the External Folders

The content of the copied ear file will be extracted to the directory unBar\basedir. The content of the war file included in this ear will be naturally extracted under unWar baeedir. (See the paragraph: create an ear from scratch).

The content of the TEMP directory (in this example, it only contains the jar file Agendajar) to be added to the ear file) under the directory unEarXbasedir.

In case user updates the ear with the jar file service.jar, the directory service will be created under unBar/basedir in which extract the content of mis added file, and then recompress this content to make a new jar file service.jar.

Step 5: Creating the War File

Create the war file <applicationName>.war (in this example: Essai.war) in the directory unEar basedir from the content of this directory. The Web-Inf directory of the war will contain all the content of the folder unEar^asedk/websemce/com/pal^
except the .sec files.
Iterate on the content of the directory AppTemp (tn this case, this directory contains only the copied earfile).
Open the manifest of the found ear file and look for the attribute "Palmyra Version Info.". If such attribute is not found, an exception will be thrown.

Step 6: Creating the Ear File

Create the manifest of the ear and make the ear file as explained in the paragraph: create an ear from scratch.
Delete the folder workingFolder
Delete the folder AppTemp iv. Update the Ear File with a List of Configuration Files 68 In order to add some configuration files to an Ear, the parameter
'updatedConfigurationFiles' must contain a collection of 'java.io.File' representing the list of files to add. If the Ear file docs not exist, an exception will be thrown. Every configuration file will be set in the 'Configs_config.jar' or almyra essources' switch its name.

b. Using the Automatic Generation with a Property File

The second way to use the automatic generation is to fill a property file with all needed information. The list of parameters shown in TABLE 9 represents an example of this option. It will be passed as the first and only parameter to the main method in the class AutomaticGeneration (the only class in the jar ExternalBuilder jar).

TABLE 9

Exemplary Parameters for Using the Automatic Generation with a property file

```
String earFilePath = "D:/Test/Test.ear";
    String codeGenreatiotiPath = "D:/PALMYRA11.2 / codeGeneration";
    boolean isCreation = true;
    String umlFilePath = null;
    boolean sequenceStore= false;
    boolean yerifyOnly = false;
    String generationPack - "";
    String sharedPack = "";
    String prefix = "";
    String version = "1.0";
    boolean generatedCodeOnly = false;
    String classPath = null;
    boolean generateJavaDoc = false;
    String businessServicesPath = null;
    Collection updatedServices = null;
    Collection u datedConfigurationFiles = new ArrayListO;
    69 pdatedConfigurationPiles.add (new File ("D:/Test/
    service.transaction_File.xmll"));
    updatedConfiguratioiiFiles.add (new File ("D:/Test/
    VF_Presentation_ViewFormat.xml" )) ;
    String logFilePath = "D:/BUG.log";
    String compilerPath = null;
    String compilerVersion = null;
```

TABLE 9-continued

Exemplary Parameters for Using the Automatic Generation with a property file

AutDmaticGeneration.generate (new File(earFilePath), codeGenre'ationPath, isCreation, umlFilePath, sequenceStore, verifyOnly, generationPack, sharedPack, prefix, version, GeneratedCodeOnly, classPath, generateJavaDoc, businessServjcesPath, updatedServices, updatedConfigurationFiles, logFilePath, compilerPath, compilerVersion);
    The properties in this file are:
    ear Path: The path of the Ear file.
    isCreation: Indicates whether the file is a creation of a new Ear or an update of an existing one. True or false (False by default).
    codeGenreationPath: The path of the directory 'CodeGeneration' of Palmyra. If this property has no assigned value, it will be set to the parent of the current directory.
    umlFilePath: The full path of the UML file to be generated by UMLDesigner.
    sharedPack: A string holding the list of shared packages separated by commas.
    prefix: The prefix of the shared packages.
    generationPack: The list of generated packages, separated by commas.
    verify: If true, the XML file will be verified without generating any java classes. (False by default).
    generatedCodeOnly: If true, the j ava classes will be generated and compiled without updating an Ear file. (False by default).
    listJarWar. The list of added jars and wars, separated by commas.
    xmlConfig: The list of configuration files that will be added to the Ear, separated by commas.
    logFilePath: The path of the log file. If this property has no value, it will be set to "AutomaticGeneration.log". sequenceStore: If true, the user can specify his own sequence data store in the Setup side. (False by default).
    generateJavaDoc True or false (False by default).
    b sinessServic sPath: The path of the business services directory that will be added automatically to the Ear by comparing the names of the imported modules in the UML file and
the existing jar in this path.
    compilerPath: The path of the specific compiler (optional).
    compilerVersion: The version of the specific compiler (optional).
    classPath: The class path used in the compilation of the generated code. If it is null, the class path will contains all jars in the code generation directory.

TABLE 10 represents an example property file.

TABLE 10

Exemplary Property File

Create a property file containing these properties:
earPath=D :/test/Test. ear
isCieation=true
codeGenreationPafh- T): Palmyra 11.2 codeGeneration"
umlFilePath=D test testGen.xml
generatedCodeOnly=false
prefix="d"
verify=false
listJarWar= D:/test/SmartPosition.jar, D:/tes1 statemomtoring.jar, D:/test test.jar, D:/test/dashBoard.war
    xmlConfig=D test presentationContext.test.xml :/test/test.xml
    logFilePath= D :Aes1 GenerationLog.log
    businessServicesPath="D:/BS"
    invoke the main method in the class AutomaticGeneration
    - Using Windows console
    > java -jar ExtcanalBuildcr.j ar propertyFileName
    Using a batch file
    path= D:\bea\jdkl41 05Vbin java -Xms256m -Xmx512m -
Xdebug -Xnoagent -
Djava.compUer=NONE - Xranjdwp:trarisport=dt_socket,server ,
address=5051,suspend=n -jar
BxtemalBuilder.jar propertyFileName V. Deploying A. Palmyra Setup Tool Palmyra provides a wizard-like setup tool that aims to automate the process of deploying the generated applications into various application servers like BEA Weblogic, or IBM Websphere, or others It is done to hide the complicated nature of the application servers. This set-up tool also manages the communication with different database providers like Oracle, Microsoft SQL server, or IBM DB2.

When going through the deployment steps using the setup tool, the configuration established by the user can be stored in a file for a future use.

The Palmyra Setup Tool supports a number of operating systems, application servers, and databases, for example:

(1) operating systems: Windows, Linux;

(2) application servers: Weblogic 8.1, Weblogic 9.1, Weblogic 9.2, Weblogic1O.O, JBoss 3.2.x, JBoss 4.0.x, JBoss 4.2.x Websphere 5.1, Websphere 6.x, WebSphere 7.x;

(3) 'databases: Oracle (up to version 10g), DB2, DB2 for z OS, MYSQL (version 4.1.18 or newer), SQL server (versions 2000, 2005 and 2008).

The Palmyra Setup Tool provides wizard-like steps to complete the setup operation.

The first step is the welcome screen. In the welcome screen, the user can find the Options button. Clicking on the Options button brings up the options panel which contains four options: Security data source has different properties, Sequence data source has different properties, Load setup parameter, and Update setup parameter.

The second step is to specify Operating Systems and Application Servers. At this step, the operation system and the application servers can be selected.

Different application servers require varied detailed information. For Weblogic 9.1 and Weblogic 9.2, the username and password of an administration account of Weblogic must be passed. For Websphere 5.1, the server name and. node name must be passed. For Websphere 6.x, the server name and node name and profile name must be passed and the type of the application server (Network deployment or Normal) must be selected.

72 The third step is to specify Application server home directory and JMS Provider. Fox all versions of "Weblogic Application Server, the home directory for the application server and the domain" which will be used and the server name must be passed beside to the JMS provider (MQSeries or Default JMS). For all versions of JBoss, only the domain directory must be passed. For all versions of Websphere, the server home directory and the JMS Provider must be passed.

The fourth step is to specify the Ear path. The path of the Bar to be installed is specified at this step.

The fifth step is to setup User Login Parameters. The username and password of the default account to login into the installed application is entered at this step.

The last step is to setup Data source parameters. All applications need data sources to run successfully, these data sources have parameters which must be passed, for example:

Database type: the type of the database;

Operating system; the operating system on the database machine; Host name: the host name of the database machine;

Database name: the name of database instance;

User name: the database user name to be used;

Password: the password of the username.

The user can test the communication with the specified database by clicking on Test Connection button.

All Palmyra Ears have at least three standard data sources: security store, autotest datasource and data source. In most cases the security store has the same parameters of the data source, so by default the setup tool does not show the security store for entering its parameters, to show it, go to options panel and select the check box "security store has different properties."

Additional options can be specified based on type of application server selected.

For Weblogic, additional options include:

Deploy and configure the application server: install the application into the application sever with all the needed configuration.

Remove the deployed applications: remove all the deployed applications before installing the new application.

73 Remove the JMS file store: remove all the messages from the queues in this application server.

Remove the server cache files: clear the cache in this application server.

Copy the database drivers: copy the data base drivers to this application server. Copy the ant library: copy the ant library to this application server. Update the application server class path: update the application server class path. Setup parameters path: to make the setup operation faster, the setup parameters can be save in a text file, which can be reused later without the need to rewrite them manually.

The user can reuse the generated text file by clicking the button Load Setup Parameters in the option panel, or can update them by clicking the button update Setup Parameters.

VI. Creating Database Structure

A. Creating Database Tables

The database structure is composed of tables having columns, indices and constraints. This structure is created automatically by the system using the metadata created following the design phase according to the classes defined in the UML class diagrams.

The persistence module generates table names from UML classes following this rule:

TableName=lastPackage+'_'+ClassName+

For example, if the full name if the class is a.b.c.d.My-Class, the generated name is d_MyClas s_NB: If generated name exceeds 30 characters, it will be truncated from the beginning the fit the max length (30, constant underscore is included).

For example, if the class name= a.b.c.d.EntityWithLongNameForContractTest, the generated name will be: tyWithLongNameForContractTest_.

Figure 15A:
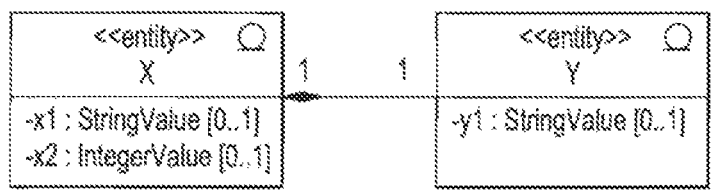
FIG. 15A illustrates an example of Relation One to One.

Relations between Classes are represented. FIG. 15A illustrates an example of Relation One to One. In this example, table X will contain y$code_ and y$pk_, Indexes on y $ code_ and y $pk_ are created (only in case of compositions, for aggregation relations, the UML must indicate so).

Figure 15B:
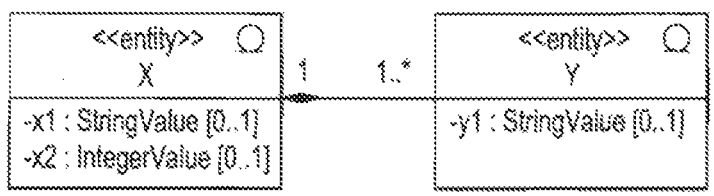
FIG. 15B illustrates an example of Relation One to N.

74 FIG. 15B illustrates an example of Relation One to N. In this example, table Y_ will contain x$code_ and x$pk_. Indexes on x$code_ and x$pk_ are created (only in case of compositions, for aggregation relations, the system must indicate so).

Figure 16:
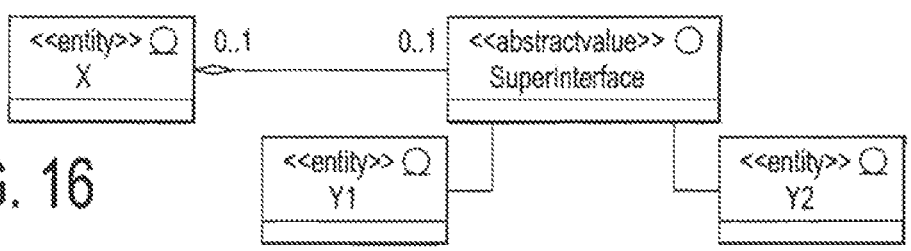
FIG. 16 illustrates an example of relation with interface.

FIG. 16 illustrates an example of relation with interface. In case of aggregation with an interface, in the table related to Class X we add a field superInterf ace$ type_. This field will contain the full name of the class Y1 or Y2.

B: If an instance of X is in relation with instance of Y1, super interf ace$type_ in table X_ will be set to full name of class Y1.

In case of aggregation with multiplicity n with an interface, type_attribute is not added.

The mapping from a class attribute to a table field follows this rule:

Field name=attribute name+'_'

For example: name→name_

In one particular implementation, if generated name exceeds 30 characters, it will be truncated from the beginning to fit the max length (30, constant underscore is included)

For example, if the attribute name=longFieldName For-PersistenceContractTest, the generated name=ameFor PersistenceContractTest_

Figure 17:
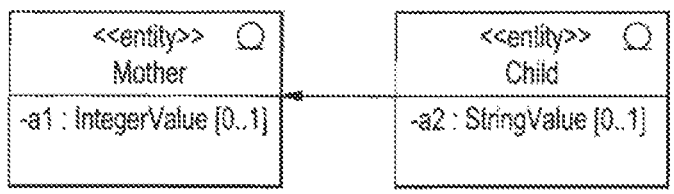
FIG. 17 illustrates an example of an instance of inheritance.

FIG. 17 illustrates an example of Inheritance. The mother_table is created normally (no special treatment). The child_table will contain only pk_field with fields declared on class Child (a2). Every insertion in the table cliild_will be accompanied with an insertion in the table mother_.

Constraints are created according to integrity rules:

The "unique" stereotype on a field F (a unique field) in an entity E will be translated into this following action:

Altering the E_adding a constraint of type unique on F.

The "code" stereotype on a field F (should be mandatory) in an entity E will be translated into this following action:

Adding a constraint of type unique on the field F.

75 The "index" tagged value on a field F in an entity E will be translated into these following action:

Creating an index on that field.

B. Updating Database Tables

The target software application is developed using an iterative process. Through this process, each iteration produces a new version of the software application having more functionalities than the previous versions. Whenever modifications are made on the UML models for each iteration, the database structure should be updated in accordance to the metadata represented by the model. Through this process, the system allows for an automatic update of the database structure without losing previously entered data.

During the development phase of the application, or when upgrading already deployed applications to new versions, the design of the application often changes, and this, in turn, may affect the design of the database. These changes include adding/removing classes to/from the application, or adding/removing field to/from each class, hi order to preserve current data in the storage, the "Update Tables" operation is provided in the persistence service to allow modifying the underlying storage while reducing data loss risks to bare minimum.

In this document, the modifications to be executed while choosing the "Update Tables" option is described.

Adding a new entity in the model (with n attributes) is translated into these following actions:
  Creating the entity's table in the database.
  Adding a primary key constraint on the field pk_
  Adding n+7 records in the FormatData_table, which contains information about all columns of all tables (n attributes with 7 technical fields)

Removing an entity from the model is translated into these following actions:
  No action (The Entity's table is still existing)

Changing the name of an existing entity in the model from E to E2 is translated into these following actions:
  Creating a new table E2_ (the table E_ is still existing)
  76—Performing the same actions described in the previous scenario.

Adding a new field F in an existing entity E is translated into these folio-wing actions:
  Altering the table E_ by adding the new field F.
  Deleting all the entries related to the entity E in the FormatData_table then adding new entries.

Removing a field F in an existing entity E is translated into these following actions:
  No action (NB: if the field was never assigned)."

Changing the name of a field F into F2 in an existing entity E is translated into these following actions:
  Altering the table E_ by adding a new field F2. (F is still existing in the table E_)
  Deleting all the entries related to E in the FormatData_table men adding new entries. (No more record for F, a new record for £2).

Adding a new entity in the model (that contains n attributes) in composition or aggregation with another entity is translated into these following actions:
  Creating the entity's table in the database.
  Adding a primary key constraint on the field pk_
  Adding n+9 records in the FormatData_table (n attributes, 7 technical fields, entity$code and en1ity$pk fields).
  Inserting new records in the ConstraintsData_ for the indexes and the constraints created for this entity. (Next section for more details)

Adding a new relation of type composition or aggregation between two entities will be is translated into these following actions:
  Altering the table which, should have the foreign keys in the database by adding the owner's $code and $pk fields.
  Deleting all the entries related to the table which should have the foreign keys in the FormatData_table men adding new entries. (Including ownerScode and owner$pk)

77 Adding a new relation of type inheritance between two entities will be translated into these following actions:
  No action to execute.

Changing a relation's multiplicity will be translated into these following actions:
  No action to execute if the multiplicity change doesn't change the relation from single-valued to multi-valued or vice versa.
  When the relation nature is changed, the system changes the place of the foreign keys to be in the table mat has the navigable role.

Changing a field's type will be translated into these following actions:
  Alter the concerned table by modifying the field's data-type, such step succeeds if the RDBMS allows it
  Deleting all the entries related to the concerned table in the Forma£Data_table then adding
  new entries.

C. Updating Database Constraints

The database table-constraints are created in accordance with the integrity rules defined in the UML models using field and relation multiplicities. Whenever modifications are made to the integrity rules the table constraints must be updated. The system provides for an automatic update of database constraints when possible. When constraints cannot be updated automatically because the previously existing data does not comply with the new constraints, the system generates a report that facilitates manual intervention. The system provides information such as the tailed constraints.

Sometimes the changes, made to the design of the application, do not include addingremoving classes or fields. Sometimes all you need is to modify the constraints of some fields. In this case there's no need to invoke the "Update Tables" operation. Instead, you can use "Update Constraints" operation.

The generated SQL code to be executed differs from one DBMS to another.

Here details the modifications to be executed after choosing the "Update Constraints" option.

78 Adding the "unique" stereotype to a field F (a mandatory field) in an entity E will be translated into these following actions:
  Altering the E_adding a oonatraint of type unique on F.
  Updating ConstraintsData_ (removing all entries then redefining new entries) Removing the "unique" stereotype to a field F (mandatory) in an entity E will be translated into these following actions:
  Altering the table E_ by removing the unique constraint
  Updating ConstraintsData_

Removing the "unique" stereotype to a field F (non mandatory) in an entity E will be translated into these following actions:
  Altering the table E_ by removing the unique constraint.
  Altering E_ by rendering F nullable
  Updating ConstraintsData_

Adding the "code" stereotype to a field F (should be mandatory) in an entity E will be translated into these following actions:
  Adding a constraint of type unique on the field F.
  Updating ConstraintsData_

Removing the "code" stereotype to a field F in an entity E will be translated into these following actions:
  Removing the unique constraint created on F.
  Updating ConstraintsData_

Adding the "index" tagged value to a field F in an entity E will be translated into these following actions:
  Creating an index on that field.
  Updating ConstraintsData_

Removing the "index" tagged value to a field F in an entity E will be translated into these following actions:
  —Dropping the index created on that field.
  Updating ConstraintsData_

Changing the multiplicity of a field F in an entity E to 1 will be translated into these following actions:
  Altering the table E_ by modifying the definition of F (F is henceforth not null).

Updating ConstraintsData_

Changing the multiplicity of a field F in an entity E from 1 to nullable will be translated into these following actions:

Altering the table E_ by modifying the definition of F (Henceforth, F could be null).

Updating ConstraintsData_

Removing a relation of type aggregation or composition will be translated into these following actions:

Dropping created indexes on the owner$code and owner$pk fields.

Updating ConstraintsData_

Adding a relation of type aggregation will be translated into these following actions:

Adding a unique constraint on owner$pk if the multiplicity is 1.

Updating ConstraintsData_

(NO INDEXES ON FOREIGN KEYS)

Adding a relation of type composition will be translated into these following actions:

Creating indexes on foreign keys

Adding a unique constraint on owner$pk if the multiplicity is 1. —Updating ConstraintsData_

VI Configuration

A. Presentation

1. Menu The target application menus contain all the pathways to the screens provided by ttie application. Each of these menus can contain sub-menus and additional pathways in a tree-like structure.

2. Menu Editor Tool

Figure 18:
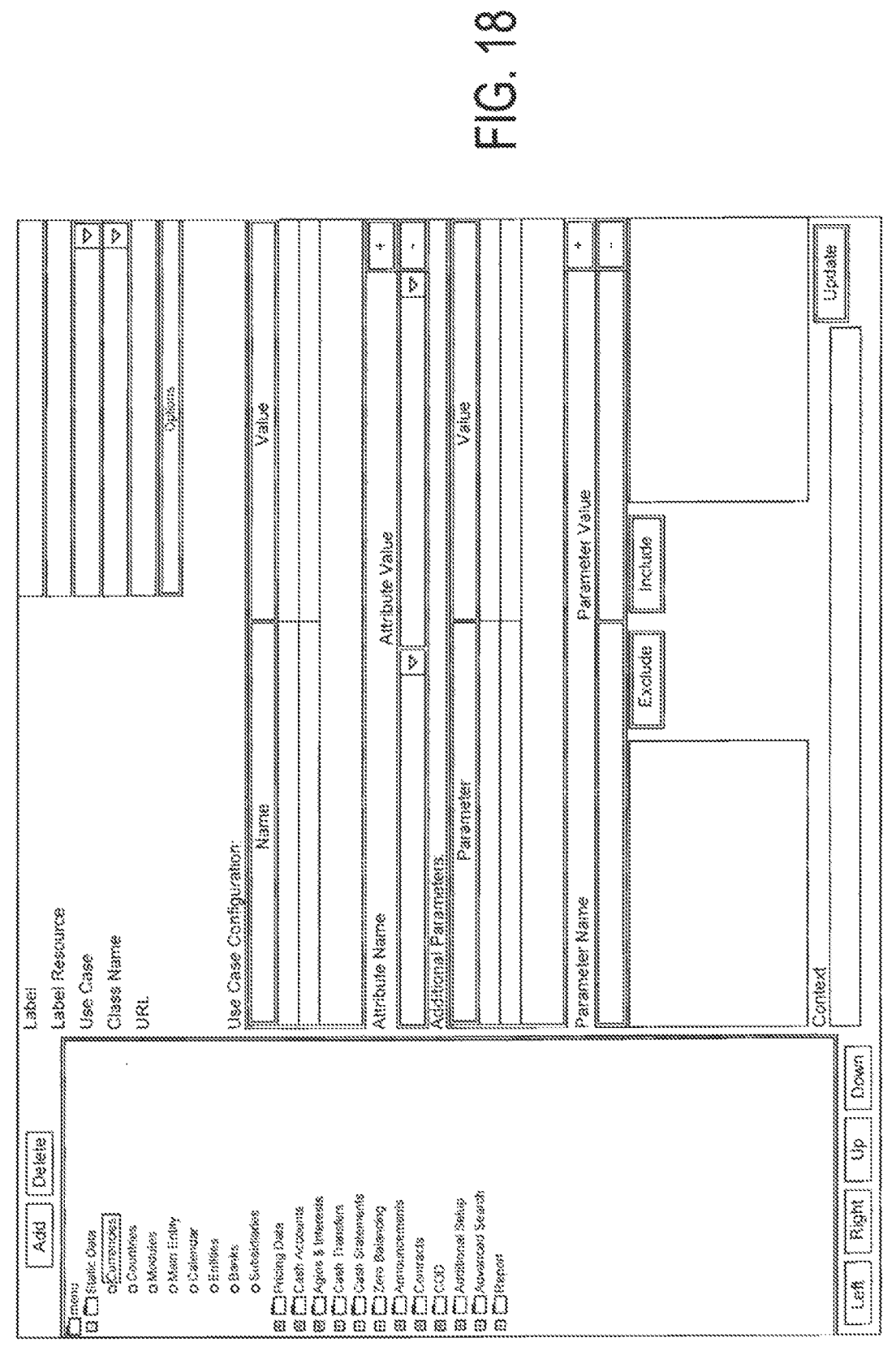

The Palmyra framework provides a tool called Menu Editor Tool, which is used to define the structure of the application menus. The Menu Editor Tool allows for menu configuration capability. The menu editor as an offline tool requires information from the server that information includes the current menu, the users defined in the system, the class paths of the model, the action type, the use cases, free parameter and additional parameters. This tool allows for loading of pre-built menu configuration files and then reflecting these configuration files in the system. This tool also allows for loading of an Import/export configuration file that allows the system to import or export the current configuration or get a configuration from another file through importing it. Further, this tool allows for manipulation, in which the current configuration file can be manipulated and changes would be applied to the current system. Additionally, the tool also provides different configurations for different user groups and multilingual labeling in which labels are configured so they support certain language. Finally, the tool also allows for adding new menu items. FIG. 18 represents the user interface of the Menu Editor Tool.

The configuration menu items must be registered by defining an initalizer and call the method AdvancedMenuGenerator.registerQ.

TABLE 11 illustrates an example of adding new menu items.

TABLE 11

Example of Adding New Menu Items

SimpLeContextlrttpl siinpleCtx = new
SimpleContextlirtpl (UseCaseConstants .EDIT,
Boolea . FALSE,
Menu. class . getName ( ) ,
ActionTypeConstants . TECHNICAL, ActionCons.tants . C EATJE7) ;
AdvancedMenuGenerator.registe ( AdvancedMemiGenerator . PUBLIC,
"Configuration>Meim" , "Menu Manager"
simpleCtx, null, false,
MenuProvider.class.getName ( )) ; In this example, the structure includes the following information:
 role: either AdvancedMenuGenerator.VERJ\ffiG_ADMI for vermeg admin or
AdvancedM<<inGenerator.ADME .
 path: the path of the parent of the newly created item. The path must be written in the following form: item1>item2>. . . >parent. The path will be created if it was not found.
 label: the name of the item.
 targetContext: the target simple context to call.
 isInit: indicates whether the item is to be viewed in the initialization mode.
additianalParcuneters: the additional parameter that is needed in the target context.
 resource: the full path to the resource provider.
 "When firdshing the creation of the menu structure, the system generates a file that contains the menu structure to be uploaded into the target application.

3. View-Format

The Palmyra framework automatically generates, screen pages used to create, edit and search the objects of the Entity class types that are defined in the UML model of the target application. The contents of the screens are generated in accordance with the fields and relations of the entity classes by using an algorithm to generate a default layout of the screens. The usage of the visual elements that represent the fields and relations (text boxes, combos, lists, links) and their distribution on the screens might be manually modified later using the View-format configuration tool. View-format can also remove unnecessary fields from the screens and can create groups of fields.

The view format of a Palmyra screen is represented by an instance of the class com.palmyra, rch.present twn.modeU-viewformatVtewFormat. This class contains:

Screen properties:

Label: contains the screen title;

isForCaching: whether the skeleton of the screen is cacheable;

showTitle: whether the title of the screen' is visible. Fields properties:

readonly: whether me field is read-only or editable;

Mandatory: whether the field ie mandatory in order to save an instance to database;

Visible: whether to show or hide the field.

The information that link one view format instance to the appropriate screen are stored on file class com.palmyra. rch.pi' esentation.modeLvt wform F ctoryEntry, there are two fields:

Context: Specify the context of the correspondent screen;

Precise: Specify whether the view format was registered using a precise context or not.

Figure 23:
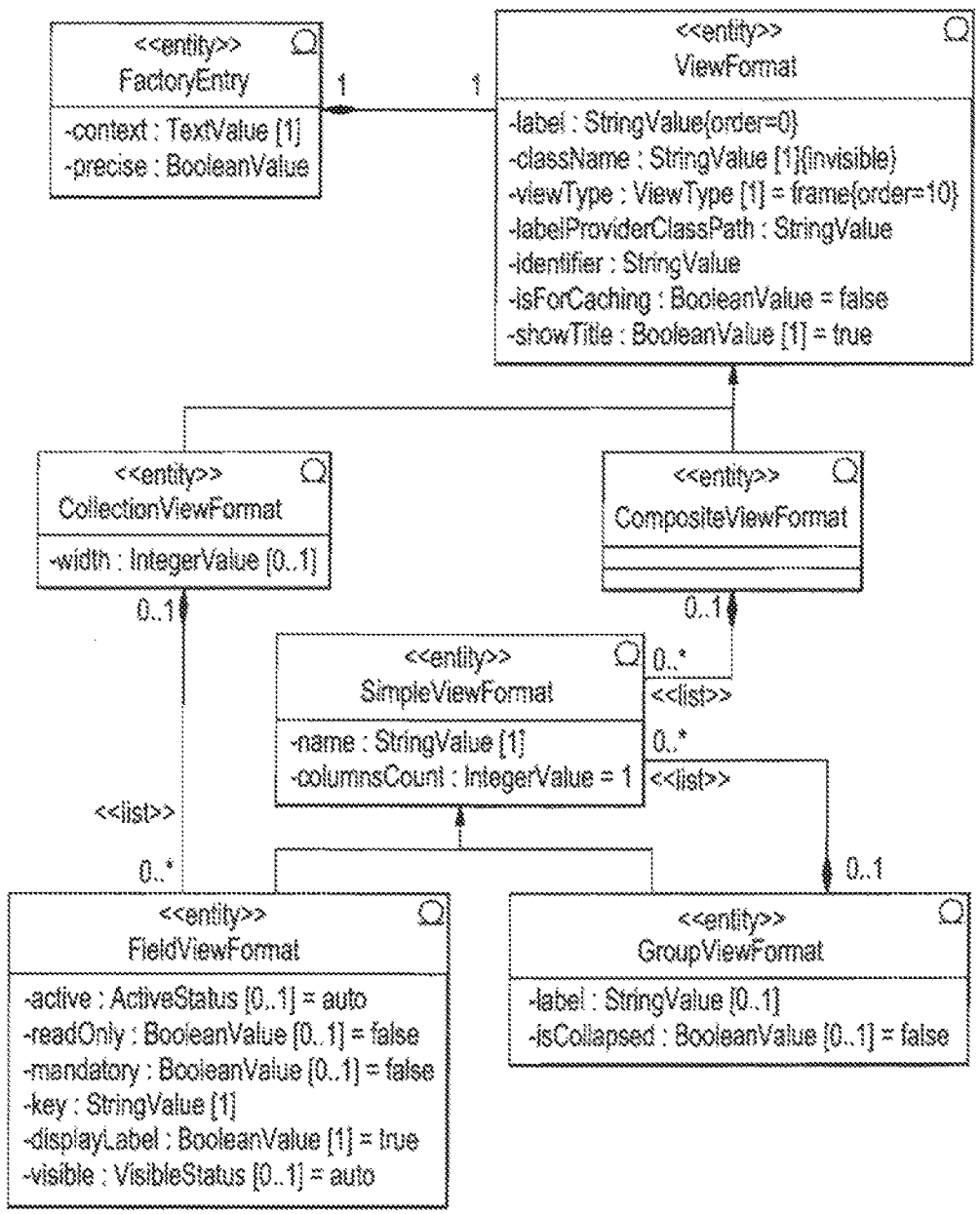
FIG. 23 illustrates an example of UML model of the View Format Service.
Figure 24A:
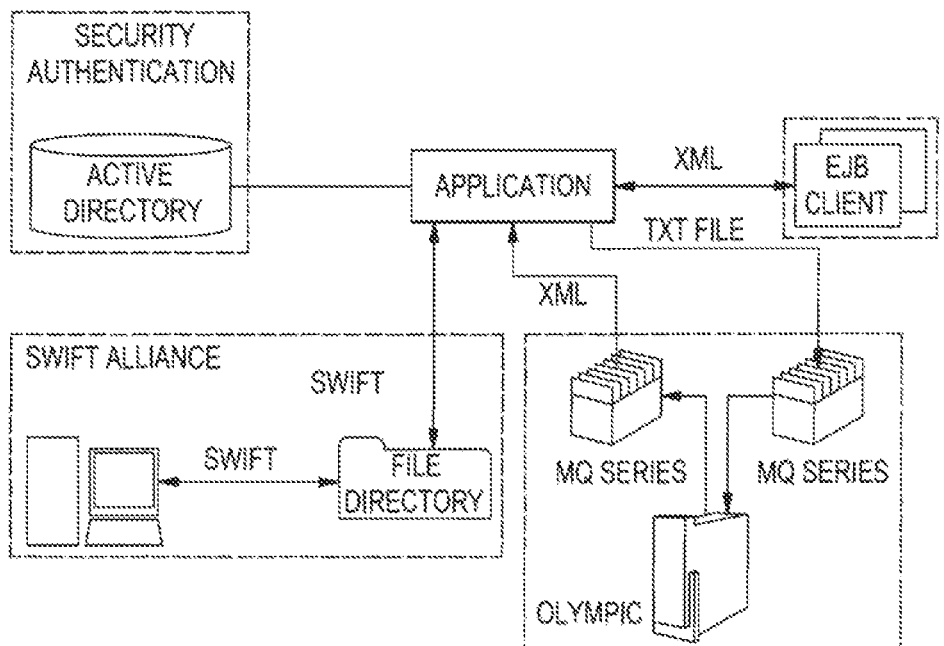
FIG. 24A illustrates an example of how an application according to the preferred embodiment integrates and communicates with different platforms.

FIG. 23 shows the UML Class Diagram of the view format service.

3. Actions Configuration

The Palmyra Framework generates default actions for every screen. The user can modify some properties of these actions using the Action Configuration service. He can hide or show the action, change its icon, change the position (Top or Bottom), change the arrangement of actions.

4. Translator

The Translator is a configuration module of the Palmyra framework that manages internationalization of many presentation elements like labels, enumerations, screen title . . . .

a. Labels

The automatically generated screen pages have screen elements (text boxes, combos, lists, links, etc.) with descriptive labels. The labels are generated using the field-names or relation-names as defined in the UML class diagrams. The labels can be modified later using the Translator module. When using the screen pages, the labels are chosen according to the language defined in the user profile.

b. Enumerations Enumerations are Simple class types that represent a text with a predefined set of available values defined in the UML class diagram. In the screen pages, fields having enumeration class types are displayed as combo boxes with the set of available values. The available values can be modified using the Translator module. When using the screen pages, the available values are chose according to the language defined in the user profile.

5. Default Values Configuration

The default values configuration service allows the definition of default values for a specific field and a specific user. This allows defining a different default value for each user.

B. Security

1. Authentication

Authentication is the mechanism by which callers prove that they are acting on behalf of specific users or systems. Authentication answers the question, "Who are you?" using credentials such as user/password combinations.

The concept of ASP, i.e., Application Service Provider, is included in the Authentication module. In fact, the latter considers a user as a pair of User Name and ASP Value. This allows defining more than one user with the same name provided that they have different asp values.

In Palmyra terminology, ASP is the Segregation of data and processes between different entities sharing the same database. An entity can be a bank, a branch, a department or any repartition required by the client For example: A user with an ASP Value equal to X, will only see data relative to X.

Figure 19:
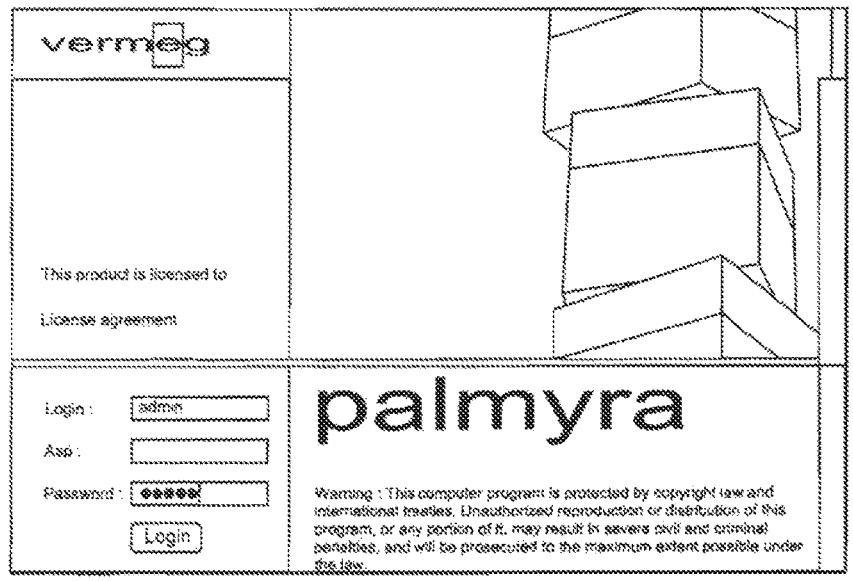
FIG. 19 illustrates an exemplary screen of Palmyra login screen.

FIG. 19 shows an exemplary Palmyra login page.

In Palmyra, Authentication is done by two methods:

(I) Internal Authentication: authentication mechanism in which the authentication is-managed by the application itself using a built-in component. Here, the usernames and passwords are saved in database. When using the internal authentication mechanism, the application provides for a security configuration tool to create new users, which is usually done by the system administrator. (2) External Authentication: The application communicates with an external system in which users are defined. Where there is a custom registry, which stores the users and their credentials (for example LDAP, Active Directory).

Authentication in Palmyra uses Filters to check each request sent from user. If it is sent from an authenticated session it will be forwarded to the required resource. Otherwise, it will be forwarded to the login page. Palmyra uses Form-Based authentication to send the username and password to the Filter, which verify the username and password. In the case of ExternalAumentication, users and passwords are stored in a custom registry such as LDAP. So the first step is to assure that the application server used for deployment support the integration' with a custom registry.

The application server connects to the user registry to collect user-related information when creating credentials, which axe men used to represent the user during authorization (for example, when logging into an application to check passwords). For example, Websphere Application Server security supports the implementation of most major LDAP directory servers (like ActiveDirectory of windows). As another example, Jboss also supports the implementation of Active Directory.

The security kernel offers an interface for authentication called AuthenticationDriver. The implementation of this interface depends on the authentication technique required by the client The AuthenticationDriver interface contains 6 methods:

boolean initQ: initialisation of the security authentication driver (exp: Load of setup user).

String authenticate (ServletRequest servletRequest) the implementation of this method depends on the technique used for authentication.

For example, in the case of internal authentication, we can implement this method to get the username, asp and password from the ServletRequest parameters and then check this pair if exist in the DataStore.

In the case of external authentication it will be replaced by the JSecurityCheck servlet, which will play the same role of check of users' credentials. void login(String userName, ServletReq st servletRequest): in the case of default authentication we implement this method to cache sessionId and userName. In the case of qxtemal authentication (jsecuritycheck) the user name is already cached in the session.

String isAuthenticatedfServletRequest servletRequest): the implementation of this method is to return the userName if sessionId exist in the cache else return null void logout(ServletRequest request, ServletResponse response): the implementation of this method allow the action of logout the user by invalidate session.

voidf ilLogin(ServletRequest request, ServletResponse response): In case of authentication fail the implementation of the failLogin method is to tell where forward the request Any implementation of the authentication driver needs the following static block in which we register our Driver static {DriversFactory.getDriversFactoryO.register AuthenticationDriver ( new MyAuthenticationDriver ( )

);

}

The last connection date is stored for each Security User.

To enforce the security in the Palmyra framework, account management is implemented through account lokout and password policy. Both are configurable in a property file called passwordConfiguration. The containing properties are:

minLength: is an integer that defines the minimum length required for a UserCredentials password. Its default value is 0.

upAndLow: is a boolean that defines whether both upper and lower case characters are required for a UserCredentials password. Its default value is false mixedChars: is a boolean that defines whether both numbers and characters are required for a UserCredentials password. Its defaultValue is false p sswordValidity. is an integer that defines the validity period of a password in days.

By default, this property is empty. warnBefore: is an integer that defines the number of days before which the system should start warning a user that he needs to change Ms credentials. It must be used along with passwordVattdity. By default, this property is empty.

lockOutNbr. is an integer that defines the number of failed password trials that causes the user to be inactive (The SecurityUser's IsActive property is set to false) and thus . can no more access Hie application, unless the administrator activate it again (set IsActive to true) or if he tries after 8 hours. By default, this i property is empty.

Palmyra also supports Single Sign on (SSO) authentication mechanism. Single sign-on is the ability to require a user to sign on to an application only once and gain access to marry different application components, even though these components may have their own authentication schemes. This feature allows end users to log on once per session rather than logging on to each resource or application separately.

2. Authorization

Authorization is the process whereby the interaction between users and application resources is controlled, based on user identity or other information. In other words, authorization answers the question "What can you access?"

The definition of the authorization process method used by the application is done by the implementation of an interface AumorizationDriyer.

Palmyra authorization system is implemented on different layers:

a. Groups

System users can be grouped so that they are managed easily. The security configuration tool allows creating groups and corresponding users. Groups may also be grouped in other groups in order to create a hierarchy.

Two groups are created by default when starting the application for the first time: Administrators and VermegAdmin. VermegAdmin is part of the group Administrators.

If a SecurityUser belongs to VermegAdmin or Administrators, then he has all privileges on the application.

b. Roles Roles are user-profiles used to pre-establish a set of configurations to be applied to the later created users. The roles are created using the security configuration tools. Roles are assigned later to previously created users using the same security configuration tool.

A role "admin" is created be default when starting the application for the first time. This role gives all rights to the application resources.

c. Rights

The privileges and restrictions of users are expressed in terms of what Entity-class types they can access and what process parts they can run. Rights are configured using the security configuration tool. The rights are later assigned to the previously created users, groups and roles also using the security configuration tool.

Figure 20:
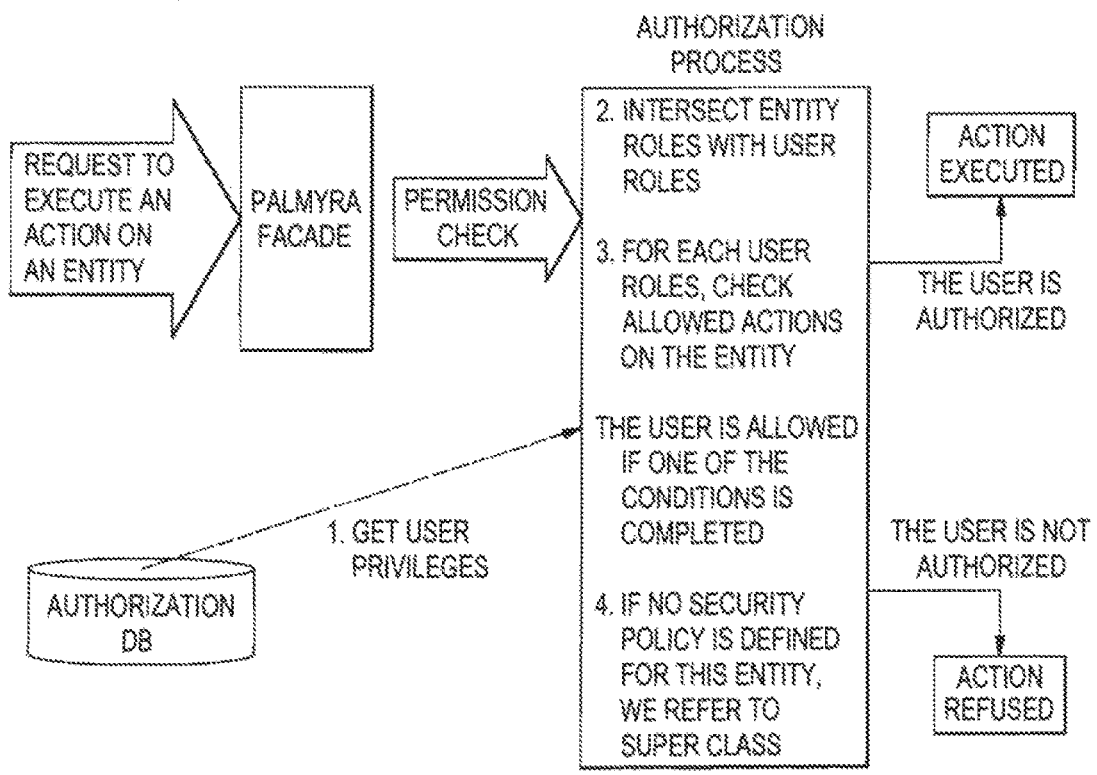
FIG. 20 illustrates an example of the entity authorization process.

1b. Palmyra the authorization process is done in two levels:

(1) Entity level: in which the system checks on the user privileges. FIG. 20 illustrates the process of entity authorization implemented by Palmyra.

Figure 21:
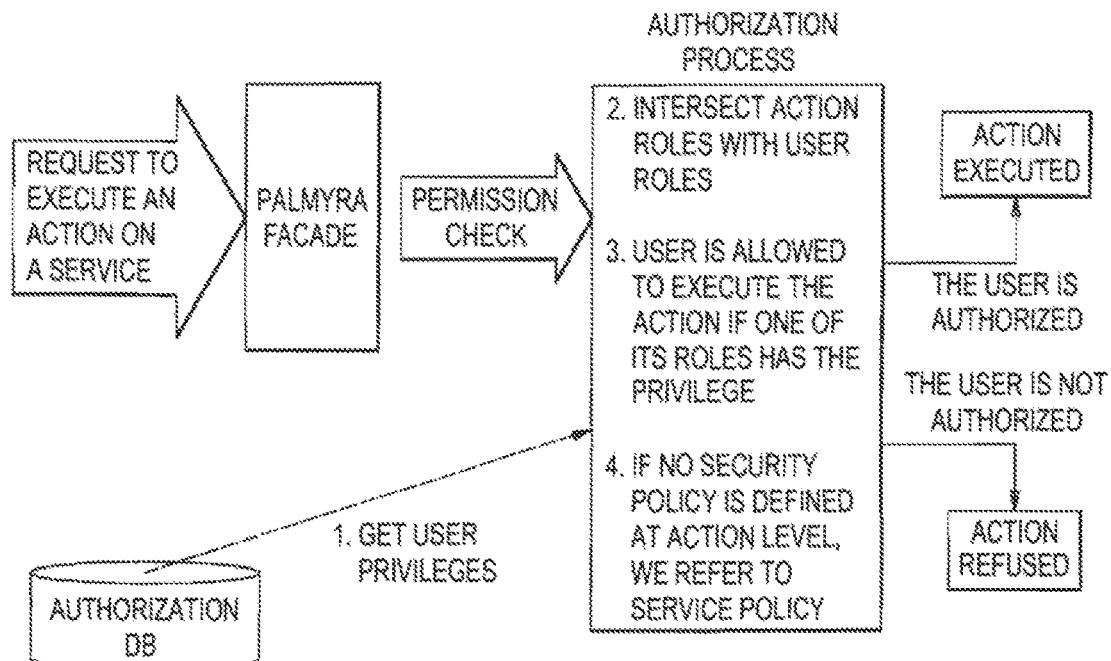
FIG. 21 illustrates an example of the service authorization process.

(2) Service level: in which the system checks on whether certain action is allowed to be performed. FIG. 21 illustrates the process of service authorization process.

Roles in Palmyra are defined by their names (RoleId). They enclose Entity Policies and Service Policies. The latter will define the privileges that the role offers to. a 'user or a group of users.

To grant the access to a specified entity to role, the entity policy is associated to the Role. Those associations are based on a create condition, update condition, delete condition and find condition. If these conditions are verified, the user which role is granted can access to the entity.

Entity policy is identified by: Application Name: ALL or the name of the application and Entity Name.

The "create condition", "update condition", "delete condition" or "find condition" fields are a Boolean expression that can be:

Empty, mis means that there is no restriction on this create/update/delete/find.action.

"false": No right to execute create/update delete find action. Expression containing the following keys date, hour, time, currentUser, userProperties or a combination of mentioned keys. Example: attribute==currentUser, this delete condition means that according to ibis role, only instances with an attribute value equal to the current user can be deleted. Example 2:

attribute=userProperties.propertyName

The entity com.Palmyra.arc.basicStruct.data.BusinessEntity is the super entity of business entities.!

The entity taom.Palmyra.arch.basicStruct.data.AbstractValue is the super entity (business entities plus Palmyra entities).

To grant the access to execute a specified action in a specific service to role, the service policy is associated to Hie Role. Those associations are based on a condition. If this condition is verified, the user which role is granted can access to the application name/service/action. {

Service policy is identified by Application Name, Service name and Action name.

The Condition field is a Boolean expression that can be:

Empty: this means that there is no restriction on this application name/service/actioa 1

"false": No right to access to this application name/service/action.

i

Expression containing the following keys date, hour, time, currentUser, userProperties or parameters or a combination of mentioned keys. Given this syntax: identifier operator value, each of the latter keys can be used as either an identifier or a value. i Date: is evaluated as the current date, aBusinessDate instance.

Example: date==, 10/12/2100b', i.e., allow action execution only at Oct. 12, 2100.

Hour: is evaluated as the current hour, getKourO of a TimeValue instance.

Example: hour==8, i.e., allow action execution only at 8 o'clock each day

Time: is evaluated as the current time, a TimeValue instance.

Example: time==w08:00:00:000", i.e., allow action execution only at 8 o'clock each day. 'C rrentUser: is evaluated as the current user, a StringValue instance. Example: currentUser=="X"

UserProperties: is to be used before a security property name with the following syntax: userProperties.propertyName. The latter is evaluated as the current user's security property value. Example: userProperties.menuId=="value1 i.e., allow action execution only if the current user's menuId is set to value1.

Parameters: is to be used with the following syntax: parameters.paramName, where paramName is a parameter of the action defined as an actionName in the ServicePolicy.

Example: arameter s. config. creatorUse Id==currentUser, this condition means that the parameter "config" needs to be created by the current user in order to allow the execution of the action.

The service com.Palmyra.arcLservice.BusiaessDelegate is the super service.

Figure 22A:
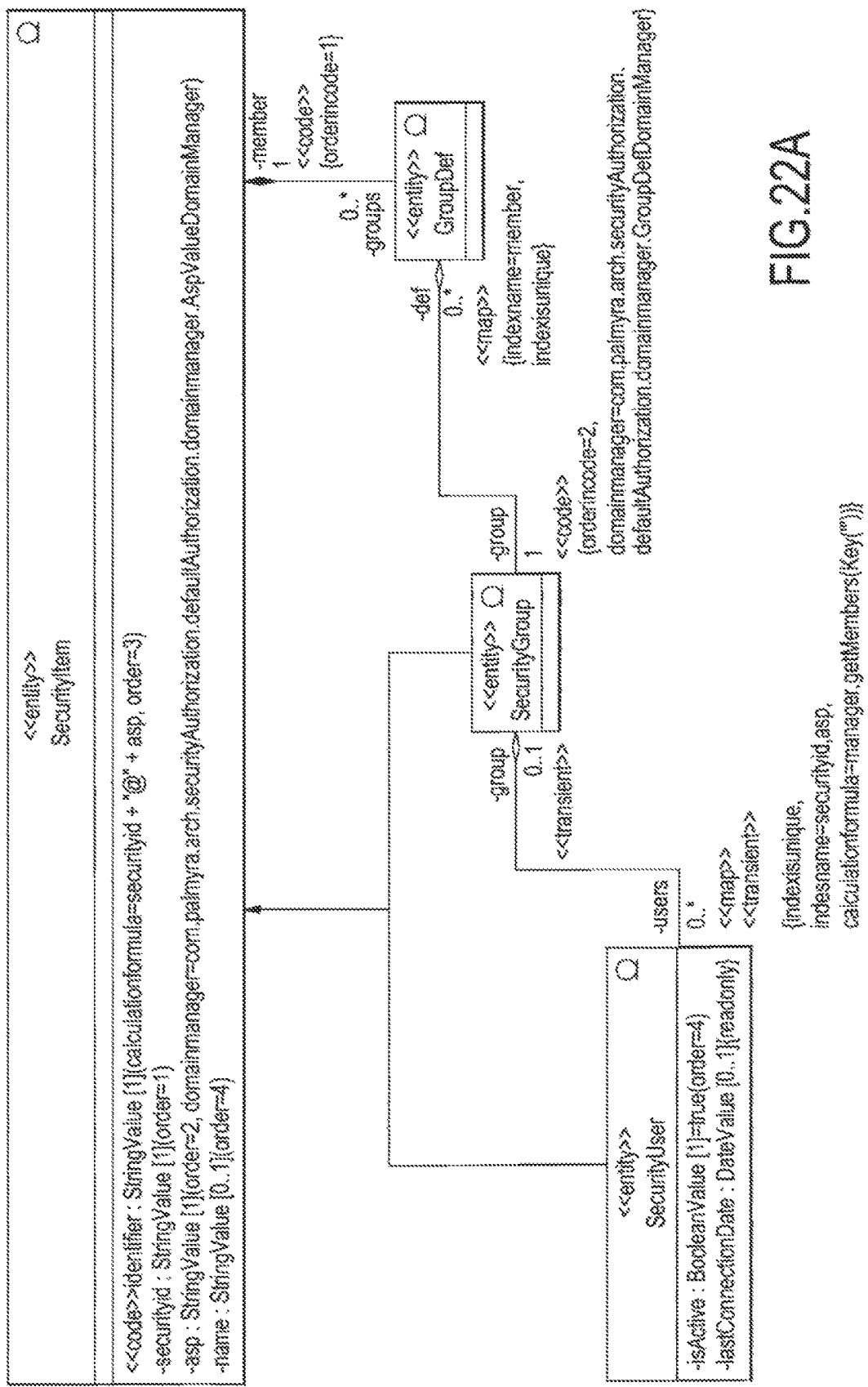
FIG. 22A illustrates an exemplary SecurityItem UML Model.
Figure 22B:
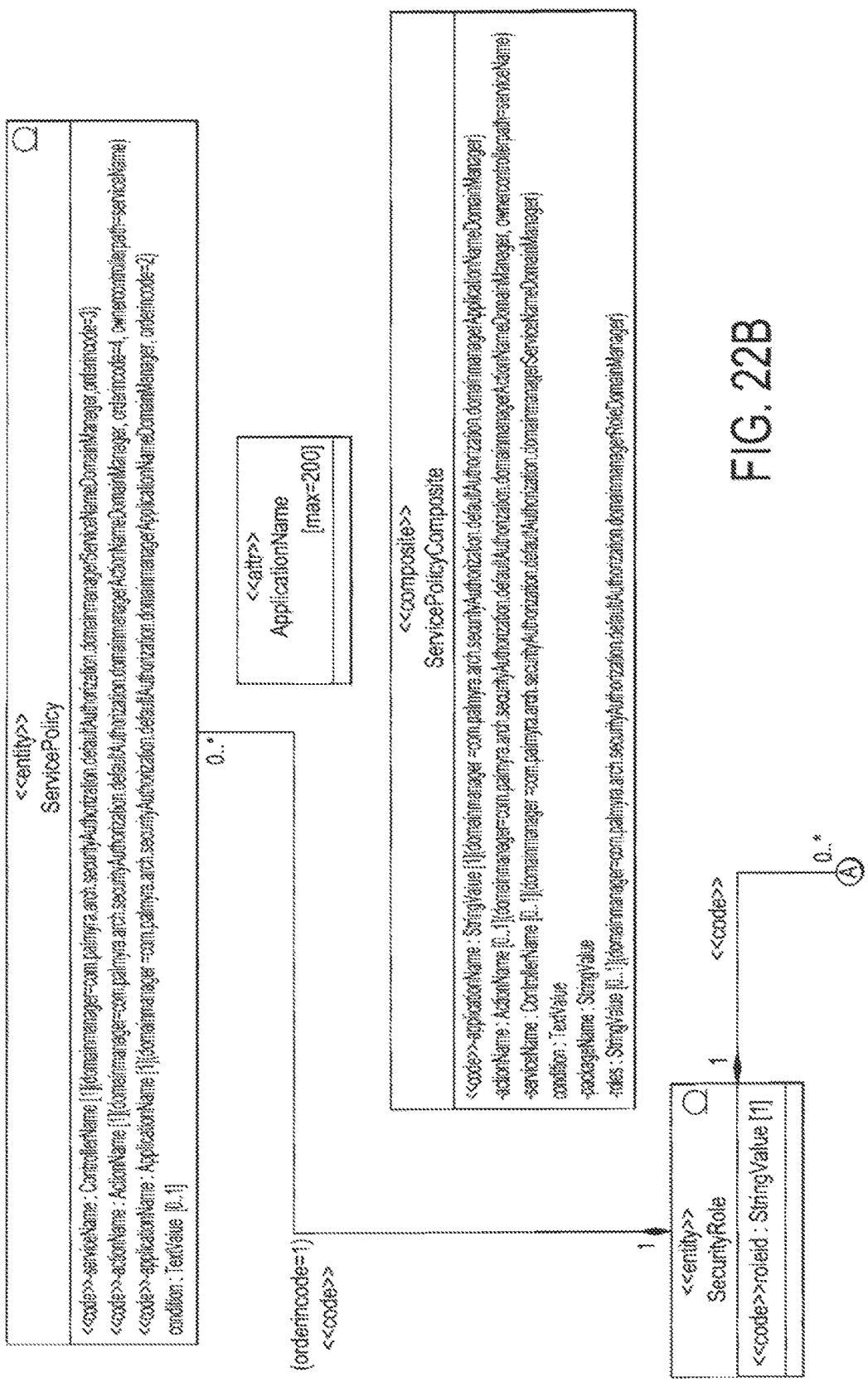
FIG. 22B illustrates an exemplary Policies UML Model.
Figure 22B:
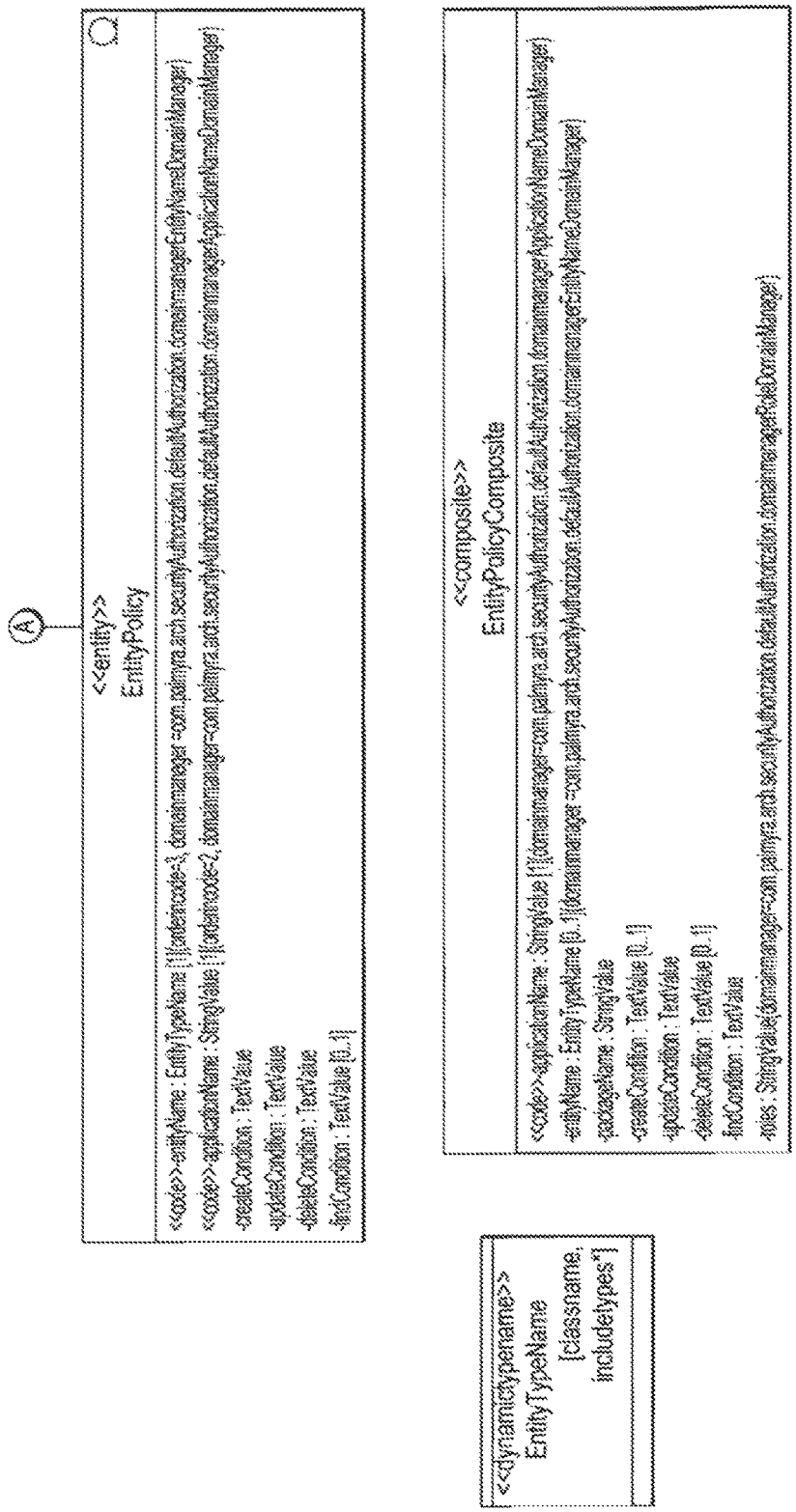

FIGS. 22A, 22B, and 22C illustrate the main part of the exemplary Authorization UML model. Specifically, FIG. 22A illustrates an exemplary SecurityItem U L Model, FIG. •22B illustrates an exemplary Policies UML Model, and FIG. 22C illustrates an exemplary SecurityItem's Roles UML ModeL When a user A access an application resource, checks are done on whether the user is authorized to do so. The operating principle of these checks relies on the entity and service policies related to the user A.

When checking if a user is authorized or not, from each role a condition is formed and added to the union of all roles.

Example: User A needs to search for instances of Entity E. User A has one role X and a role Y inherited from the Group B, which he is a member of. Role Y has an EntityPolicy instance P2 on Entity E with a find condition set to creatorUserId====curreotUser. This condition means that the User A can only see instances that he created when doing a find on E. Role X has an EntityPolicy instance PI on Entity E with a find condition set to empty. Taking into account the latter information, the user A will see all instances of E.

The reseason is simply because a criterion has been formed with the two conditions of role X and Y as a union and sent as a query to the database. The criterion is pk!=null| creatorUserId=="A".

C. Input and Output Devices

The generated target application contains pre-existing libraries that manage the communications with other systems and applications using different communication and messaging protocols. FTP, File, Queue, WebDav, Mail via SMTP are examples of protocols supported by the preferred embodiment. For each of these protocols, an Input and an Output device is integrated i the target application.

To use an Input Device, one needs to:

Define an Input Device Configuration with a specific message type. He can do this in the IODevices Configuration submenu of the Configuration Tools menu.

Define a listener class that implements the interface InputDeviceListener. In this class, he has to subscribe his listener to the specific message type and to implement the method on eceive(MessageHeader mh). When an input device consumer notifies a listener, it calls its onReceive method.

The Output Device implementation defines two actors:

Output Device Configuration: The output device configuration is an entity class with a code field deviceID. It has several fields according to the device type (For example, the mail server in the dutput device mail configuration or the hostname in the output device FTP configuration).

Output Device: The output device manages the writing of values to a device. So it's associated with an output device configuration. All output devices should extend the abstract class OutputDevice. Palmyra defines five types of Output Devices: Output Device Queue, Output Device File, Output Device FTP, Output Device Palmyra Service and Output Device Mail. Each extended Output Device inherits a ByteArrayOutputStream Attribute and implements the method flush. The inherited field can be obtained by calling the method getOutputStream 0• This method returns an OutputStream. The method flush 0 writes the content of the inherited field to the device defined by the associated output device configuration.

Figure 25:
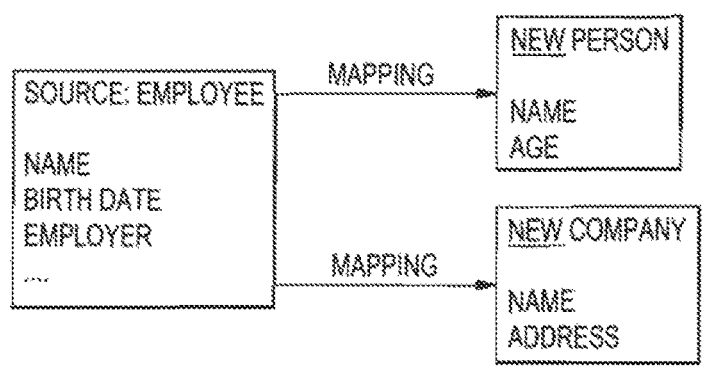
FIG. 25 illustrates an overview of the Mapping process.

New I O devices and protocols can be added by adding new modules and new libraries for these I/O devices and protocols. Modification of the I/O devices is usually not performed during runtime. The application is taken off line and re-deployed with the new modules and libraries D. Mapping Tool Mapping is a tool which provides the ability of converting objects (e.g. copying field values from source object to target object(s) based on a configuration). FIG. 25 illustrates an overview of the Mapping process.

1. Uses of Mapping Mechanism

The Mapping mechanism is used for:

a. Connecting with Outer World

Within the framework Palmyra data is represented by a special object (the interface "Value" and its implementers). External data coming from outer devices is parsed using general "purpose drivers, so the output is generally in a driver-specific format. Driver specific objects should be converted into application data objects on which the process is defined.

b. Integrating Components

Applications also use business services that may require creating specific objects in order to integrate their processes. For example the input of the accounting business service is an accounting message (a data object). If the user wants to integrate the accounting in an application, he should create accounting messages having other data objects as sources such as client payments.

2. Configuration of Mapping

. Mapping is configurable and customizable at runtime: the whole mapping configuration could be changed at any moment and the configuration effects take place immediately. This gives a large level of flexibility to the users of the system. The configuration of mapping is created at runtime of the application using the presentation tier. Different mapping configurations can be assigned to different processes. For example, in the router, for each m∞ming message type, a parser (driver) is configured and then a mapping could be specified.

Figure 26:
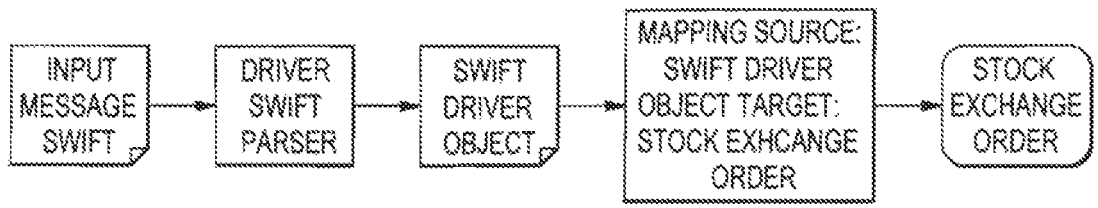
FIG. 26 illustrates an example of configuration of Mapping.

FIG. 26 illustrates an example of configuration of Mapping.

3. Mapping Process

The mapping mechanism creates the destination class in order to map the objects. The creation of a destination-class using mapping comprises a number of key-mappings or elementary mappings. Key Mapping is an elementary mapping configuration of a field in the target. Every field may have one or more key mappings to define how the value should be extracted from the source.

The Source Formula is an expression based on fields from the source to construct the value which, will be mapped or will be assigned to the target. For example, a source formula may read: grossAmount+commission. Target field: netAmount A Condition is an expression that defines a condition. If the result is true, then tiae mapping is executed. For example, a condition may read: operationType=="buy". Target key: balanceType source formula: "debif'.

Sometimes the result of applying the source formula does not fit the target field. In. this case a conversion should be made. This is done by a converter.

There are four types of converters:

(1) Built-in Converter, in which converting occurs by executing an action edited by the user.

(2) Date Converter, for inverting values from date format to another date format (3) Enumeration Converter, in which the converter specifies a collection of pairs. Each pair specifies multiple values which are converted to one value.

(4) Numeric Converter, in which the converter specifies a converting type: abs, ceil, floor and log.

Mapping saves time as the conversion process is a very frequent requirement in

Palmyra applications. Having a module that performs the process saves development time.

Figure 27:
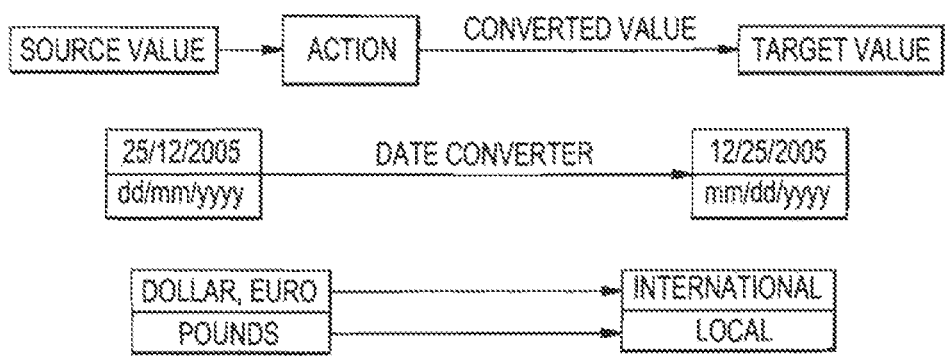
FIG. 27 illustrates in detail the process of Mapping converters.

FIG. 27 illustrates in detail the process of Mapping converters.

4. Types of Mapping

Mapping is used to maps an object (source) to another object (target). There are two types of mapping:

(1) Field to field mapping: one field from the source is mapped to one field in the target (no expressions).

(2) Rich Mapping: Newer version of mapping which maps one object (source) to one or multiple object(s) (targets). The source value is extracted by a formula (e.g., the formula may be 'firstName+lastName').

E. Loading Lifecycles of Objects and Constraint Models

Figure 28:
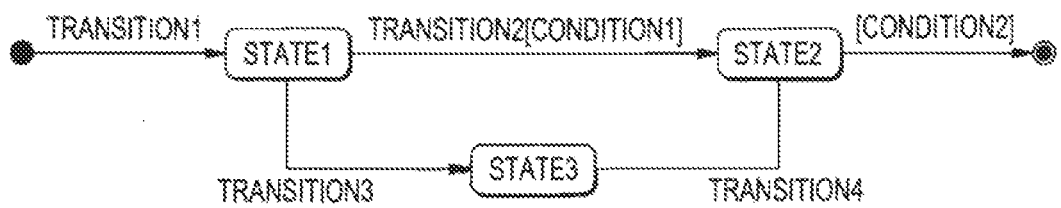
FIG. 28 illustrates an example of the workflow engine and how it manages the states in the system.

A process diagram represents a process definition. Process diagrams are created using the state diagram modeling technique, where a state diagram is called a lifecycle or automata. Later, a workflow engine, which is a finite state automaton that manages the business processes, manages the lives of these states. The workflow is related to entities and represented in UML by a state diagram and the lifecycle is configurable by the user. FIG. 28 illustrates an example of me workflow engine and how it manages the states in the system.

A lifesycle or automata file is an XML file describing in XML language the graphical state diagram defined in UML. After creating the graphical state diagram in UML, Palmrya reinterprets the graphical state diagram into XML language so it can be easily understood during and after the building process of the application Ia the generation step, the process diagrams are transformed into XML files. Those XML files are loaded in the application using a specific configuration tool that allows afterwards performing a syntax check on the loaded process-definition and binding the process definition with a previously defined Entity class. Binding is the process of assigning entity classes to a process. Modifications on the lifecycle or the process definition can be made at anytime after deploying the application. The resulting XML file produced in the generation step is then loaded into the system and the modifications are taken into consideration. The modification is generally performed through the UML Designer interface to take advantage of the built-in validation capability. The generator can be configured to export XML files only. Constraint models are class diagrams that define specific Entity class types known as constraint classes. They add constraints on pre-existing class types defined as Constrainable. The constraints are additional integrity rules defined in the UML models based on existing entity classes; they are next converted into XML files during the generation step. The generated application provides for a tool to load XML files that represent constraint models into the application. Modification into constraints or adding new constraints can be done anytime after deploying the application. The resulting XML file is then loaded into the system and the modifications are taken into consideration.

F. Trace Configuration

The generated application provides the functionality of writing a trace in specific files created on the server machine. The trace is used when necessary to analyze the tasks done by the application and to log for bugs or technical problems. Trace Configuration can also record business logs and module specific logs.

The application provides for a configuration tool to determine the location, size, and names of files to be generated to store the trace. It also enables selecting from a list of predefined levels of details in the generated trace.

G. Reports

Reporting tools are vital to enterprise applications that deal with data. They give the user the possibility to generate dynamically reports on the data they work cm given certain criteria. The Report module is the Palmyra tool that defines and generates generic reports. It provides easy-to-use user interface to build Reports ("templates") that can be used later to generate Reports in different formats.

The generated application provides the functionally of creating Reports using the data entered into me application. The Report Writer is part of me presentation service. The definition of Reports is based on Metadata, which indicates the entity class types to be used as data containers and the parameters to be entered when generated the Reports in order to select me appropriate objects. Metadata is the definition of data loaded in the memory of the application. It is derived from XML files (e.g., process and constraints), generated code, written code, and preexisting libraries.

Figure 29:
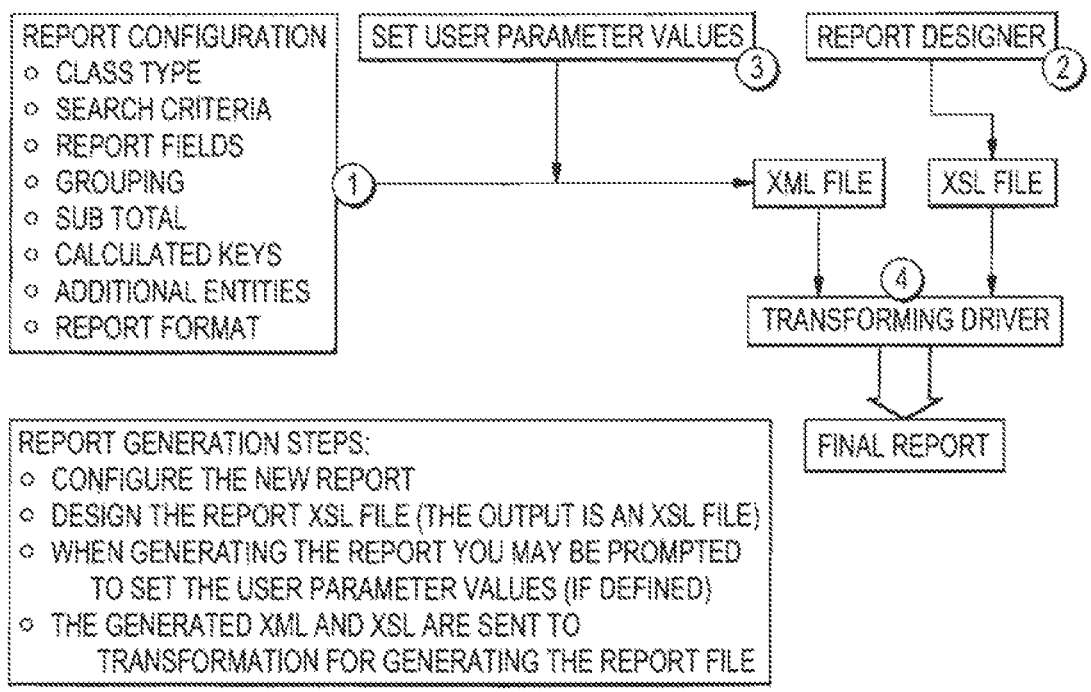
FIG. 29 illustrates the general architecture of the Report Writer.
Figure 24B:
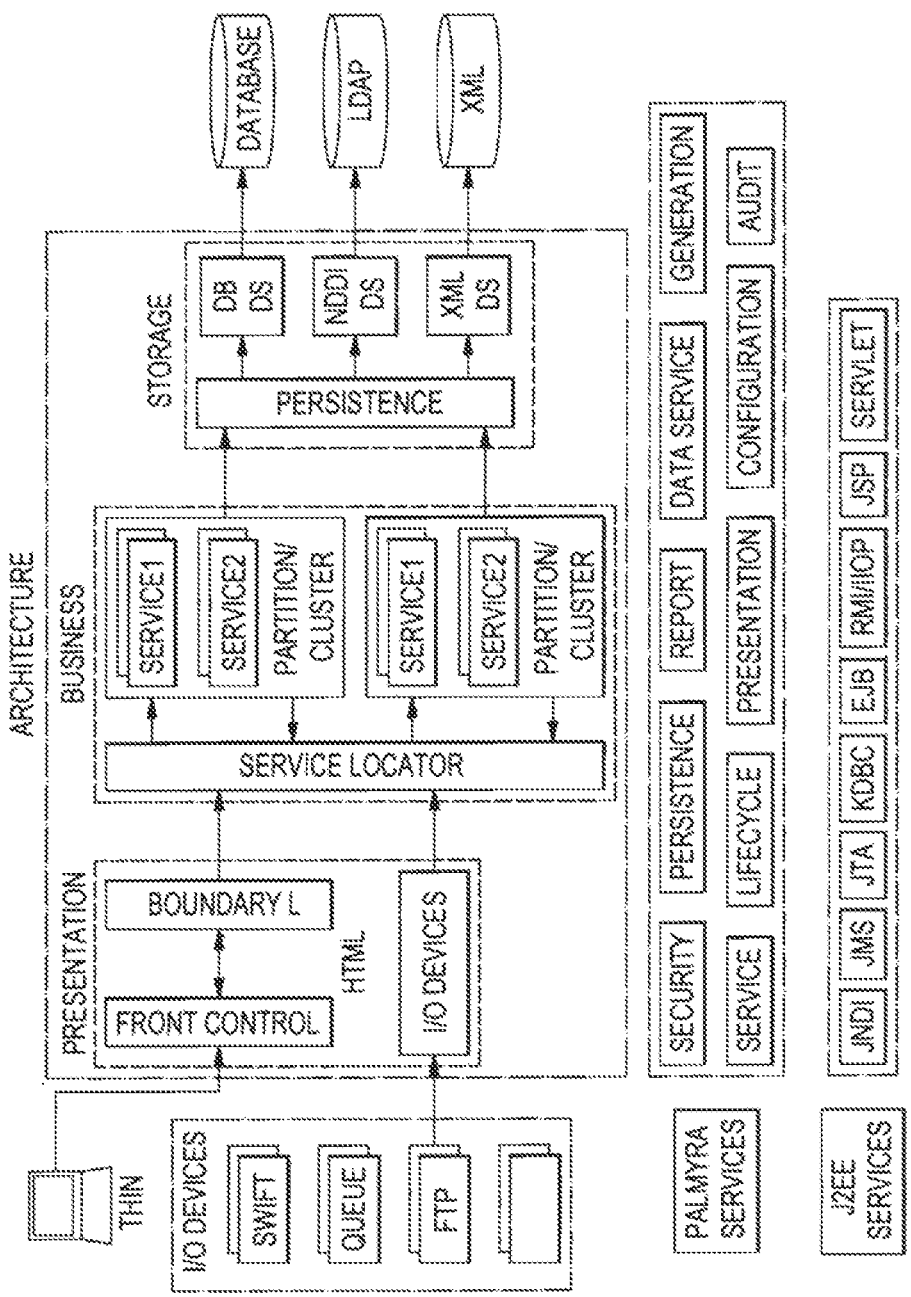
FIG. 24B illustrates the architecture of the system in abstract and where the Input and Output Devices fit into this system.

Reports are generated in multiple formats like PDF or HTML or RTF based on the data and form definitions. The Report designer can define some parameters to be used in the criteria. The values of these parameters are supplied just before the Report generation. These parameters are a set of optional conditions to be applied when collecting the data to generate the Repor For example, if the user just wants the personal information of the Employees who are older than 25, then he can define search criteria to customize the Report gathered data. The Report can also define an entity which is the name of the main type (class) representing the entity to be displayed. For example if the user wants to build a Report which includes the Employees' personal information, the main Entity will be Employee. The Report can define the names of the attributes (fields) of the main Entity to be viewed in the Report, for example employee first name. Further, these fields can be grouped, ordered, and represented in many different ways such as charts. Finally, the Palmyra system also provides for the capability to generate reports programmatically by providing various methods for generating and modifying the interfaces for programmers to work with. TABLE 12 illustrates an example of the methods that the Palmyra Reporting Tool exposes programmatically to work with the reporting tool. Report comprises an essential part of any application. However the design of the Report may take a lot of time and effort. Moreover, any simple modification on the Report design may cause the application to stop running and require restarting. For these reasons, Palmyra has the XSL Editor Tool which facilitates designing process of the Report by the designers. This tool allows for various design functionalities, such as modifying the layout of the report, adding dynamic data, modifying the labels, adding expressions, and adding images to the design. Finally, the Report writer tool also provides means to represent data in a diagram format. The Palmyra system contains a chart library. This library is a Java-based charting that enables the user to add charts to his java applications and web pages. The library contains AWT based chart components, applets, and a chart servlet. FIG. 29 illustrates the report generation steps.

TABLE 12

An example of the methods that Palmyra Reporting Tool expose progranraiatically to work with the reporliag tool

```
Example of Report generation
FileOutputStream output = new FileOutputStream("Di\\Report.pdf") ;
String raportName = "myReport";
CollectionValue parameters = new CollectionValue ( ) ;
parameters . set ( "parameterName" , new String/Value ( "testParamete " ) )
String criteria =" (yl==\ "testCriteria\ " ) & (xl=={parameterName} ) " ;
ReportGenerator reportGenerator = new ReportGenerator( ) ;
reportGenerator. generateReport (output, reportName,parameters,new
IODriverDefaultConfigO , criteria);
Example Report Export Action
public class ActionBxportComandReport extends AetionHandlerAdapter implements
Initializer {
  private static final String EXPORT_CQMMANn_REPORT = "BxportComman-
dReport";
private ActionExportComandReport ( ) {
  }
  private static ActionBxportComandReport instance = new
  AotionExportComand eport ( ) ;
  public static ActionExportComandReport getanstance ( ) {
  return instance; ' private static boolean isInitialized = false;
  public static boolean initialize ( ) {
  if ( ! isInitialized) {
  SimpleContext context = ActionsUtil .createSimpleContext (
  ActionTypeConstailtS .ROW_OPBRATI0N, EXPORT_COMMAND_REPORT,
UseCaseConstants.EDIT, Boolean. RUE, AccountComp.class.getName ( )) ;
ActionsUtil.registerAction (context, instance) ;
  isInitialized = true;
  }
  return isInitialized;
  }
  Example of report download Controller
  public class ReportDownloadController implements DownloadController {
  public void download(PageData pageData, String key, OutputStream outputstream)
  {
  CollectionValue value = (CollectionValue) EditUtil.getseleetedltem(pageData) ;
  ReportGenerator reportGen = new ReportGenerator ( ) ;
  reportGen.generateReport( "accountReport" , outputstream, value) ;
  }
  public String getffileH-iteiision(PageData pageData, String key) {
  return "pdf";
  }
  public Siring getPile ame(PageData pageData, String key) {
  letun "account"; }} VL TESTING
```

A. Auto Tc!St

Palmyra based-on applications can contain a testing tool used to ensure the non-regression in the application when adding new functionalities through the iterative approach. Generally, regressions are bugs i re-constructed functionality, which surface after the introduction of new code. The tool is called Autotest, and it is used to record testing scripts, to create testing steps, scripts and suites manually, to run it later, and to compare the results. The tool ensures non-regression in the generated application by making sure that functions created in previous version of the application can still work after the additions. The tool helps to discover precisely and easily anomalies or differences in process-results between the version on which the test is launched and the version in which the recording is done.

1. AutoTest Terminologies

StepTest. It is the core item in the AutoTest, and presents the service that you want to test ScriptTest It presents me test scenario of a given use case. A script is composed of a set of ordered steps. The ScriptTest may have its own MtialState.

Suite: If you have many scenarios to be tested, then you can compose them by order in one Suite. The Suite may have its own MtialState.

MtialeState: It is an image of a database state saved in xml files; it is created by the user.

Test Message: It is a configuration used by the AutoTest tool to create the suitable, Palmyra message that presents the service to be tested. It consists of a service name, action name, and parameters.

Result: The result of the execution of the TestStep.

StepExpression: It is a palmyra expression used to evaluate the result

TestSearchResu.lt: It enables you to find the Result in the database and display it.

TestCollectionSearchResult: If the Result is a collection of values, and the test success depends of the number of these values, put the expected number here. TestFailure: Every time one of the previous teats (StepExpression, TestSearch esult, TestCoUectjonSearcliResult) fails, and if the run of the TestStep or TestScript fails; a new TestFailure is created to inform you about the failure.

2. Create TestStep, TestScript and TestSuite manually using Autotest

The test scenario can be organized as test suites which, comprises test script, which, is further comprises of test steps. The first step of manual test scenario creation is to create a test step.

AutoTest provides a dropdown menu for Step Creation. To search for an old Step or creates a new one, click Hie Step link in the AutoTest menu, then the new button to create a new Step. Fill in me Step name; this name is unique for the all steps.

Now create the Test Message, this field is mandatory and presents the service that you want to test it. So you have to select the service name, action name and the user name for this message. If the message needs parameter(s), you can create them by cHcking the Parameters tab and select one of the available parameters types.

Select the Simple Parameter from the combo box to create a simple parameter for your message, then select the parameter name and type, and fill the Param Value of the parameter, this value is the real parameter value at runtime.

If the parameter value is not a simple one, then select the Composite Parameter from the combo box. This will enable you select any composite value and use it as a value for this parameter.

A user can choose between two options to get this value.
Click the Select Value link and set the class type and the search criteria, which will be used to search for the parameter value.
Click the Create Value link and set the class type and the draft code, which will be used to search for the parameter value in the draft values.

Simply use the Collection Parameter when you need a collection of composite ones. The Step Expression is used to ensure that the result is correct
The Expression Name: it is unique for the all Step Expressions.
The Expression Value: is a Palmyra expression. Fill the Test Search Result name (which is unique), the Class Type and the criteria; the Test Search Result will search for values from the Class Type Test Collection Search Result is use to check the number of the results, set the class type, the criteria used in search and the expected values' number.

AutoTest also provides a dropdown menu for Test Script creation. To search for an old Script or creates a new one, click the Script link in the AutoTest menu, then the new button to create a new Script. Fill the Script Name, and select the Script State from the combo box (optional), the Script may or may not have its own State.
  a. Add TestSteps to the ScriptTest Via the StepOrders Tab.
To Change Steps Order within the Script is important, because the execution flows from the first Step to the last one considering this order. Fortunately you can change this order whenever you want, by using the arc links.

AutoTest provides a dropdown menu for Test Suite creation. To search for an old
Suite or creates a new one, click the Suite link in the AutoTest menu, then the new button to create a new Suite. Fill the Suite Name, and select the Suite State from the combo box
  (optional), the Suite may or may not have it own State
  b. Add TestScripts to the TestSuite via the ScriptOrders tab.
To Change Scripts order within the Suite is important, because the execution flows from the first Script to the last one considering this order. You can easily change this order whenever you want, by using the arc links.

3. Running TestSteps, TestScripts and TestSuites

Autotest enables running a pre-recorded or created testScript, TestStep and TestSuite; this is done by simulating automatically the user inputs into the application and comparing the generated results with the recorded equivalents. A specially designed user interface is provided for the execution of TestSteps, TestScripts and TestSuites. Autotest generates a report that contains all the differences (if they exist) between the obtained and recorded results. The report is then used to analyze the potential anomalies. After analyzing the results and making the necessary corrections, the application developers may decide to update the test script when the differences of results is because of enhanced features of the new version. Autotest provides the possibility to automatically update the recorded scripts by emulating the user-inputs and re-recording the results.

Running a teat step, script, or suite is as simple as running a step, just enjoy the three phases game:
  Search;
  Select; and
  Run 4. AutoTest Recorder The AutoTest Recorder provides an easy and fast way to create Script Tests.

By default the Auto Test Recorder records all services that are different from Palmyra services. But in some cases you may even need to record Palmyra Services; you can simply do that by adding the Palmyra Services name to a configuration file.

It already contains some entries; illustrating you how to add more:
  coin,palmyra. arch. lifeCycle.adapter.manager.LifeCycleEx ecuter=fireEvent, fireEventWithoutconfig
  com.palmyra. arch. scheduler. ctrl.JobEntryExeController=
  . immidiateExecuteJobEntr
  com.palmyra. rch.pe sistence. entitymanager= synchronize Recorder Menu: From the AutoTest menu click the Record link:
Then you can choose between just records a Script Test, or a Script Test and its Record
Results.

Start recording scenarios: Input the Script and Step prefix names (optional, a default ones will be used if you didn't select ones), then click the Recording button, and wait till the confirm message.

Play test scenario: And now you can play your pre-prepared scenario.

Stop Recording: Stop me Recorder when you finish your scenario Start Recording scenarios and results: You may need to know about the Record Results before starts recording them. The Record Result presents an entity used during the scenario, in this case the recorder hash each entity that should be synchronized into a string, then on running the same Script Test again, the AutoTest compares these stored hashes with the ones calculated during the running. You can exclude some fields from the hashed entity by assigning a Record Config to the recorder. (Have a look to the next section to know how to create Record Configs)

Create Record Config: In the AutoTest menu, select Create Record Config. Input a unique name. Select the entity to exclude some of its keys. Then, select me keys mat you want them to be excluded from the hash of Ihe selected entity.

5. The Script Delete

The main purpose for the Script Delete is to rollback the database to a previous state, to understand why you may need this feature in some scenarios.
  The scenario—to be tested—creates and saves a new instance of the entity (City) in me database; me city name is always Paris.
  The action name is (createCityO)> it has no parameters as input
  The (City) has two fields, its name (name), and a sequential id (number), it starts from 1000.

When you successfully record this scenario for the first time, a new city will be added to the database:
Name_Number_
28052008 Paris 1000
If you try to run the recorded-scenario, you will absolutely get an error message; it notifies you that there is already a city in the database with the same unique name (Paris).
And if you somehow managed to change the city name in the database to another name like (London), and run the recorded-scenario, then the AutoTest will report an error in its log, because it expected a (number==1000), while it got (number==1001) at run time. This happened because of the sequence field is automatically increased.

This is a classic example of when you need the Script Delete functionality, because you have to delete the old city from the database, and also reset the sequence value of the field (number) to (1000), before running scenario.

A script delete can be generated according to a Delete Configuration that contains the list pf classes to be deleted and a list of sequences to be deleted.

The list of those classes is specified in Class Configuration and Package

Configuration. In the package configuration, you can specify a list of excluded classes.

The list of sequences is specified in sequence Configuration

To delete the classes, the followings steps are executed:

Perform a delete simulation using the umeDeleteSimulation1 service from Persistence layer. This method doesn't delete a value but it is just a simulation of the delete operation. The output of this method is a collection of "DeletedObject" objects. One deletedObject is defined by a className, valuePk and a collection of 'TJeletedError' objects. If there is any problem during the delete (an error), this action won't stop the simulation but create a "DeletedError" object and associate it to the current DeletedObject that causes this error, hi case the number of DeletedErrors is less than 1000, the deletedError will have as type 'T)eletedErrorPk". Else, the deletedError will have as type "DeletedErrorCriterion".

Check the delete simulation errors: Verify that all instances specified in the deleted error list are also in the list of the deleted objects list Create a script delete using the list of deleted objects and deleted errors.

Execute the script delete.

Update the sequences in the database according to the specified sequences values in the sequence configuration witch is attached to the current delete configuration. Create Script Delete: From the AutoTest menu click on the (Search Delete Config) link:
  Click new
  Enter the Script Delete name, it should be unique
  Select the entity (City) to be deleted on running this Script Delete.
  Select the sequence (number) to reset its value to (1000) on running this Script Delete.
  Return back and save it.
  Run Script Delete: To run any Script Delete, go .the same link in the AutoTest menu (Search Delete Config), search, select and run.
  Attach Script Delete to Script Test: Now you know that you have to run the Script Delete (Delete-City) just before running recorded-scenario (createCiryO).

The AutoTest provides you the functionality of attaching a Script Delete to a Script Test This can be easily done by editing your script and assign the required Script Delete to it.
  Search and edit your Script Test
  Attach the required Script Delete
  "When you have the Script Delete attached to the Script Test, there is no more need to run each of them individually, you just have to run the Script Test as shown early in this document 6. Check the Results In order to compare and to provide the differences between the recorded result and the current test result, Autotest compare the hash code of the two results.

The hash code of a value is created from its string representation. This representation is like key1=val 1 &key2=val2 where key1 and key2 are keys of the value and vail and val2 are respectively their values. The differences between the recorded result and me current test result are the list of the keys having different values.

Note: The list of the keys used to create the string representation of the value are simple and technical keys exekding the sequence and pk code fields, the foreign pk fields, the sequence fields and the excluded hash keys specified by the tester in the Record Result Config. The best way to check the test results is to see the AutoTest log file; you can find the log file in the "autotestLogs" folder, while the form of the log file name is:
  For a Step: <step_step-name execution-date!og".
  For a Script: "scriptjscript-name execution-dateJog".
  For a Suite: "suite suite-name execution-date.log".
  Also if you are running a Step, and a failure message appears, you can check the failure reason by choking the Failures tab.

7. Autotest Import Export

There is a collection of useful tools mat helps you to import and export the data you may need to accomplish your test; you can easily access these tools from the AutoTest main menu.
  Export Draft: The AutoTest enables you to save a value as a draft in .xml file, and men you can use this draft value in the test, you can choose between two options
  Export new Draft: Press the "New" button to create a new value from the type specified in the "Class Type" text box. The AutoTest exports the new value to .xml file with name like:
  Class type: com . . . City
  The City class code is presents by two fields (name and created-date)
  File name becomes: $/drafts ClassName_ClassCode.xmlEx.$/drafts/City_Paris_01072006.xml
  Export exists Draft: Select one of the results, and then press the "Export" button, the selected value will be deleted from the database.

8. Unit Test of AutoTest

To test the methods of your application, you can use the unit test use case. In fact, using this use case you can run the method with the passed parameters, show the result and me failure values, save the configuration and then test if me method is executed successfully or not To add a Unit Test configuration you have to follow these steps below:
  Choose the action create from the menu under the path "Auto Tes VUnit Test* 1—Add a name to Hie configuration, a service name, an action name, a user name and the parameters values.

Run flic method on clicking on the button Run; the result or the failure will be added. Finally, you can save the configuration with the expected result or with the expected failure.

After running the method you can consult the result. Then to test the method, you have just to click on the button test.

9. AutoTest Report

The AutoTest generates a report for each running scenario, it contains both the success messages for the succeed processes, and the error messages detected by the AutoTest during the execution of the wrong processes. The log files can be found in the working directory of the application, and under this path:

. . . Working Directory/AutoTest autotestLogs

Report messages: Essentially, after running a scenario three kinds of messages can be found in an AutoTest report, two of them the success and warning message are good and makes you happy, however, the third one which it is the failure messages are better and should make you happier. But why the failure messages are better?

The failure message means that an out of sight error is discovered, and going to be solved, which is the main goal of the AutoTest tool, locating the errors in the tested application.

10. Debug Mode

This section shows how to turn on off the AutoTest debug mode, then how to read the resulted debug log.

When it is needed?

In most failures cases the debug-mode isn't needed, because the normal AutoTest log will lead you to solve the cause of the failure, but in very special cases the normal log isn't enough.

In these few cases the investigator needs to know what happened at both the record and run times, here comes the role of the debug-mode, it provides the investigator with, two logs to compare between them and solve the cause of the failure.

Practically the known case that you may need to use the debug-mode, is the one when you got this error in the normal log:

Step ADJnjJBlviISSIONS_rireEvent_1207239411130 has failed

[[ExecuteThread: '12' for queue: eblog.cJcemd.De&ult'] [711833142]]

Error: The type of the recorded result at this synchronization should be [X] while the found type at run-time is [Y]

Debug mode On/Off: All what you need to turn-on the debug-mode in Hie AutoTest is to add a file (debugjnode) under this path:

.yAutoTest debugdebug.mode

To turn-off the debug-mode you have to delete or rename this file (debug.mode). Debug mode usage: This usage order should be followed to get the advantages of the, debug-mode:

1. Turn-on the debug mode
2. Record your scenario (si)
3. Run this scenario (si)
4. Turn-off the debug mode The result will be a number of log files that can be found under this path:

JAutoTest/debug/step1jrecordjiniqueNum.log
step1jnm_uniqueNum.log
step2_record_uniqueNum.log
step2_run_uniqueNum.log Debug mode logs: The extra results of the debug mode (in additions to the recorded scripts) are the debug-logs files. Most of the recorded steps will has two debug-logs, one at recording time and the other at running time; you can distinguish between them by name:

.7AutoTesl/debug5tep1jrecord miqueNum.log (at recording time) step 1_nm_umqueNum.log (at running time)

Vn. Structure of Resulting Application (Palmyra Framework)

A. Presentation Layer

1. The Design of the Layer a. The Chosen Architecture

For so many reasons (among of which we have security, ma tainability and centralization of processing) the thin-client architecture was selected.

m this architecture, the software system is split to at least 3 tiers. This is a brief description for each of these tiers:

A thin client'. The thin client is the tier mat is in direct interaction with the end-user. It is said to be thin because it has no business logic at all. It only provides the means to communicate with the user, and it may be installed on every machine used by the users. As a product, it can be part of the complete software solution, or a third-party product such as a web browser.

A presentation tier. This tier runs on the server-side. It communicates with the thin-client through some network protocol. It knows how to delegate requests to the proper business services, and how to display results by sending responses back to the thin client It also enables the user to go from one use case to another.

A business logic tier: It is in this tier only that the business logic of the application is performed. It can be thought of as a number of services that call each other, that are called by the presentation tier, and that know how to connect to the database when it needs to process stored data.

The first two tiers .are all that interests the presentation module, and we will be focusing on these two tiers later in this document.

b. The Chosen Design Pattern

The design pattern that proved useful for applications with the previously explained architecture is the MVC2 (stands for Model, View and Controller) design pattern in which the application is split into the following three components: The Model: The model provides a set of services to access the database (or the state of the application) and to run business processes.

The View. A set of components that know how to construct the user interlace for each possible use case.

The Controller'. The component that receives requests from the client and sends responses back to it. It knows how to turn these requests into internal requests and how to' delegate them to the proper services in the model. It also knows how to choose the proper view component that will construct the user interface.

c. Closer Look at the Controller

In the MVC2 design pattern, it is evident that the controller component is solely responsible for communicating with the thin client, and so, it should understand the network protocol that connects it to the thin client, and it should also understand the language of the thin client so that it can interpret its requests, and synthesize responses back to it. So, we expect that much of the code that implements the controller component is client-dependent.

On the other hand, the controller is also responsible for delegating requests to the proper service in the model, and for choosing the view component that will decide the content of the response. This functionality has nothing to do with the type of the thin client.

As a result, the controller component can be thought of as the union of the following two units:

The Presentation Port'. It is the only unit at which the client can connect to the presentation tier of the application. It knows all the technical details related to the communication with the thin client The Presentation Controller. It is the unit that receives client-independent requests from the presentation port, delegates processing to the proper service, selects the proper view component, and sends a client-independent response back to the presentation port.

Figures 47J, 48:
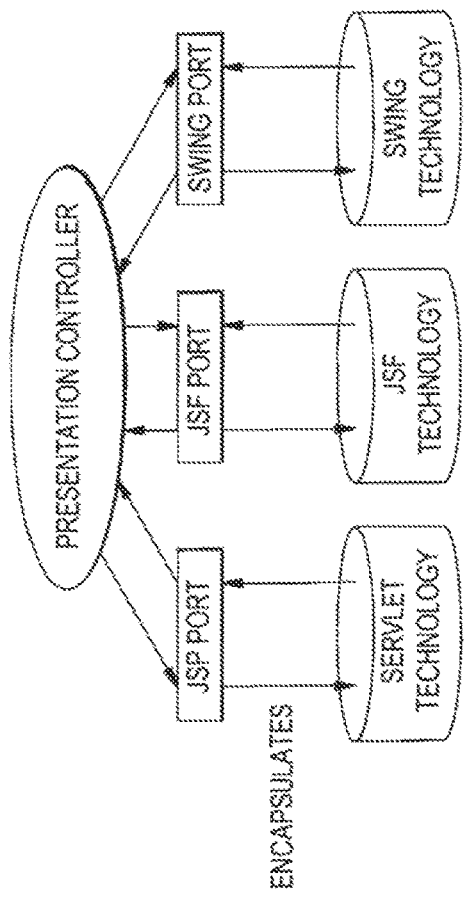
FIG. 47J is an exemplary screen of the result of track execution of job scheduler.
FIG. 48 illustrates a design of a presentation controller that allows it support many technologies.

FIG. 48 shows how the presentation tier can support many technologies thanks to its design.

d. The Big Picture

Generally, the interaction between the user and the presentation module starts by sending a request, using some thin-client, to a presentation port mat is "listening" to the client. This request is client-dependent, and the presentation port has to convert it to a client-Independent request Once it docs that, it forwards this request to the presentation controller, which will perform the necessary action to process this request Once the presentation controller handles a request, it can now respond to it. The response must come in the form of a new graphical user interface, or an update to an already-displayed interface. The controller should know the graphical components to be rendered or updated and the values to be bound to them. However, since the presentation controller does not know how to communicate with the thin-client, it should do that through the presentation port itself, which must provide the means for the presentation controller to render the user interface. Thus, when the presentation port invokes the presentation controller to build the user interface, it should pass an object (a Renderer) that the presentation controller will use to render components on the user interface.

The components displayed on the user interface are usually graphical representations to the values in the current session. When the presentation port receives a request due to an interaction between the user and a displayed interface, the port knows the graphical components that were updated, but it does not know how to update the values they represent. So, the Renderer is also a way for the presentation controller to pass objects (Value Bindings) to the presentation port to help it update the values in the session when the port receives a request from the built user interface.

In order to avoid over-writing the session data of one user interface with the session data of another, each user interface (or page) must have its own memory space in the session. We will refer to these separated spaces as the Page Data. The presentation controller is the component that knows how to create, Mtialize and update a Page Data object, but it is the presentation port that knows how to keep the Page Data object returned by the presentation controller in the session, and how to associate it with the rendered page (or user interface).

Figure 49:
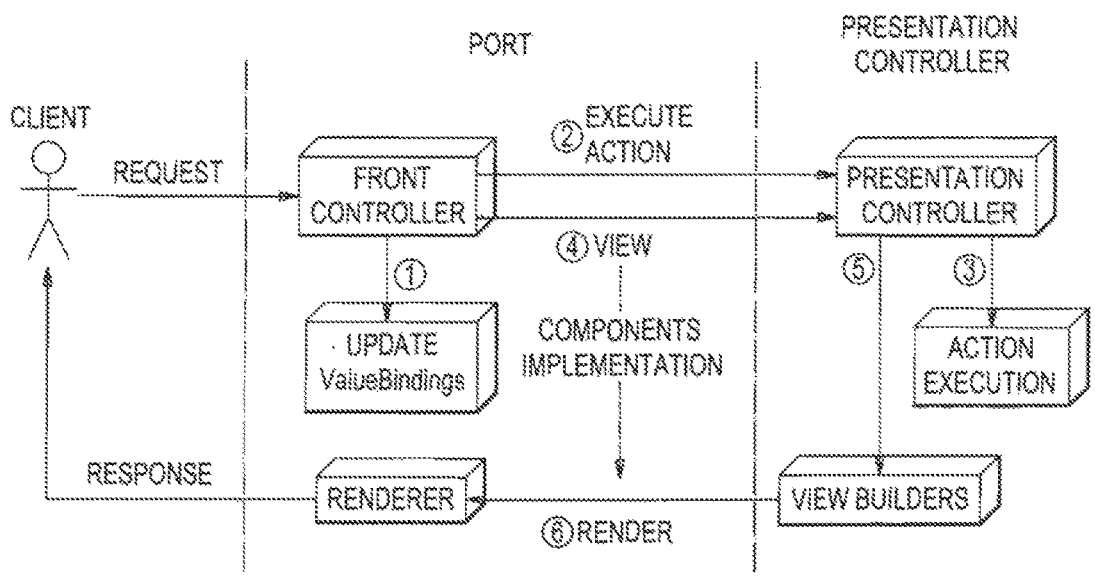
FIG. 49 illustrates an exemplary process of responding to client request via presentation controller and associated components.

Of course, in order to conform to the MVC2 design pattern, the presentation controller should not itself process the requests received from the presentation port, nor should it build the page, even though this is what it seems to do from the point of view of the presentation port. Instead, the presentation controller should locate the appropriate service that would handle the received request or action. From now on, we will refer to this service as the Action Handler'. Similarly, when viewing or rendering a page, the presentation controller must locate the appropriate view component, or a View Builder, that knows how to render a page, and invokes it passing to it the Renderer object. FIG. 49 is an illustration of the above example, e. Abstraction of the Presentation Port In order to make an abstraction to the presentation port, we must define the language of communication between it and the presentation controller. This language can be expressed in terms of the objects that are exchanged between the two units. To follow is a list of these objects:

The Request: The request contains any data sent by the client. This data includes the targeted page or the use case to begin, and any additional parameters that affect the execution of the business logic. The interface of this object must be declared in the presentation controller, and each presentation port should provide its own implementation of that interface. The implementation will most likely wrap the client-dependent request.

The Page Data'. This object represents the session space reserved for each displayed page. Thus it should be stored in the session. It should be identified using a unique identifier so that it can be referenced in later requests responses.

The Session: In much the same way the request wraps a client-specific request, the session also wraps a client-specific session. The interface of this object, which must be declared in the presentation controller, contains only the necessary methods to add Page Data objects to the session and to remove them from it.

The Renderer: The interface of mis object (must also be declared in the presentation controller) defines the set of components that any presentation port should know how to build. Each presentation port must provide its own implementation of this interface. It actually must wrap the client-specific response.

The Value Binding: "When the View Builder invokes the Renderer to build the user interface, it should pass to it instances of this class to specify how each visual component maps to the values in the Page Data, These Value Binding objects can be used later by the presentation port to update the values in the Page Data (i.e. when a new request is received).

£ Locating the Appropriate Action Handler/View Builder

In the traditional approach of request handling, the controller reads the parameters in the request, and then, it runs through a chain of if-else statements (and nested if-else statements) that would eventually lead to the right action to be performed. In this approach, the code of the controller is hard to maintain, because if a new action (which handles a special request) must be added, then the chain of if-else statements must be modified, and this might introduce bugs.

A better approach is to use the registry/factory design pattern. In mis approach, me actions register themselves at a factory. When the controller receives a request, it looks up the action that is interested in this request from the factory. The registration and look-up operations are done using a key object This key may be built from data in the request and related data in the session. The View Builders must be located the same way.

g. The Need for a Context

Suppose that the user interface contains a "Save" button, and the user clicks on it Jh this case, the presentation controller will receive a request telling it that a "Save" action must be done. The presentation controller will look up the handler registered for this action and invokes it. This is the simplest possible case, and from it, we conclude that the key used in the look-up operation is the action name associated with the pressed button. However, mis is insufficient, since the action handler registered for the "Save" action will handle all "Save" actions regardless of the page in which the source button exists. This means that the presentation controller needs to know the precise context, in which the event happened.

i. Defining the Context

Any user interface is actually a visual representation of one of the entities of the system, and each entity in the system is an instance of some type. The actions the user performs (such as the "Save" action) ma be handled differently according to the entity type. This means mat me type of me entity the page displays is part of the context In addition, interaction with any page is actually a special case of one of the following known use-cases:

Edit: It is the use-case in which the user creates new entity or updates an already existing entity.

View; It is the use-case in which the user views an already created entity.

Search Input: In this use-case the user specifies search criteria with which he/she will search for entities.

Search: This is the use-case in which the user displays the found entities that meet the criteria specified in the search input use-case. lathe example given above, the "Save" action is a business action performed on the displayed entity. There are other types of actions used to navigate the displayed entity. Using such actions, the user can view the entities related to the displayed one. Yet there are other types of actions that can originate from a user interface. The actions that refresh the page, or the content of its components, when one component is modified, are examples on such actions.

To sum up, a context can be defined using the following attributes:

The use case name.

The entity type.

The action type (visual action, technical action, navigation, refresh, light refresh).

A parameter that indicates (depending on the action type) the action name, the navigation role, or the modified component.

ii. More Precise Context

The above-mentioned context is a simple one that may not be sufficient in some cases. In general, we need to know the precise context in which an action was performed. The precise context is defined in terms of the simple context of the current page, and the precise context of the caller page. The caller page is the one from which the user accessed the current page.

Figure 50:
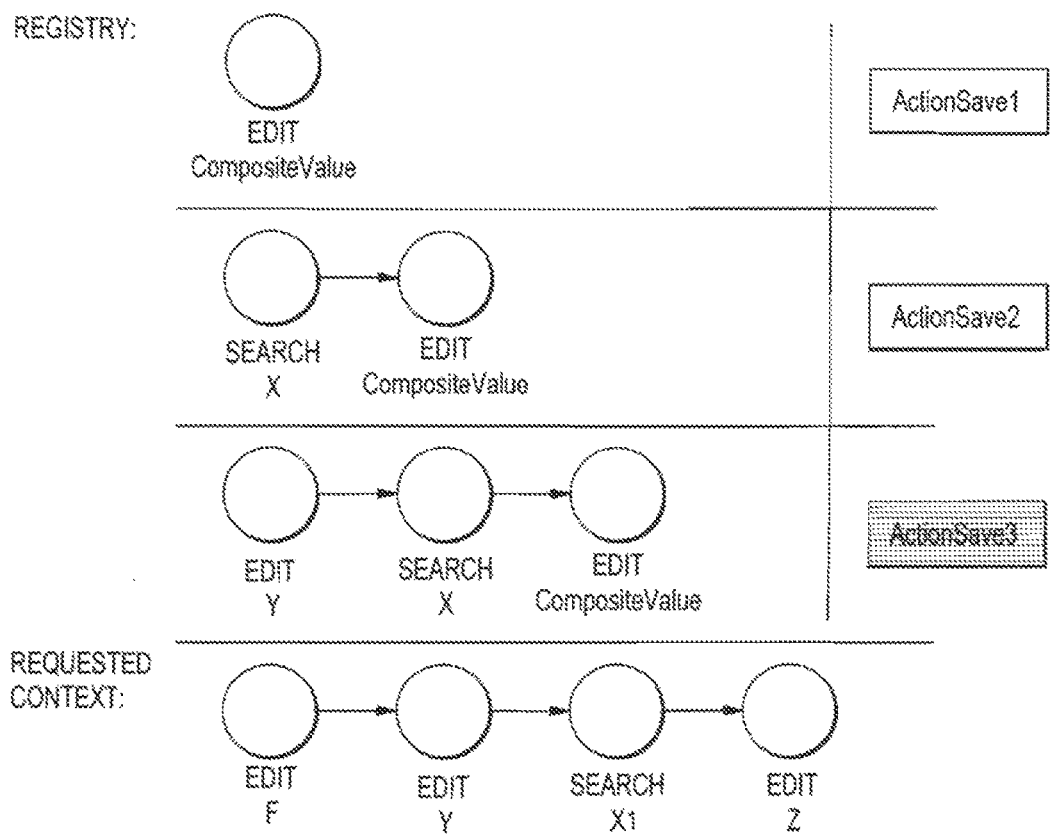
FIG. 50 illustrates retrieving an action based on a context.

FIG. 50 illustrates how the action will be retrieved from the factory from a given context.

h. Super Action Handlers/View Builders

By default, the presentation module will register basic actions and view builders for the most general and known use cases. For instance, for the following context:

Use case: Edit.
Entity type: Any (i.e. Composite Value).
Action type: Action.
Parameter: Save.

We will find registered a default action handler that invokes the "synchronize" method. Suppose that one request had the following slightly different context—

Use case: Edit.
Entity type: Currency (a sub-class of Composite Value).
Action type: Action. Parameter: Save.

Even-though the context is different, but since no action handler is registered for it, the presentation controller should select the "Super Action Handler", which, is the handler registered for the more general case (i.e. the default action handler).

i. The Action Handler Interface

Every Action Handler on the system must implement the interface conupalmyriLarch.presentatiot actionŝc onHandler:
public interface ActionHandler {
TargetInformation executeActio (Request request, PageData pageData, SuperActionHandler superAct on);
BindingsMap getPossibleBindings (PageData pageData, String key, SuperActionHandler superAction); Mod fiedKeysJnfo getModifiecL eysliifo (PageData •pageData, SuperActionHandler superAction);
String getAc ionPosi tionToUpdate (PageData'ageData, SuperActionHandler superAction)/
}

This interface has 4 methods, the more important one is executeAction, and its role is to execute the business logic related to this action. It has three parameters:

(1) The Request. The request contains any data sent by the client. This data includes the targeted page or the use case to begin, and any additional parameters that affect the execution of the business logic. The interface of this object must be declared in the presentation controller, (2) The Super Action Handler. Very often, a developer needs to extend the action handling functionality for a special case. This means that the developer needs to call the super action handler from within his/her action handler. Instead of knowing and extending the actual type, of the super action handler, the interface of the action handler must allow passing a special object (with an interface similar to the action handler interface) through which invocations can be made to the super action handler. This way, the developer need not know the actual type of the super action handler, or how to locate it. The same technique must be used with view builders. (3) The Page Data. Obviously, the data of Ifae page is the input to the business service that will handle the request of the user. Since this data is kept in a Page Data object, which is the session space dedicated to the displayed page, then this object should be passed to the action handler.

(4) The Target Information. After executing an action the presentation controller will do one of the following operations, and it is the responsibility of the action handler to tell the presentation controller what to do next by retaining a Target Information object:

Calling a new page: 1 this case the action handler must specify in its result the context of the called page (including the action to be performed upon calling it), the data to be passed to the called page, and the action to be executed upon returning from the called page.

Forwarding to a new page: It is similar to the previous case, only the called page cannot return to the caller page, and so, there is no need to specify the action to be executed upon returning.

Staying in the same page This allows performing another action without transferring control to another page. The action type and name is found in the simple context in the Target Information object Returning to a caller page: The action handler must specify the data to be returned to the caller page.

None of the previous operation.

Thus, the Target Information object must contain the following attributes:

Navigation Type: It could be Call, Forward, Stay, Return, or None.

Target Context: Used in case the Navigation Type was either Call or Forward.

Use Case Configuration: The configuration to be passed to the called page (for example the value to be viewed)

The On-Return Action: The name of the action to be executed upon returning from a called page.

The On-Return Action Type: The type of the action to be executed upon returning from a called page.

TABLE T1 is an example of Presentation generic Action Handler ActionSave Table T1: Example of Presentation generic Action Handler: ActionSave j. The View Builder Interface Often, when a page calls another, the called page must be rendered inside the caller one. To allow this to be abstracted, the View Builder must have the following method:

buildView. The Presentation Controller will nest calls to the View Builder of a page within the calls to the View Builder of the caller page. To follow is the input of any view builder:

The Page Data: The page data must contain the data to be presented visually by the view builder.

The enderer: The object provided by the Presentation Port to aid the Presentation Controller in rendering the visual user interface.

The Request: Sometimes the presentation controller may decide that some pages must be updated only, without rendering them entirely. For this reason, it is useful that the View' Builder contains the following method that is used in this case:

updateKeys. The update eys method must return a list of the components to be updated.

This is an example of a ViewBuilder interface: public interface Vie B ilder {

Container buildview(Renderer Tenderer, Request request, PageData pageData,

SuperViewBuilder superViewBuilder);

* Returns a Set of components to be updated. */

Set updateKeys (Renderer renderer, Request request, PageData pageData,

SuperViewBuilder superViewBuilder, Set modifiedKeysInfos, Form form);

} k. The Page Data

As mentioned before, the Page Data is the session space reserved for each displayed page or user interface. Page Data objects have identifiers used to access the page data in the session. These identifiers are also used to bind rendered forms to their corresponding Page Data objects. However, once a Page Data object is located, the context of the page must be restored so that the Presentation Controller can locate the appropriate Action Handler that will operate on the found Page Data object. The best way to restore the context is by keeping it in the Page Data object itself In addition, since pages call each other, and since these pages must be rendered in the same frame that represents a whole use case, it is useful to let each Page Data object keep a reference to the Page Data object that corresponds to the caller page.

Given this, the Page Data object need not keep its whole context. Instead, it only needs to keep a simple context (i.e. use case name, class name, action type and the parameter). The rest of the context information can be found in the caller Page Data object. In fact, if we derive an interface from the Context object, the Page Data object can be thought of as an implementation to this interface.

L How the Presentation Controller Works

When the presentation controller receives a request, mis request either will initiate a new use case, or it will be part of an already initiated one. In the former case, the request must contain the simple context of the use case to be initiated. la the latter, the request must provide a\reference to the targeted Page Data object and information about the action to be performed. "When initialing a ew use case, the Presentation Controller must create a Page Data object and initialize it by copying the context information to it. For already initiated use cases, the Presentation Controller must only copy the information about the action to be performed from the request to. the Page Data object. This will actually modify the context of the Page Data object In both cases, the Presentation Controller must locate the proper Action Handler object and invoke.it. The Action Handler object will return an Target Information object that determines what the Presentation Controller should do next. The Action Handler may decide to call a new use case, and thus a new Page Data object must be constructed and linked to the Page Data object of the calling use case, and a new Action Handler must be invoked. This means that the Presentation Controller will go into a loop that breaks when the last called Action Handler decides that no further actions should be performed.

2. GUI

The generated application automatically provides a web-based user interface. The automated UI generation process takes the metadata (which includes class and process) as input and output visual elements which can be implemented as HTML page or native screen libraries. The generated pages are basic use cases to create new objects, to search for already created objects, and to edit or delete objects. The Palmyra framework automatically generates screen pages used to create, edit, and search the objects of the Entity class types that are defined in the UML model of the target application. The contents of the screens are generated in accordance with the fields and relations of the entity classes by using an algorithm to generate a default layout of the screens. The algorithm generates the layouts based on the structure of the classes and then the view format tool can later be used to re-allocate the visual element if needed. The usage of the visual elements that represent the fields and relations (text boxes, combos, lists, links) and their distribution on the screens might be manually modified later using the View format configuration tool. The modification of the user interface using the View format configuration tool can be performed at runtime. The automatically generated screen-pages contain a set of predefined buttons that launch actions like save or delete or search. Process-related actions (defined in the process diagrams) are also automatically generated in the target application.

Specific actions can be also be added on pages when new use-cases are defined in the target application using the use-case transition diagrams.

When specific actions are added, the action-related treatment is written manually and integrated in the application using the UML generation tool.

The manually written code is necessary when the required treatment is not predefined or needed to be enhanced in accordance with a specific need.

a. Dashboard

Also as part of the Graphical User Interface, the Palmyra application provides the users with the Dashboard tool. A dashboard is a tool that helps each application user to know his "To Do" list, and it also provides an indication about the volume of his tasks. The dashboard lists the tasks that a user has to perform. Each user has his own list of tasks depending on his properties. The service provides configuration interface to allow a super user to assign properties and conditions to users. It also guarantees that all tasks are assigned.

A dashboard is a set of nodes, each node contains sub nodes. Each node deals with an entity. Entities are displayed according to conditions defined by the administrator of the dashboard. A list of tasks corresponds to each entity. A task is a link to the product use case allowing the achievement of this task. The configuration of the Dashboard is performed at run time.

3. Input and Output Devices a. I O Devices

The Input and Output devices are the gateways of machine based communication ■ with other systems. The framework defines the templates that input and output devices should follow. It also defines some input and output devices that support common protocols like FTP, HTTP, Queues, Emails via SMTP, printers and faxes (as output devices).

The communications are made using message exchanges. The input devices accept messages generated from other systems to be read by the target application and the output devices send messages generated by the target application. Independently from the communication port and the type of input device used, messages arriving to the system should be parsed in order to transfer the message into data represented in a suitable manner for the target application. This is done through two separate modules, the drivers and the mapping.

The messages generated by the system depend also on the mapping and drivers in order to transform data from internal representation into an intermediate form and eventually into a message.

b. Mapping

The Mapping module is a configuration-based format transformer. The configuration defines the source and target type (two entity class types defined in the metadata of the target application) and defines how to transform field-values of the source type into the field values of the target type. The transformation formulas are written using the expressions language defined by the framework. The expressions provide the possibility to make arithmetical operations or to invoke predefined methods on the field-values of the source element. The configuration also provides the possibility to add conditions on the mapping instructions, so that only the instructions with satisfied conditions are executed.

The mapping configuration is done after the deployment of the application, and the configurations are stored in specific database tables.

The mapping module is principally used in Input and Output operations wherein data is converted from internal system representation into intermediate representations used by the drivers and vice-versa.

c. Drivers

Drivers are used to read from or write into specific formats. In Input devices, messages arrive from external systems having a predefined format like XML or XLS or SWIFT. These messages are parsed and converted into intermediate structures defined by the driver. In Output devices, messages are generated in order to communicate with other systems. The generated messages also have predefined formats.

For each format or type of format a driver can be created. The framework defines the template of drivers. It also defines a set of drivers for some formats like XML, fixed text, and swift messages. Some drivers require configurations, especially when the format is flexible. For example, XML is a format but it is also a language so the structure of the tags and elements are defined in a schema at runtime and the configurations are stores in a specific database table.

C. Business Layer

1. Basic Structure

The template that defines the metadata in the f amework is called the basic structure. It is considered the core of .the Palmyra f amework because it is used by all the f amework services. All the metadata 'definitions, whether by means of generated code or by dynamic definition using constraint models or by means of written code, is based on the template defined by the basic structure. By using the predefined template, all the implementing types inherit the functionalities of integrity checking, serialization and de-serialization, and the possibilities of having automatically calculated fields.

Basic Structure defines the syntax and basic behavior for all entities in the framework. It is a set of interfaces and classes that adds new features to the basic classes in Java. It is composed of classes that are used in the development of applications. These classes are wrappers for the Java primitives and Java Collection framework.

a. Packages of Basic Structure

Figure 33:
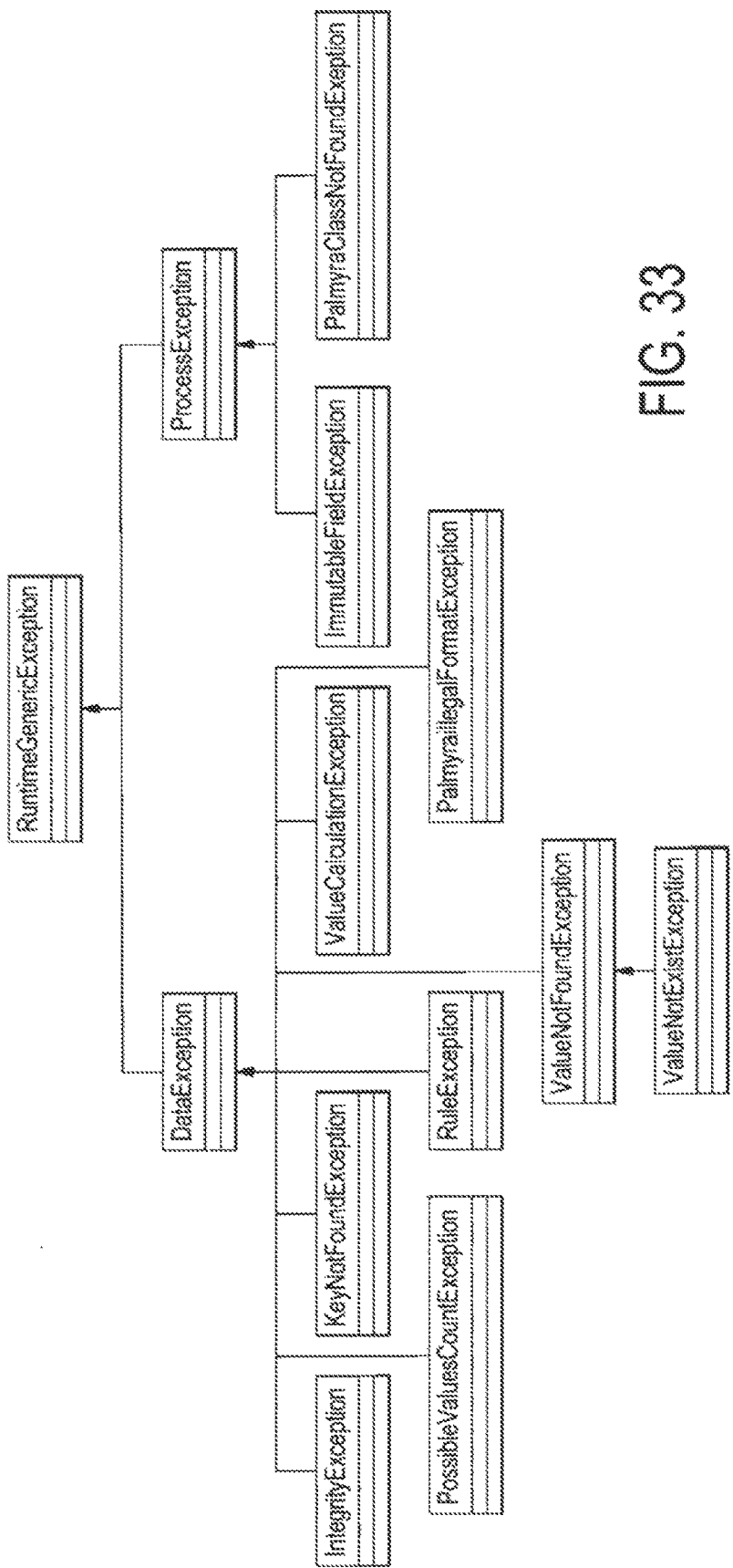
FIG. 33 illustrates the exceptions provided by com.palmyra.arch.basicStruct.exception.

The main package com.palmyra.arch.basicStru.ct contains several sub-packages. The most important are:

com.palmyra.arch.ba5icStruct.data: This sub-package contains simple and structured data classes in the framework.

com.palmyra.arch.basicStruct.metadata: This sub-package contains descriptor or meta-data classes, the list of deamons, integrity checkers and domain managers.

com.palmyra.arch.basicStruct.exception: this sub-package contains the framework customized exceptions. FIG. 33 illustrates the exceptions provided by this package.

com.pabnyra.arch.basicStruct.imt: this sub-package contains the main class General tializer.java responsible of loading all Palmyra classes when staring the server.

com.palmyra.archbasicStmct.interfaces: Ibis sub-package contains the definition of the interfaces to the different modules in the f amework such as: configuration, security, sequence, trace, persistence, translator, lifecycle and file manager; this sub-package also contains a default implementation for each interface.

com.palmyra. arch. basicStruct. io: this sub-package defines a list of interfaces allowing the definition, the configuration and the registration of drivers.

b. Package corn.palmyra.arcli.basicStruct.data

This package contains the basic constructs in the framework. Classes in this package are the main data blocks used in building applications under the Palmyra framework. These classes implement the interface Value that is the highest abstraction level in the framework. This interface defines the common behavior between all framework objects. The Value interface states that all implementing classes will be Cloneable, Comparable, and Serializable. In addition, implementing classes can be constructed from properly formatted human-readable strings and XML documents, and implementing classes can be saved to similar strings and XMLs. Every value is associated with a metadata descriptor class of type Classe that can be used to inspect the definition and nature of this value. Table 13 illustrates the main methods defined in the Value Interface of Package com.palmyra. arch.basicStruct. data:

TABLE 13

Main methods defined in the Value Interface of Package com.palmyra . arch .

basicStruct . data package com . almyra . arch.. basicStruc . data ;
public abstract interface Value extends Serializable, Cloneable, Comparable,
   PalmyraSerializable {
void checkIntegrity (int intO) throws IntegrityException; void checkIntegrity ( ) throws
   IntegrityException/
void checkRules ( ) throws RuleException;
Classe getClasse ( ) ;
Classe getClasse (String key) throws ProcessException;
Field getField( String key) throws KeyNotFoundException;
void setValue (String string, Profile profile) ;
void setValue (String string) throws IllegalFormatException; void read (Inpu Stream
   inputStream, IODriver iODriver) throws IOException;
void read(IaputSlxeam inputStream, String string) throws IOException; void write
   (OutputStream outputStream, IODriver iODriver) throws IOException;
void write(OutputStream outputStream, String string) throws IOException; Objeat clone
   (boolean booleanO) ;
Object clone ( ) ;
void deserialize (String string, String stringl) ;
void deserialize (String string);
String toString(Profile profile) ;
void. set (String string, String stringl, Profile profile) throws KeyNotFoundException,
   IllegalFormatException;
void set(String siring, String stringl) throws KeyNotFoundException,
IllegalFormatException; void set (String string, Value value) throws
KeyNotFoundException;
} c. Basic Struct Main Roles basicStruct is composed of SimpleValue(s), CollectionValue(s) and CompositeValue(s).

Figure 32:
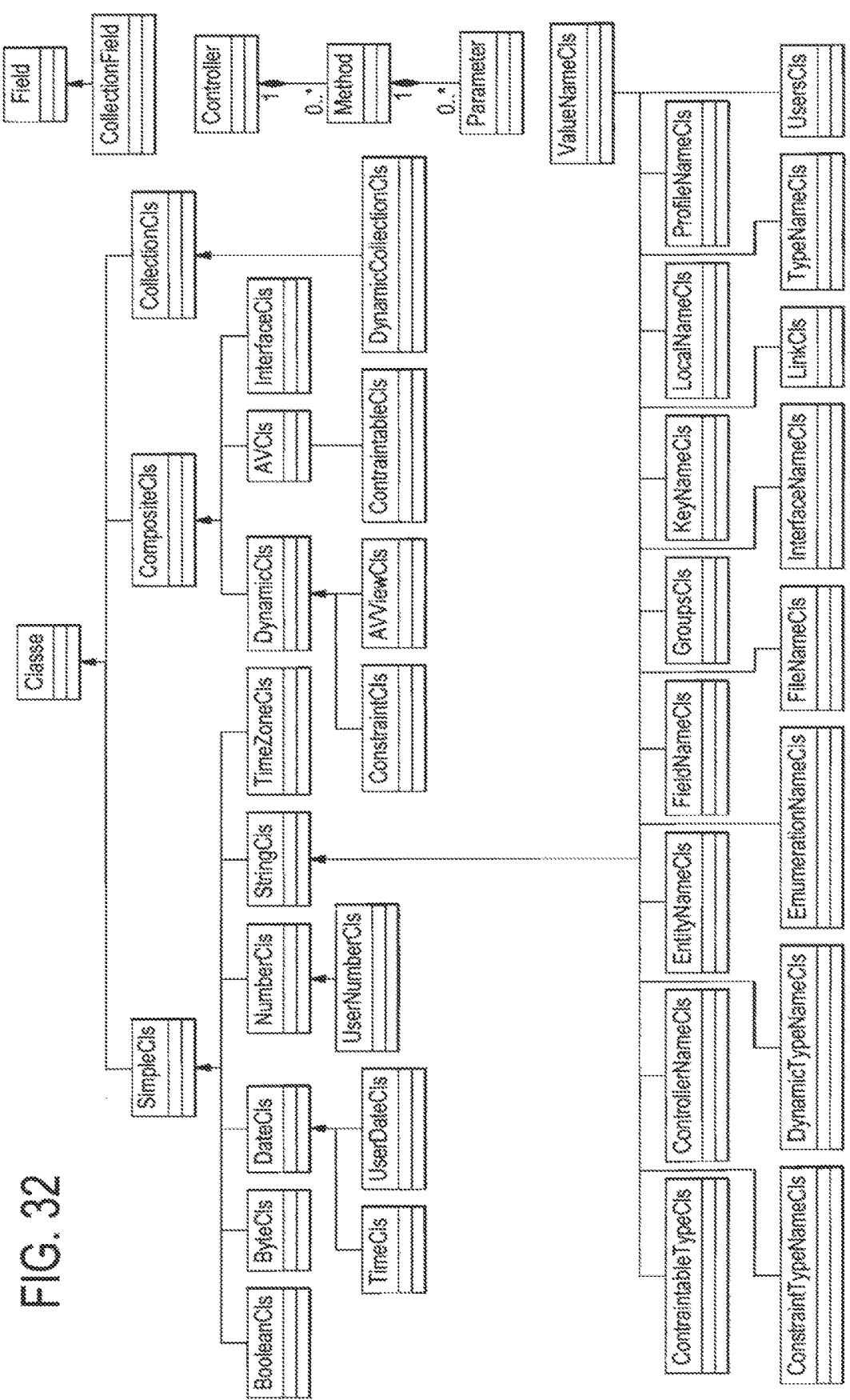
FIG. 32 illustrates the composition of Classe.

Each one of these types requires special procedures for use. However, there are common rules in using all of the mentioned types, these rules are:

Each Value object has a Classe instance associated with its Class type, this instance is the description of this value and is provided through the getClasse method. FIG. 32 illustrates the composition of Classe.

Each Value object has a default constructor, a string parameter constructor, and a method setValue. This method takes a string and constructs the content of the object from this string.

Each Value can provide its content in a readable string format.

In general, changing the constraint of a Value is achieved by sub-classing the Value class and creating a new Classe instance and associating it with the new class of the Value.

"When sub-classing any Value class, the user should always create the proper instance of Classe that describes this value, override the getClasse method, and explicitly declare the default constructor.

Figure 30:
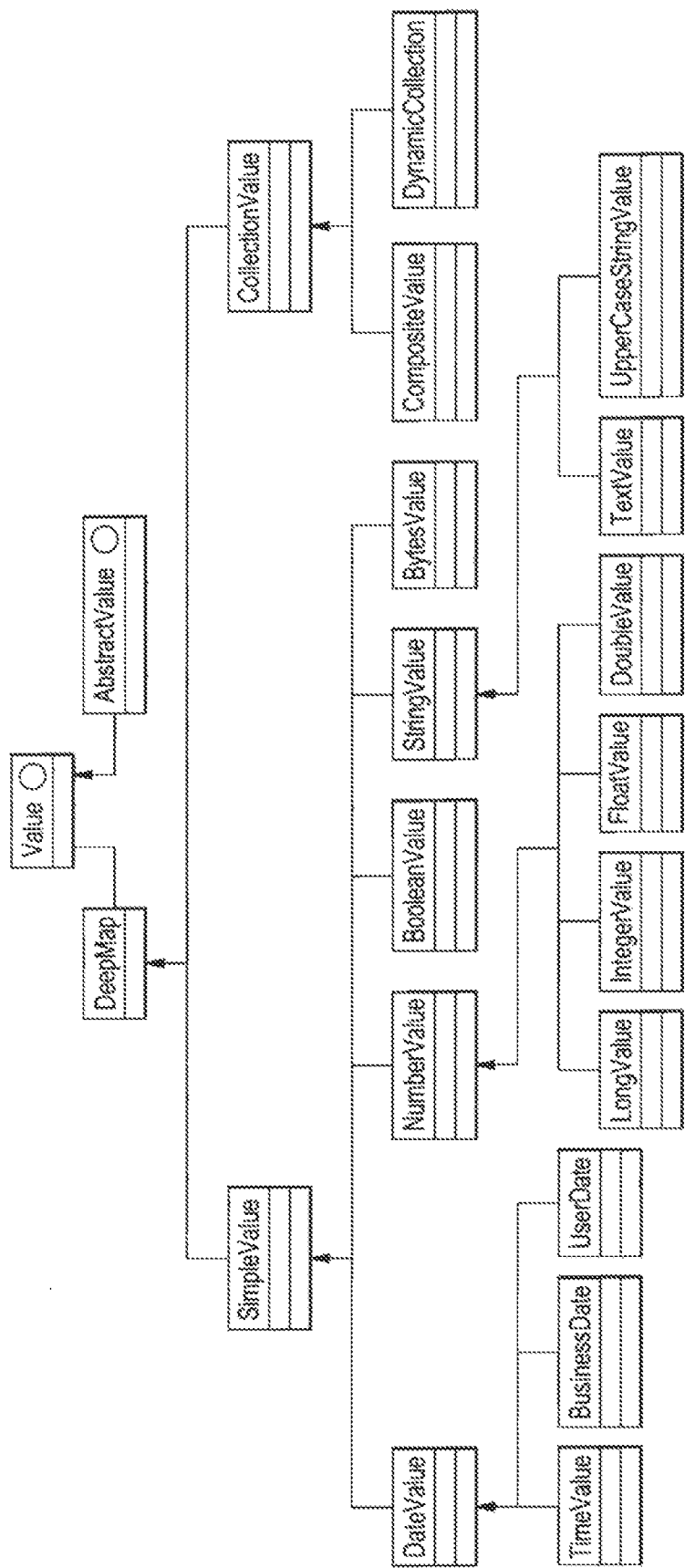
FIG. 30 illustrates the main methods defined in the Value Interface of Package com.palmyra.arch.basicStruct.data.

The main methods defined in the Value interface are: methods for content checking, checkIntegrity, and checkRules; methods for getting meta-data information about the object, getClasse, and getField methods for reading and saving the object in different formats, read, write, setValue, andtoString; and naming methods. FIG. 30 illustrates the main methods defined in the Value Interface of Package c0m4jalmyra.arch.basicStract.data.

d. Value Interface

The Value Interface has three varieties of implementing classes. The SimpleValue classes are a counterpart of Java primitives or wrapper classes, or it can be simply an atomic or simple value. The CollectionValue class is a counterpart of the Java collections API, or it can be simply a collection of homogeneous items. The CompositeValue class is the counterpart of a Java class, or it can be simply a container that has items of different types.

e. SimpleValue

The SimpleValue class is the abstraction of a single or atomic value in the architecture. That means any instance of this class contains, logically, one value. Subclasses of this class are wrappers of the Java simple data types.

Figure 36:
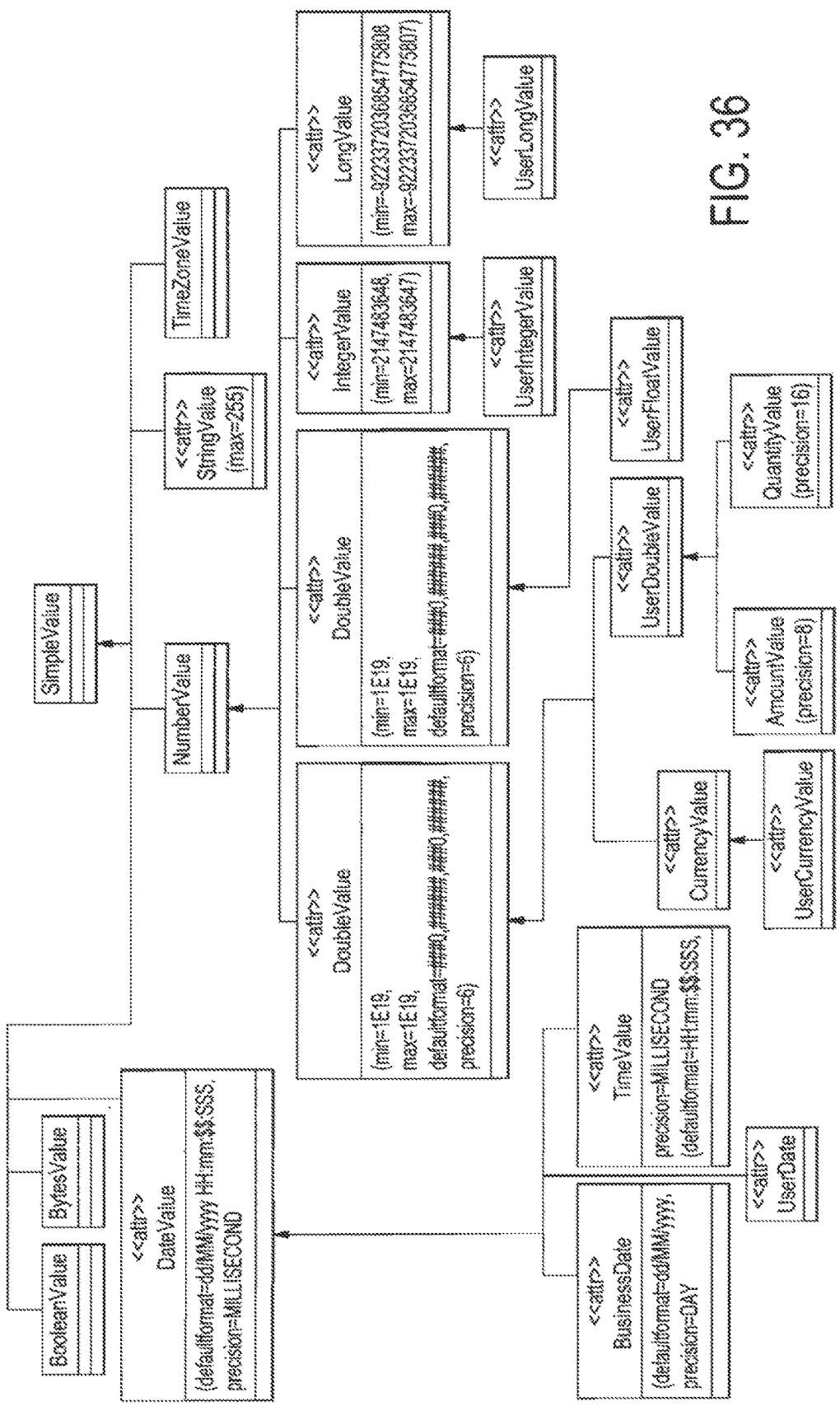
FIG. 36 illustrates an example of the class diagram of SimpleValue type and its subclasses.

FIG. 36 represents the class diagram of SimpleValue type audits subclasses.

i. BooleanValue

This subclass is a wrapper Java boolean primitive. The BooleanValue has no special constraints or rules. TABUS 14 illustrates an example listing of Boolean Value. In TABLE 14, two BooleanValue instances are created. The second one is created and has its content set from me string parameter;

TABLE 14

Example of BooleanValue

BooleanValue bv1 = new BooleanValue ( ) ;
BooleanValue bv2 = new BooleanValue ("true" ) ;
bv1 . setValue (true) ;
System. ou .println(bv1 . getValue ( ) ) ;
System, out .println (bv2) ;
System.out.println (bv2. getClasse ( ) ) ;

ii. StringValue

Figure 34B:
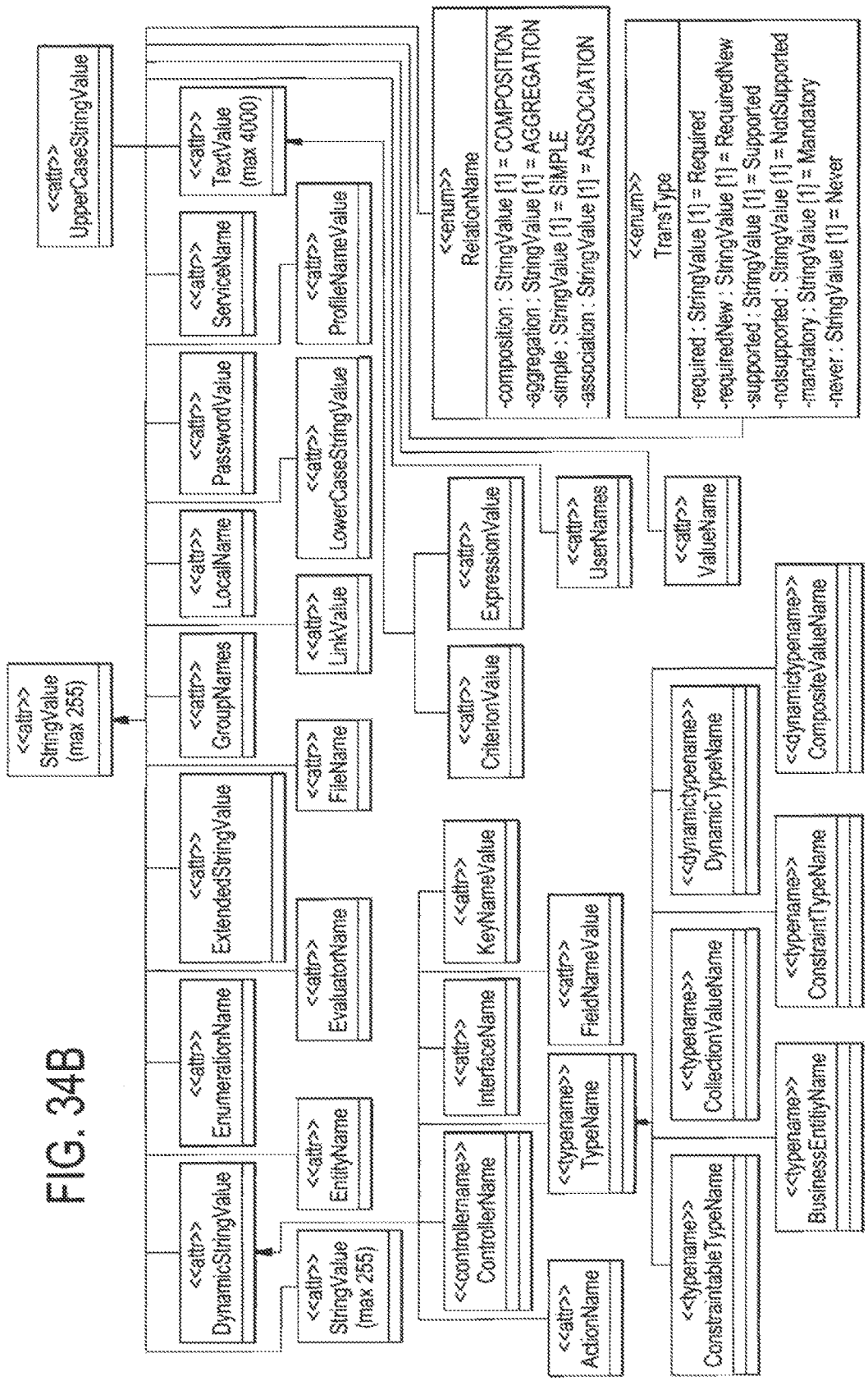
FIG. 34B illustrates the subclasses of the StringValue class.

This subclass is a wrapper of Java String class. FIG. 34B illustrates an example of StringValue class. The StringValue adds to the Java String object three constraints: the max length of the content string, the mask that the content must apply to, and a list of possible valid values. These constraints are saved in the StringCls metadata instance associated with the StringValue object, and the default StringCls instance has no value for these constraints. To change one or more of these constraints, the programmers must subclass the StringValue and change these constraints in the StringCls instance associated with the new class as shown in TABLE If:

TABLE 15

Example of the constraints on StringValue package test;

```
public clatss MyStringValue extends StringValue {
private static inal Classe cls = new StringCls (
" test.MyStringValue" , new Intege (4) )
/* Remember: we should always explicitly declare the default constructor and the Classe
   getter method.*/ public Classe getClasseO {
return cls;
}
public MyStringValue { ) {
}
}
```

This code defines a new StringValue that has a maximum length of 4.

One can get the maximum length and other constraints from the StringCls associated with tiie StringValue.

MyStringValue sv=new MyStringValue ( )
Integer max=((StringCls) sv.getClasseO).getMa O;
System. out. rintln (max); // prints out: 4
iii. DateValue The DateValue class is a wrapper for the Java Date class, the DateValue has two constraints: min and max dates. TABLE 16 illustrates an example of how to create a DateValue object from a data or a string parameter:

TABLE 16

Example of how to create DateValue object from a Date or a String parameter

```
DateValue dv1 = new DateValue ( ) ;
DateValue dv2 = new DateValue (" 22/1/1977 ");
```

TABLE 16-continued

Example of how to create DateValue object from a Date or a String parameter

```
dv1 . setValue (new Date ( ) ) ;
System, ou .println (dv1 . getValue ( ) ) ;
System, out. rintl (dv2 ) ; iv. NumberVal e
```

The abstract class NumberValue is the super-class of all numeric classes in the framework. The metadata class for this value is NumberCls class. This class defines two constraints on the contents of NumberValue: the minimum and maximum value. In addition, as in the Java Number class, this class provides helper methods for conversion between the various numeric classes. Subclasses of NumberValue are IntegerValue, LongValue, FloatValue and DoubleValue. TABLE 17 illustrates an example of how to create different types of NumberValue class from a Double, Integer, or String parameter:

TABLE 17

Example of how to create different types of NumberValue class from a Double, Integer, or String parameter.

```
NumberValue nv1 = new IntegerValue ( ) ?
NumberValue nv2 = NumberValue.newlnstance (new Double (88.421) ) ? IntegerValue
   nv3 = new IntegerValue (nv2.aslntege ( )) ;
IntegerValue nv4 = new IntegerValue ( "1977 ") ;
System.out.println(nv1) ; // prints out: 0
System. ou .println (nv2 ] ; // prints out: 88.421
System, out. rintln (nv3 } ; // prints out: 88
System. out .println (nv4) ; // prints out: 1977 v. DynamicStrmgValufiClass
DynamicStringValue is a StringValue that can change its StringCls descriptor class at
   runtime Instances of DynamicStringValue class can have their StringCls instance
   set in the constructor or in any part of its lifecycle. TABLE 18 illustrates an
   example of
Dynamic ˆ tringValueClase:
```

TABLE 18

Example of creating a ListValue from a formatted string and add items to it package test;

```
public class StringList extends ListValue {
private static Classe cls = new CollectionCls (
"test. StringList" , StringValue . class . getName ( ) ) public Classe getClasseO {
return cls; }
public StringList {) {
}
public StringList (String value) throws ProcessException { super (value) ;
}
public static void mai (String[ ] args) {
StringList list = new StringList ( " [22 , Osama, Maher, gh, 22 /1/1955] >> ) ;
list .addValue (new StringValue ( "whatever* ) ) ;
list . ddValue (new StringValue ( "ABCDEFG" ) ) ;
list . addValue (new StringValue ( " 1234567 " ) ) ;
```

TABLE 18-continued

Example of creating a ListValue from a formatted string and add items to it
package test;

```
Iterator iter = list. iterator ( ) ;
while (iter.hasNext( ) ) {
Object item = iter.next ( ) ;
System. out.printl (item) ;
}
} f. CoUecuonValue
```

Figure 31:
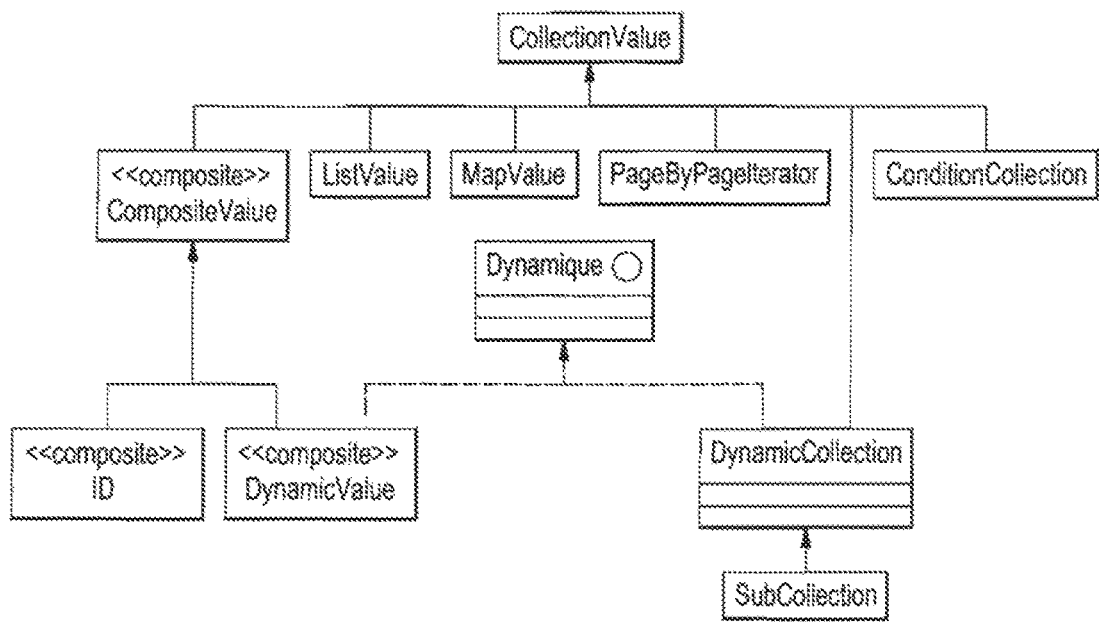
FIG. 31 illustrates the Collection class implemented in com.palmyra.arch.basicStruct.data package.

This is the super-class of all containers or data structures in the framework FIG. 31 illustrates the Collection class implemented in com.palmyra.arch.basicStruct.data package. Subclasses of CollectionValue are either a concrete implementation or a filter class that adds a specific feature to an existing concrete implementation. Subclasses of CollectionValue include: listValue, a collection implementation based on JaYa List; MapValue (Table 19), a collection implementation based on Java Map (Table 20); ConditionalCollection, a collection that filters the content of a concrete implementation based on a specific condition; and PageByPageCollection, a collection mat adds the paging behavior on omer implementations (Table 21). The CollectionValue class is the framework counterpart of the Collection concept in Java. A CollectionValue is a wrapper of a collection that has items of type Value.

TABLE 1

Example of the Map Value Class public static void main(String [ ] args) {
Map Value map = new Map Value ( ) ; map. set("name" , new StringValue ( "JName") ) ;

```
ma . set( salary* , new integerValue(1234) ) ;
map. set("phone" , new StrlngValue("+963− (Oil) −5551234") } ; ma . set("e-mai * , new
    StringValue( "me0somewhere.cam") ) ; ma . set ("on-job", new
    BooleanValue(true") ) ;
Iterator iter = map. alues ( ) .iterator( ) ;
while (iter.has extO) {
Object item iter.nex ( );
System.out.println(item) ;
}
```

TABLE 20

An example of CoHectionClassValue

```
package test;
public class IntegerList extends ListValue {
private static Classe cls = new CollectionCls (
"test . Stringliist, IntegerValue. class .getName ( ) ) ;
public Classe getClasse( ) {
return cls;
}
public IntegerList ( ) {
// continued
}
public IntegerList (String value) throws ProcessException { super (value) ; < }
}
Second we define the condition:
package test;
public class MyCondition implements Condition {
public boolean eval (Object obj) {
if (((IntegerValue) obj ). integerValue ( ) >= 48)
return true;
else
return false;
}
}
package test;
And finally we apply the condition object to the listValue instance throw this
ConditionalCollection instance,
public class Tester {
public static void mai (String[ ] args) {
// create a ListValue and fill it with random numbers. IntegerList list = new IntegerList ( ) ;
.for (int i = 0; i < 100; i++)
list.add(new egerVdue(Math.round(100 * MatLrandomQ)));
```

TABLE 21

An example of the PageByPageIterator

```
public static void main (String [ ] args) {
// create a ListValue and fill it with random numbers.
Map alue values = new apValue ( ) ;
for (int i = 0 ; i < 100 ; i++)
values . set ( Integer . toString (i) , new IntegerValue (i) ) ; System. out. rintin (values) ;
// create a PageByPageIterator.
PageByPageIterator pages = new PageByPageIterator (values) ,- pages. setPageSize ( 10
    ) ;
pages . setPageNumbe ( 2 ) ;
Iterator iter = pages. ageIterator ( ) ;
while (iter .hasNext ( ) ) {
System. out . rintl (iter .nex ( ) ) ;
}
pages .nextPage { ) ; An instance of the CoHectionCls class is associated with every
    CollectionValue class.
```

The only constraint the CollectionCls imposes on the CollectionValue is the type of its items.

Table 22 illustrates an example of ReferencingClass.

TABLE 22

An example of ReferencingClass package remote;

```
public class NewStringValue extends StringValue {
private final static Classe cls = new StringCls ( "remote . NewStringValue");
public Classe getClasse( ) {
return cls;
} .
}
```

To remotely reference this class we should create a new Class that extends the Reference class and have the same name of this class, package remote;
public class NewStringValue extends Reference
{ } g. CompositeValue CompositeValue is a data structure that contains pre-defined fields definition. The de inition of the fields exists in the CompositeCls instance associated with each CompositeValue object. This is similar to the idea of a class in which it is composed of members. A CompositeValue object stores in its metadata class the definition of it fields.

Subclasses of CompositeValue are: DynamicValue, a CompositeValue that can change its fields at runtime; ID, a CompositeValue composed of a LongValue primary key and-StringValue code members.

FIG. 34A illustrates the subclasses of the CompositeValue class. The

CompositeValue class extends the CollectionValue class, thus all operations valid for a CollectionValue are valid for the CompositeValue. Unlike the CollectionValue a user cannot set the value of a key not defined in a CompositeCls class, only declared fields are can have values. The role of the CompositeValue class in the framework is the same role of the class in Java. The CompositeValue class is a structure composed of predefined fields.

A CompositeValue class references a CompositeCls metadata class that defines its definition. The CompositeCls by its turn contains a collection fields whose elements are of type• Field. Each, field in turn is associated with a specific Classe type.

The CompositeValue defines a set of methods to manipulate the value of its fields. The most important ones are:

get (String key): returns the value of the given key. The key can be simple (a) or composite (a.b.c).

getSimple (String key): returns the value of the given simple key.

set(String key, Value value): sets the value of the field with the given value. The key can be simple or composite. The CompositeValue class provides many overloaded versions of this method.

setSimple(String key, Value value): sets the value of the simple field with the given value. remove (String key): removes the value of the key from the memory. The field can be simple or composite.

removeSimple(String key): removes the value of the simple key from the memory.

isAssigned(String key): returns true if the key has a value in the memory. The key can be simple or composite. isAssignedSimple (String key): returns true if the simple key has a value in the memory. A field defined in a composite value can be in one of two states.

Assigned: the field is considered as assigned if it has an existing value in the memory. Every field is considered as assigned after calling on of the two methods: set or get.

Not assigned: A field is considered as not assigned if it hasn't a value in the memory.

A field has the state 'not assigned' after executing a remove operation on it.

Figure 35:
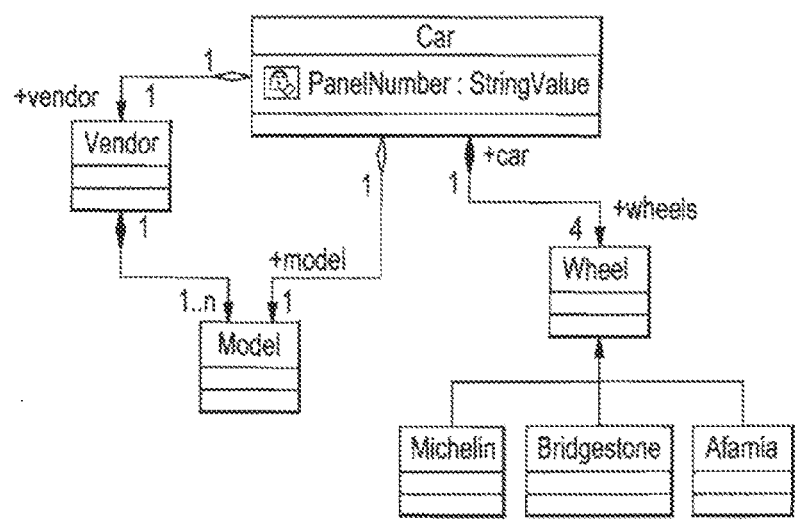
FIG. 35 illustrates an example of creating and defining CompositeValue class fields.

FIG. 35 illustrates an example of creating and defining CompositeValue class fields i. DynamicValue DynamicValue is a CompositeValue with a non-static Classe instance associated with it. Thus this class instance can be updated at runtime and fields can be added at runtime to this DynamicValue object Table 23 illustrates an example of using this class:

TABLE 23

An example of DynamicValueClass

First we define the DynamicValue class,
package test;
public class Employee extends DynamicValue {
private static CompositeCls cls = new
CompositeCls (Employee . class) ;
public Classe getClasseO {
return cls;
}
public Employee ( ) { .
}
}
Then we create an instance of Employee and we add fields to it at runtime,
public class Test {
Employee emp = new Employee ( ) ;
CompositeCls cls = (CompositeCls) emp.getClasse( ) ;
cls. addField(new Field(■ emp_name", StringValue. class) ) cls. addField(new Field( •
emp_salar " , DoubleValue. class) ) ; cls. addField(new Field ( "emp. .manager" ,
Employee. class,
Field.COMPOSITION, null, true, false));
em . set ( "emp_ name• , *Osama A. bied" ) ; emp.se ( "emp_salary" , " 123 " ) ;
emp. set ( "enp_manager" , new Employee ( ) ) ;
System. out.println(emp) ;
} ii. 3D Class

ID class represents an identifier or primary key for a specific AbstractValue instance. ID extends CompositeValue and is composed of three fields; idPk, idCode and idType. Each AbstractValue instance provides a unique ID instance, the pk is provided and maintained by the sequence service, the code is evaluated from the AbstractValue fields at runtime and the type presents the name of the instance type. In Table 24, the code is a StringValue composed of the combination of fields that have their orderlhCode property set We can see in the code listing that me first three fields defined in this AbstractValue class have their orderinCode property set to an integer value, whereas the remaining field has its orderinCode property set to the default value null. Thus in the output of this code the values of the specified fields will be printed in that order.

h. Keys class

Keys class is a Map structure that defines names of possible fields that can exist in a CollectionValue or a CompositeValue class. "Possible" means that the key represents a field defined in a CompositeValue but not necessarily an existing field. As long as the class of the object is loaded, the definition of the field itself exists in a Field object reachable from the Classe instance associated with the class name of the Value, but in runtime the value object may have a key and consequently a value for the specified field or may not.

The structure of the Keys class is a Map, so every entry in this Map has a key and a value. The key is a String object contains the name of the field and the value is a Keys object containing possible keys for this field or null if this field has no keys.

TABLE 24

An example of the ID class code package test;

public class AV extends CompositeValue implements AbstractValue {
private static final Classe cls = new AVCls("test.AV" , new Field[ ] {
new Field ( "personal_number" , LongValue. class, Field. SIMPLE, null, true, false, new
  Intege ( 1 ) , new Integer (1) , new
Integer ( 0 ) ) ,
new Field( "name" , StringValue. class, Field. SIMPLE, null, true, false, new Integer (1 ) ,
  new Integer (1) , new
Integer (2 ) ) ,
new Field ( "surname" , StringValue. class, Field. SIMPLE, null, true, false, new Integer
  (1) , new Integer (1 ) , new
Integer(1)),
new Field ("salary" , IntegerValue. class, Field. SIMPLE, null, true, false, new integer (1) ,
  new Integer (1 ) , new
Integer(O)),
} ) ;
public Classe getClasseO {
return cls;
} public static void main(String [ ] args) {
AV av = new AV( ) ;
a . set ( "per3onal_numbe " , new LongVal e (22177))
a . se ( " ame" , new StringValue ( "Albert" ) ) ;
a . se ( " surname" , new StringValue ( "Einstein" ) ) ;
av. set { "salary" , new IntegerValue (84210) ) ;
• System. out .p intI (a . getCode ( ) ) ;
// Prints out: 84210 Einstein Albert
} }

The main three types in the framework can return a Keys instance as follows:

SimpleValue: always returns null.

CollectionValue: returns a Keys instance with one entry that has the string "*" as the key, this means that the CollectionValue object can take any field name, and the value of this entry is a Keys structure of the items of this CollectionValue.

CompositeValue: returns a Keys instance containing all the fields defined in the CompositeCls object associated with this CompositeValue instance.

The framework provides the possibility to extract the list of keys regarding a set of properties: owner, declared, mandatory, assigned, relation type, code, calculated etc. . . . .

The set of these methods are defined in the Classe class.

i. DeepMap Class

This abstract class is the first implementation of the Value interface. It overrides the default behavior of the Map and implements the new object with in-depth naming access. AH CollectionValue implementation benefits from this class and accepts composite object names as a key.

j. AbstractValue

AbstractValue is the super interface of all persistent objects in the application. It contains default or technical fields that are used in saving and retrieving the AbstractValue from any storage service. The technical fields are: pk, type, accessPoint, creationDate, creatorUserId, updateDate, updatorUserId.

The AbstractValue has three methods that deal with persistency:

synchronize: tells the persistency service to save this AbstractValue object delete: tells the persistency service to delete this AbstractValue object laΣyGet(String key): retrieves the value of the field from the application storage, k. Package com.palmyra.arch.basicStruct.metadata This package contains four main parts: the metadata description of all elements in the framework (Simple values, composite values, collection values and controllers), the deamons (IfAdded, IfNeeded and IfRemoved), the domain managers and the integrity checkers.

i. Meta Data Classes

The main class holding the metadata description of the framework classes is Classe. Each object in the framework is associated with a Classe instance. This instance holds information about the different fields of the Value and properties of the Value itself. The main methods in this class are:

Value newlhstanceO: creates a new instance of a value.

Classe forName(String className): retrieves the metadata description of a value Classe getSuperClasseO—returns the metadata description of the super class.

ListgetAIUmplementedInterfaces: returns the name of all implanted interfaces. Keys getSubClassesQ—returns the name of all sub-classes.

Classe have many sub-classes. The main ones are:

SitnpleCls: is the root class holding the metadata definition of a simple value class. Its main sub-classes are: BooleanCls related to instances of type BooleanValue, BytesCls related to instances of type BooleanValue, DateCls related to instances of type DateValue, NumberCls related to instances of type NumberValue, StringClB related to instances of type StringValue and TimeZoneCls related to instances of type TimeZoneValue.

CollectionCls: is the root class holding the metadata definition of a collection value class. This class provides the possibility to retrieve the items type of the collection.

CompositeCls: is the root class holding the metadata definition of the composite classes in the framework (entities and interfaces). Its main methods are:

Field getField(String name): returns the metadata description of a field.

List getCodeFieldsO—returns the list of fields marked as code.

Keys getKeysO' returns the name of all fields. The CompositeCls defines many overloaded versions of this method.

Keys getDeclatedKeysO: returns the declared keys only.

Keys getOverriddenKeys: return the overridden keys only. Note that all keys=declared keys+overridden keys.

CompositeCls has many sub-classes:

AVCls: related to every class that extends Composite-Value and implements

AbstractValue or every interface that extends Abstract-Value.

ConstraintableCb: related to classes having the stereotype "consttaintable" in the UML model.

InterfaceCls: related to every interface that extends the interface Value.

DynamicC: related to dynamic values classes.

ConstraintsClsx is a sub-class of DynamicCls, it is related to classes marked as "constraints" in the UML model.

The class Field is the elementary object for metadata description. Each CompositeCls instance holds a group of Field instances. Each one describes an attribute or a relation with another class. The field is defined using a set of properties: name, Classe (equivalent to its type), min and max multiplicity, collection type (map, set or list), relation type (simple, composition, aggregation or association), owner, navigable, transient etc. . . . .

The Classe-Field classes are used to describe values with their fields. However, ifae metadata of controllers and methods are described using the classes Controller, Method and Parameter. Controller is a class that describes the metadata of user defined services (or controllers). It provides methods to access the controller properties like the name, alias, super controller, declared methods, all methods etc. . . . .

The Controller class provides also the possibility to create a new instance of a controller using the method newInstanceO and to retrieve a metadata description of a controller via the methods forNatneQ and forAlias( ).

Method is a class that describes an action (or a method) in a controller. It provides methods to access the method properties like the name, return type and parameters.

Parameter is a class that describes a parameter in a method. It provides methods to access the method properties like the name and the type.

ii. Deamons

The value of a field in a composite value instance can be managed using three methods: get, set and remove. The call of every method of the mentioned above can impact the value of other fields or the integrity of the parent composite value instance. Deamons are listeners, that run in the background, and are invoked after each elementary method (get, set or remove) in order to execute the required treatment. The deamons are divided into four parts:

If Needed Deamons: These deamons are invoked after a get operation on a field. Each field has one if need deamon which is responsible of retrieving the value of a field regarding its properties: calculated, asp, foreign pk, foreign code, transient, navigable relation, composition, association, pk, code etc. . . . . . For example, IfiimpleFieldlsNeeded is registered for simple fields and it returns the fields default value if the parent value is new, else it tries to get the value of the key using lazy process.

Default Value Deamons: These deamons are invoked when the system tries to assign a default value for a field. Each field has one 'default if need deamon which is responsible of retrieving he default value of a field regarding' its properties: pk, type, calculated, has a default formula tagged value, has an initial value, sequence etc. . . . . For example, I DefaidtSequencelsNeeded IB registered for simple fields having the stereotype 'sequence' and it returns the next value of the field's sequencer.'

If Added Deamons: These deamons are invoked after setting the value of a field. Each field has many if added deamons which are responsible of maintaining the integrity of field's value or the integrity of the whole composite value instance. The list of if added deamons are calculated once at server startup. They are calculated regarding the fields' properties: calculation base, code base, pk, code, type, foreign pk, foreign code, transient, collection relation, index field, mandatory etc. . . . . For example, if we change the value of a code field, the system must recalculate the value of the technical field code. This is performed by the deamon IfCodeBaseIsAdded.

If Removed Deamons: These deamons are invoked before executing a remove operation on a field. Each field can have many if removed deamons. These listeners are registered regarding the field's properties: calculation base, foreign pk, foreign code or immutable (non removable fields). For example, JffGilculationBaseIsRemoved is registered for fields participating in a calculation formula and it removes the value of the calculated field.

iii. Domain Managers

A Domain Manager is a class mat holds information related to a field: possible values, visible, read only, calculation base, min multip city, max multiplicity etc. . . . .

The domain manager mechanism is added to provide the possibility to customize the field's properties at run time using the adapter design pattern.

If the developer needs to define one of the mentioned properties programmatically, it should define a class that extends DomainManagerAdapter, overrides the required methods and register this class as domain manager of the needed field in a static block or using the Initializer Interface.

The framework assigns a default DomainManager for each field which is calculated at server startup.

iv. Integrity Checkers

Integrity Checkers are classes responsible of verifying the integrity (the correctness) of the field's value. All integrity checkers implements the interface FieldbitegrityChecker which defines the method checkFieldIntegrifyO- Each field can have many integrity checkers calculated switch the field properties at server startup. The registered integrity checkers are used to verify the integrity of a field content when the method checkIntegrityQ defined in the Value interface is invoked.

The implementation of checkIntegrityQ method provided in SimpleValue and it sub-classes ensure the validity of the included value (the value must respect the defined constraints like min value, max value, the possible values etc. . . . ). The implementation of checMntegrityO method provided in CompositeValue ensure the integrity of each field: the multiplicity ranges, value change in case of frozen field etc. . . . .

The implementation of checMntegrityO method provided in CollectionValue ensure the integrity of all included values in the collection.

Palmyra framework provides another data check mechanism: check rules. The business rules regarding a composite value instance can be implemented using the Rules mechanism. The developer should define a class that implements the interface Rule and define the method verifyQ. When the business semantic check is not verified, the developer should throw an exception of typeRuleException.

1. Package com.palmyra.arc±i.basicStruct.exception

This package contains the framework customized exceptions. FIG. 33 illustrates the exceptions provided by this package. The main ones are:

DataException This exception is a runtime exception. It is the super class of exceptions thrown during data manipulation.

IntegrityException thrown when the integrity is violated.

KeyNotFoundException thrown when a non defined key is requested.

PabnyralllegalFormatException: thrown when the user tries to create a value from an unformatted string.

RuleException: thrown when a business rule is not verified.

ValueNotFoimdException: thrown when the system cannot retrieve an entity from the storage related to a wrong foreign pk or foreign code.

ProcessException: is a runtime exception used to encapsulate a non Palmyra exception thrown in a business process.

PalmyraCl ssNotFotmdException: thrown when the user tries to extract a metadata definition of a not defined class in the application.

mutableFieldException thrown when the user tries to remove an immutable field (pk, updateDate, updatorUserId etc. . . . ).

m. Package com.pahnyra.arch.basicStruct.init

This package contains the main class GeneralInitializer.java responsible of loading all Palmyra classes when staring the server. This class contains a method called loadAll-ClassesO which is responsible of: Load all Palmyra classes in the memory which allows the registration of all Classe instances.

Execute all static blocks in the application. These blocks can be used to register an implementation of each component driver.

This package contains two interfaces: Initializer and PalmyraInitializer. The first one can be implemented by a non Palmyra class (business class) and the second can be implemented exclusively by a Palmyra class. When the developer needs to execute a specific treatment at server startup; such as registration of an action handler, loading a properties file or filling a cache; the developer should implement one of the mentioned interfaces and define the method initialize with the following signature public static boolean initialize.

2. Expressions

Expressions define some simple parts of me applications' business.

They are used in calculation and default formulas, business rules, mapping process, life cycle design etc. . . . .

They allow parsing and evaluating user-defined expressions (a=1, b>20,alias.f0)

They can be arithmetic (a+1), comparative (b<10), logical (c & d|e) . . . .

In the process of expressions management, two sub processes can be distinguished: the Parsing and the Evaluation The Parsing is the process of expression compilation; it produces a structure used in the evaluation of the expression. The parsing of an expression can be performed using one of the two methods:

Expression.parse(String exp): performs a syntactic check.
Expression.parse(String exp, Classe cls). Performs a syntactic and semantic check.

The Evaluation process aims to retrieve the expression resulting value.

The main concepts of the produced structure are Constant, Variable, Operation and Function.

a Constant

It represents a constant value.

The evaluation result is defined from the beginning. It can be of different types (number, date, string . . . )

The syntax of constants varies according to the type:
Number: 1.2; 45200L; 5.32B8
String: "constant value"
Date: '24/03/2006b'
Boolean: true; false
Null value: null b. Variable A variable generally represents a Value field (E.g.: name, a, b123, taxRate . . . ) Variables are literals which values are retrieved by the evaluation process.

The variable evaluation result is retrieved from the Value instance used in the Evaluation process.

Variables are used in Operations and Functions definition.

c. Operation

Operations are expressions with three items: Operandi operator Operandi

The operandi and operandi can be variables or complex expressions

There are five groups of operations:
Arithmetic: +, −, *, /
Logical: I (not), & (and), | (or)
Comparison: >, >=, =, !==, <
Assignment:—
Delimiter. ; (used for actions in life cycle)

d. Function

Function expressions can be decomposed into two parts: function name and parameters The syntax of a function expression is alias. functLoriName(parameter 1, parameter2 . . . ) The parameter can be either variable or complex expressions The parameters are evaluated separately, and then the function is invoked with the evaluation results.

The evaluation result of the function expression is the function invocation result i. Service The target application is a service-oriented system that can be deployed in a distributed environment. The distributed platform is formed by a number of configured Application Servers on which the application is deployed.

A service is a set of functions that can be called locally or remotely. They can also be called in a synchronous or asynchronous mode. A service is referred to using a name that is independent of its actual physical location. The Service Pattern in Palmyra uses one facade BIB to offer the synchronous service, called Facade, and one message driven bean EJB to offer the asynchronous service, called AsynchronousFacade. Therefore, users can benefit from all available J2EE features while hiding their complexity.

Synchronous Calk The synchronous service call consists of:
Build the message to be executed
Define the invocation attributes
Execute the message Example:
//prepare the message to be executed
ServiceMessage message=
BSFactory.getServiceDriver ( ).createServiceMessage (X.class.g et ame O, "actionB");
//add the parameters to the message
message.setParameter ("paramO", new StringValue ("first parameter"));
//after building the message, it is ready to be executed
BSFactory.getServiceDrive ( ). callService (message);
For each Controller, Palmyra generates a caller class (ServiceWameCaller) that offers the implementation of the steps needed to call each action synchronously.
Example: We can call the service which we called in the previous example in one row of code XCaller.actionB (new StringValue ("first Parameter"));
Asynchronous Call: To call a service asynchronously, we just need to add
MvocationAttribute to titte method caHServiceO. This ]hvocationAttribute give us the ability to determine the call type, Synchronous or Asynchronous (default is Synchronous)
Here is an example:
ServiceMessage message=
BSFactory.getServiceDrive ( ).createServiceMessage (X.class.g etNome ( ), "ac ionB");
// add the parameters
message.setParameter ("paramO", new StringValue ("first parameter"));
InvocationAttributes att=
BSFactory.getServiceDriver {).createInvocationAttributes 0; //this message will be executed Asynchronously
att. setAsynchronous (true);
BSFactory.getServiceDriver ( ).callService (message, att);

Services are defined using UML class diagrams. They are represented by classes called controllers. A controller has a name, a short name or alias, and a number of methods. A controller is considered as a group of services. The generated code then represents skeleton of the structure needed to define the service, then manually written code is added in order to cover the functional implementation of the methods without taking into consideration the technical aspects.

For each controller these are the main generated classes:
An interface named X: This interlace contains the method specified in the UML as actions in this controller
An abstract class called AbstractX: This class is for technical reasons and will not be used by the user of this controller
A concrete class XCaller: This class contains the methods defined in the interface X and provides a shortcut to call the service X with default contracts of the service. 'A concrete class XFactory: This class provides different ways to get the registered implementation of the service X.

The developer has to provide a class that' extends AbstractX and he can give it the name he wants and—write extra code to register it, otherwise he should name \\Xhnpl.

Services defined in the UML model can be invoked using lifecycles, expressions or manually written code. The accessibility of the services to different users is controlled by the security module. The transactional behavior of the services (whether they support transactions or not, and whether they start a new transaction or embedded in the caller transaction) can be configured at runtime using a specific configuration tool.

The Palmyra Service Module allows the end user to configure, on runtime, which service:

h to be called remotely: Remote Service Configuration.

h to be executed with a specific transaction type: Service Transaction Configuration .& to be broadcasted either in a Cluster or to other Applications: Broadcast Configuration Calls to Web Services are folly implemented by the service layer. The configuration needed to call a web service is done on runtime through a WebService (¾nfiguration instance.

ii. Lifecycle

The Lifecycle management component monitors the transition of an object from one state to anomor according to the associated state diagram that represents a process. This' module is used to run all the processes defined in the target application. It is possible, at runtime, to load new processes and to associate them to previously defined classes. The system takes the new processes into consideration right after loading them.

As described before, state diagrams are used to define processes. Actions can be defined in the entry points of the states that form the state diagrams. Conditions can be defined in order to guide the execution path. Both actions and executions are defined using the Palmyra Expressions language (PEL).

Processes can also be defined to lead several other processes (one process to control and to launch several other processes).

iii. Security

Internal and external Authentication and single sign on (sso)

Hole based authorization iv. Job-Scheduler

Palmyra Scheduler is a technical module in the Palmyra Framework that is responsible of managing the execution of scheduled jobs.

A job is a Palmyra Controller's method with a particular configuration. The latter configuration is to be specified at runtime.

A job can be created, modified, deleted, tracked and executed manually or automatically.

The Palmyra Scheduler management includes repetition and failure.

It is tightly related to the module Palmyra Calendar, which is responsible of Holidays and Business Calendars management.

For a Palmyra Application to work with the Palmyra Scheduler module, some prerequisites need to be fulfilled at design time:

The action to be scheduled needs to be defined as a method in a Controller.

An implementation of Business Calendar needs to be created. This implementation Entity should encapsulates an attribute with the stereotype "code".

Example: We will be configuring a Job based on the TestController's method "add", as well as ail instance of the entityMyCalendar called "myCalendar", both shown in FIG. 47A.

At Runtime, a Job Entry instance stores all necessary information about how an action is to be scheduled:

Job Message: The method to be executed, i.e. the actionName "add" of the serviceName "com. TestController", shown in FIG. 47B.

Repetition: The job will be scheduled to execute daily at 5pm staiiing from 24 Dec. 2009. It can also be scheduled once, minutely, hourly, weekly, monthly or annually. The repetition setting is shown in figures FIG. 47C and FIG. 47D.

Holiday Treatment: We can assign holidays to the calendar myCalendar. For instance, we assume that 25 Dec. 2009 is ml annual holiday, 26 Dec. 2009 is an exceptional one and Sunday is a weekly holiday. The list of holidays will be considered when executing jobs as follows: The holiday is either to be ignored or to be considered. The holidays creation is shown in figures FIG. 47E, 47F, 47G, 47H.

Figure 51:
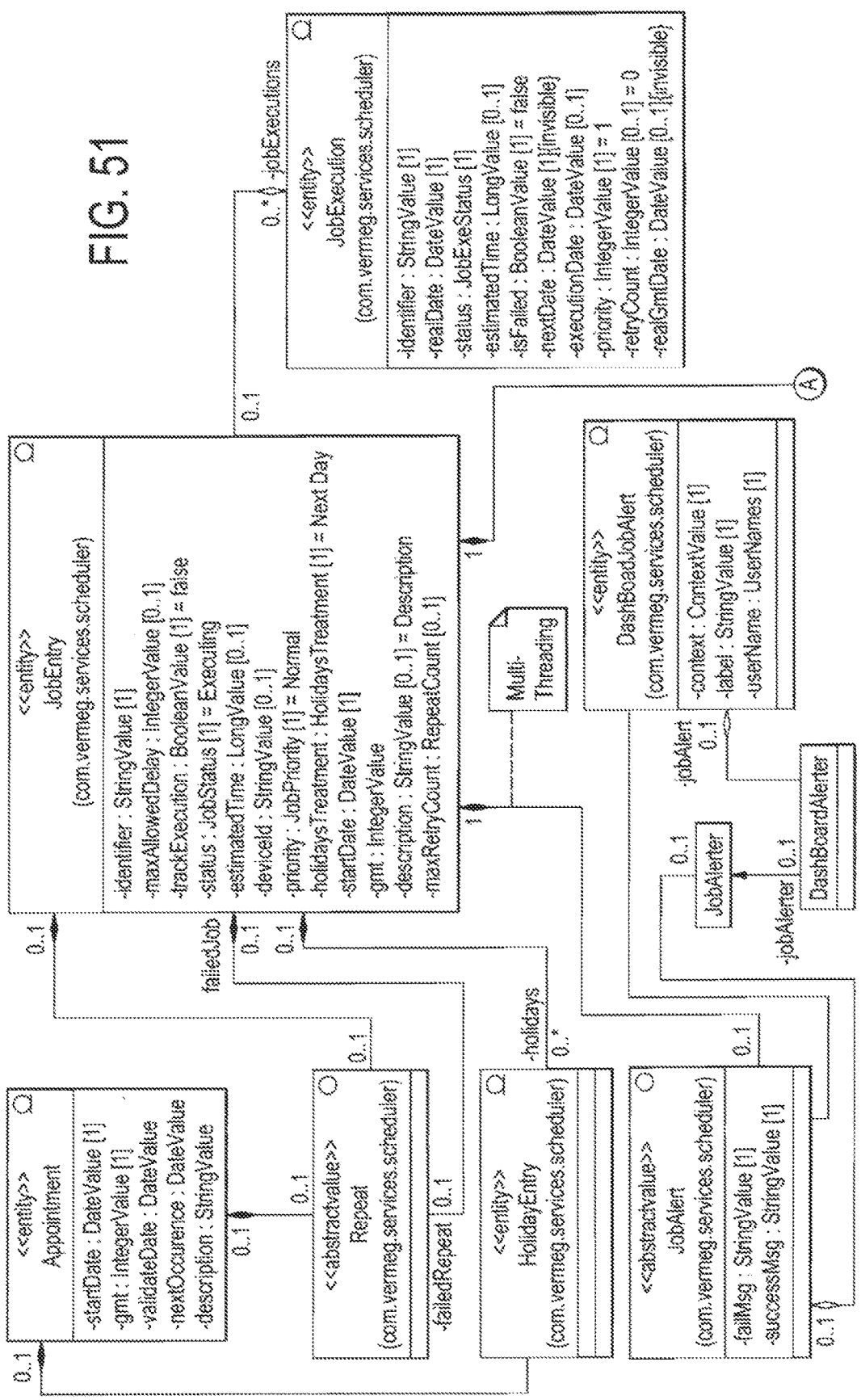
FIG. 51 illustrates a UML representation of a Scheduler.
Figure 51:
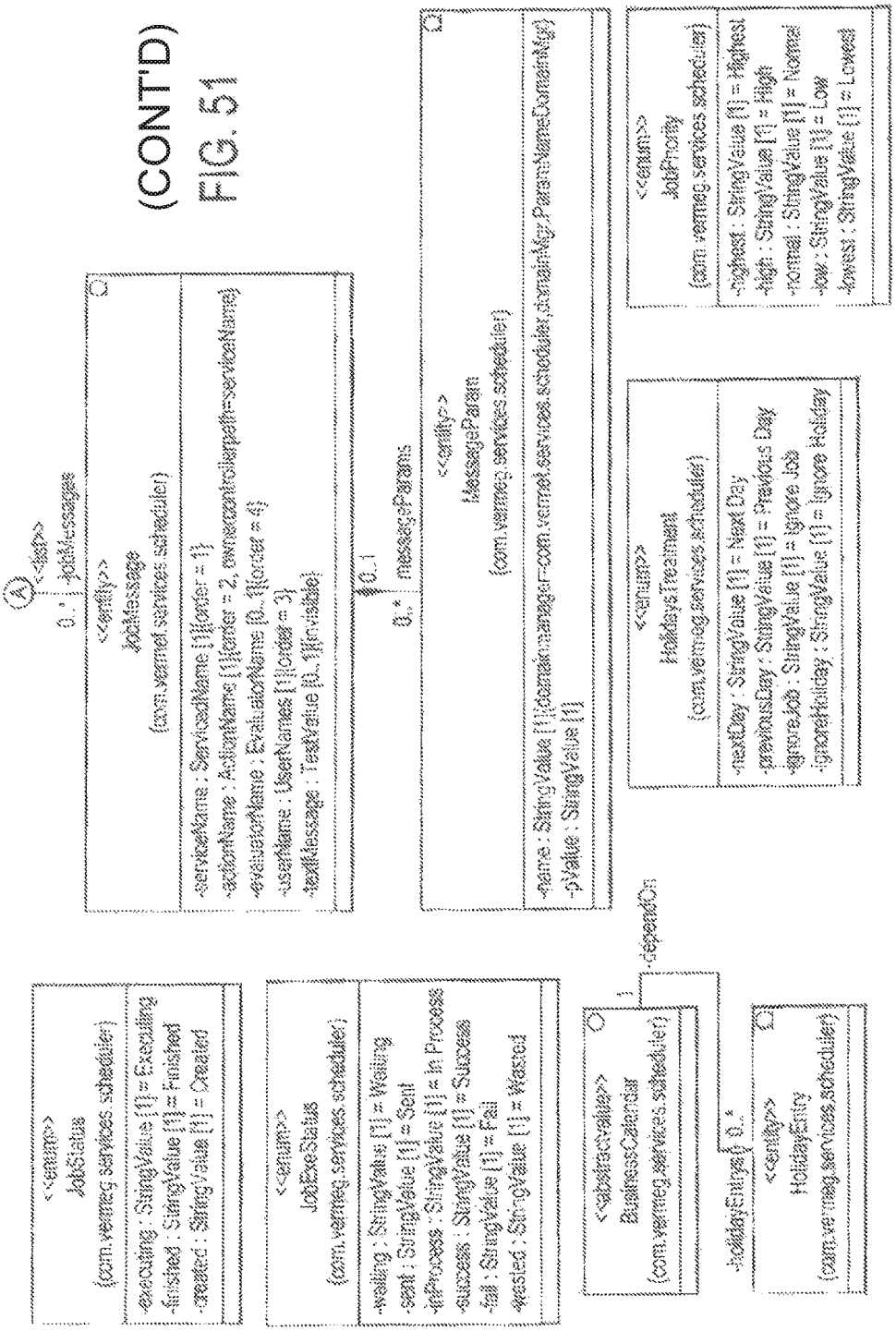

Track Execution: Palmyra Scheduler offers the possibility to track the execution of a, Job, through JobExecution instances. As shown in the figures FIG. 47I and FIG. 47J, the first: execution of the job will be on 24 Dec. 2009 at 5 pm. The status of the JobExecution instance is' set to waiting. If finished successfully, it will be changed to Success. The next execution of the job, considering the holidays on 25/12, 26/12 and 27/12 (Sunday), will 20 be on 28 Dec. 2008 at 5 pm. TIle Scheduler UML is shown in FIG. 51.

The operating principal of Palmyra Scheduler is that each time a job is created, it is added to a work job list, sorted by the nearest date of execution. A running thread named Palmyra-Scheduler-Thread relies on this work job list to know which is the first job to be executed, then it waits for its execution time and execute it.

Creating a Job leads to the creation of the corresponding JobExecution instance. Executing a job consists in creating an appropriate message based on the JobMessage information of the job and then let the Service module handle it.

The thread named Palmyra-Jobs-Feeder-Thread is the one responsible of managing the work job list. It refreshes its lists each LOAD JOBS_INTERVAL, which defaults to 120 minutes. Refreshing means sending a query to the database to get all the jobs that are expected to be executed within the latter interval of time, i.e. JobExecution instances with a Waiting status and an execution date "reaJDate" that is lower than (currentDate+LOAD JOBS_INTERVAL).

The cycle of a JobExecution instance goes from status "'Waiting" when created to "Sent" when the related job reaches its execution date and is starting to be handled by the Scheduler, to "JnProcess" when its jobMessage is going to be executed and finally to "Success" if the jobMessage has been successfully executed or "Fail" if something went wrong, i.e. an Exception occurred.

Starting the Scheduler thread can be done either automatically at the application startup through a property called AUTOMATICALLY_START_SCHEDULER or at runtime through the Application Scheduler Menu.

The Palmyra Scheduler has its own logger, with very specific terminology. FIG. 52 is an illustration of a Pahuyra Scheduler Trace Example.

C. Storage Layer

1. Persistence

The persistence service is composed of several main sub-modules: Entity Manager: responsible of receiving and transforming q_ueries.

Data Store: responsible of communicating with the database and returning the result to the Entity Manager.

PQL Parser (Palmyra Query Language): Used by the Entity Manager to parse PQL queries.

a. Entity Manager

The Entity Manager is a controller that fully conforms to Palmyra standards. It implements the Business Delegate interface. From the user's perspective, the Entity Manager performs all the work related to saving/retrieving Palmyra values to/from the data store. The Entity Manager serves as an interfacing and parsing stage. Plus, it delegates processing to the proper processing unit, which in turn performs the actual work. The Entity Manager defines three groups of actions, in addition to the action that executes PQL statements:

(1) Formatting actions: These actions are to format the data store, update its format, or update its constraints. These actions simply iterate the configured data sources and invoke the corresponding procedure in the proper data store.

(2) Synchronization/deletion actions: These actions are to insert, update or delete values in the data store.

(3) Search actions: Search for the AbstractValue objects that meet some condition The following sections explain the components responsible of executing each one of these groups of actions.

b. Context-Driven Approach

The Persistence service is designed in such a way that provides convenient level of separation between the state of the operations performed by the Persistence service, and the logic of the components that perform these operations and manipulate their state. This separation is realized by defining a number of contexts that contain the state of these operations. These contexts are bean-like objects (i.e. objects that have "set" and "get" methods) that contain no logic at all. The components that do the actual work are singleton stateless objects that take contexts as their parameters and manipulate the contents of these contexts. This simplifies parameter passing between the various stages of operation processing, and is less costly performance-wise.

The way an operation is performed by the Persistence service is very similar to the way a product is manufactured while it moves along a production line in a factory. The product enters the production line as a collection of raw materials. It goes from one stage to another. Likewise, a context can be thought of as a product that gets processed by the various singleton components. Its initial state provides the raw input of the Persistence service, and its final state contains the proper output. Thus, a context may contain many attributes that are required by all the processing phases. However, each phase, or each component, is concerned only with a subset of these attributes. So, each component must have its own view of these contexts. Given this, the singleton components must be defined to take sub-contexts as their parameters. Each sub-context is actually an interface that defines the set of attributes that should be present in a context to be eligible for processing by the corresponding component. The context of one operation is the realization of all sub-contexts of all the components that are involved in performing this operation.

c. The Processing Units

As stated before, the Entity Manager simply fills the proper context with the parameters passed to it, and then invokes the proper processing unit, passing the context to it. Each processing unit may as well invoke other processing units and so forth. All processing units implement the same interface (the Processor interface) that has a single method (process) that takes a context as its single parameter.

d. The Cache-Aware Processing Units

Some of the processors may cache some of, or all, the data they generate while performing an operation, so that when a similar operation is performed later, the data to be generated are retrieved from the cache instead of regenerated. Such processors are called cacheaware processors, and they extend the CacheAwareProcessor class that provides an abstraction to the caching process. For example, suppose that a cache-aware processor, say P, processes a context that contains the i11put attributes a1, b1, c1, and d1, and the output attributes a2, b2, c2, and d2. When designing this processor the developer (the persistence layer developer) must choose the output attributes that can be cached and those that should be processed every time. Theoretically, the number of possible values for a1, b1, c1, and d1 is infinite. However, suppose that in practical situations, and given a limited period of the application's lifespan, find that the number of possible values for a1, b1 and c1 is very limited, whereas the number of possible values for d1 is relatively big. If the user presume that the output attributes a2, b2, c2, and d2 correspond directly and respectively to the input attributes a1, b1, c1, and d1, this leads us to the conclusion that a2, b2, and c2 should be cached, whereas d2 should be calculated every time, because the reoccurrence frequency of a1, b1, and c1 (from which a2, b2, and c2 are generated) is higher than the reoccurrence frequency of d1. Further, if the user cache d2, the size of the cache should be significantly increased to boost performance.

Since the number of possible values for the input attributes is generally unlimited, a circular cache should be used instead of a map to store the cached values. The circular cache keeps the last and most used keys. In our example, the key for caching should be composed of the input attributes a1, b1, and c1.

Any cache-aware processor performs the following routine:

(1) Generate a caching key from the input attributes of the context.
(2) Use the generated caching key to retrieve data from the cache.
(3) If cached data were found, write the cached data into the context, and then generate non-cacheable output attributes.
(4) Otherwise, generate all output attributes, read cacheable output attributes from the context, and then put the read cacheable data in the cache using the caching key.

The existence of this routine in every cache-aware processor allows the abstraction of the caching process by defining a super class for all cache-aware processors that perform the caching routing, leaving some parts as abstract methods to be overridden in its subclasses.

There is one abstract method for each of the following tasks in the CacheAwareProcessor class:

(1) Generating a caching key from the context.
(2) Generating all output attributes.
(3) Generating non-cacheable output attributes.
(4) Reading cacheable output attributes from the context
(5) Writing cached output attributes to the context.

e. The Operation Executers

From now on, the root processing units, which are first invoked by the Entity Manager, is referred to as the operation executers. They will follow a special naming convention in order to be recognized. If the operation's name is Xxx, its executer will have the name XxxExecuter (e.g., SelectExecuter, SynchronizeExecuter, etc.).

In addition to invoking the other processors, the operation executer serves as a factory object for the other processors. If a processor needs to invoke another processor it can obtain a reference to that processor from the operation executer. So, the operation executer can be thought of as a central "palette" of processors. This makes it easy to create custom executers for specific purposes. However, this means that the operation executer must be accessible to all the processors invoked by it, so a reference to it should be passed in the context.

Most Select executers invoke at least two processors. The first is a mapping processor (or a mapper) that generates a data store command that would perform the operation, or part of the operation The second is an assembling processor (or an assembler) that would read the data returned by the data store and assemble the result in a Palmyra value.

After invoking the mapper, and before invoking the assembler, the command generated by the mapper is sent to the data store through a special software layer represented by the data store "wrapper, which is an object that controls the flow of data between the Persistence service and the data store. Some operations require executing more than one data store command. In other words, the mappers and assemblers might be executed more than once to perform an operation. So, the operation executer should recognize two sorts o/the operations it performs. The first is atomic operations that can be performed by executing a single data store command for each operation. The second is composite operations mat require executing more than one data store command. Each operation of the latter category can be broken down to simpler atomic operations, and it is the operation executer's responsibility to do this.

f. PQL vs. SQL

The Entity Manager performs PQL queries by querying the underlying data store. Services provided by the data store are similar to those provided by relational databases. Since most relational databases are queried by SQL queries, almost each data store operation can be • expressed in terms of an SQL query. The one-to-one correspondence between data store operations and SQL queries makes SQL a good tool for expressing how PQL queries are carried out. So, use SQL as a pseudo query language in much the same way pseudo code is used to explain how certain algorithms are implemented. However, fine details (about how to overcome limitations of SQL) are out of the scope of this document.

g. Search Actions

The select executer is the super class of all select-operation executors, such as select-count, select-historicized, and the rest of similar executers. As stated before, and like any other executer, the select executer may invoke the mapping stage, the data store, and the assembling stage more than once in order to perform a complete select, or find operation. This depends on the following two factors:
(1) The queried keys or the search criteria contain keys that represent relations with interfaces.
(2) The queried keys contain keys that represent one-to-n relations, h. Handling Interfaces Consider the UML in FIGS. 37A, 37B, suppose that the queried class in a find operation is X, and that the queried fields are: +, i1.+, i1 i2.+, i3.+

Since there are no data store containers for interfaces and since the persistence service has no means to know in advance the actual types of the entities related to the values of type X, multiple invocations to the data store are needed to find these entities.

One solution is to execute the query without retrieving the keys i1, i2 and i3. Then retrieve them lazily. This approach has two main drawbacks. The first of which is that the user cannot place conditions on these keys, or the user has to evaluate these conditions after retrieving the values and filter out the values that do not meet the condition, which is expensive performance-wise. The second drawback is that the more values are retrieved, the more the user needs to perform lazy-get operations. For instance, if the query retrieved 100 instances of class X, then for each instance, the user needs to perform 3 lazy-get operations to retrieve i1, i1.i2 and i3. This means that the user needs additional 300 lazy-get operations to retrieve the relations of all the found instances. In other words, it requires 1+n*m invocations to the data store (where n is the number of retrieved values, and m is the number of queried relations with interfaces).

A better solution is to break such operation down to a number of atomic operations. In each operation the user cast each of the queried interfaces to one of the classes that implement it. Using Ibis approach, for a given operation, the number of invocations to the data store would be constant. This constant depends on the number of classes that implement each queried interface.

In our example, the interfaces I1, I2 and D can be cast as follows:
(1) I1 as A1, I2 as A2 and D as A3
(2) I1 as A1, I2 as A2 and B as B3
(3) I1 as A1, I2 as A2 and I3 as C3
(4) 11 as A1, I2 as B2 and D as A3
(5) 11 as A1, I2 as B2 and B as B3
(6) I1 as A1, I2 as B2 and B as C3
(7) I1 as B1, I2 as A2 and B as A3
(8) I1 as B1, I2 as A2 and B as B3
(9) I1 as B1, I2 as A2 and I3 as C3 (10) I1 as B1, I2 as B2 and I3 as A3
(11) I1 as B1, I2 as B2 and I3 as B3
(12) I1 as B1, I2 as B2 and I3 as C3

So, if the user has n keys that reference interfaces, and if $c(i)$ is the number of classes that implement the interface referenced by key number i, then the number of atomic operations would be:

$$\prod_{i=1}^{i=n} c(i)$$

Figure 37A:
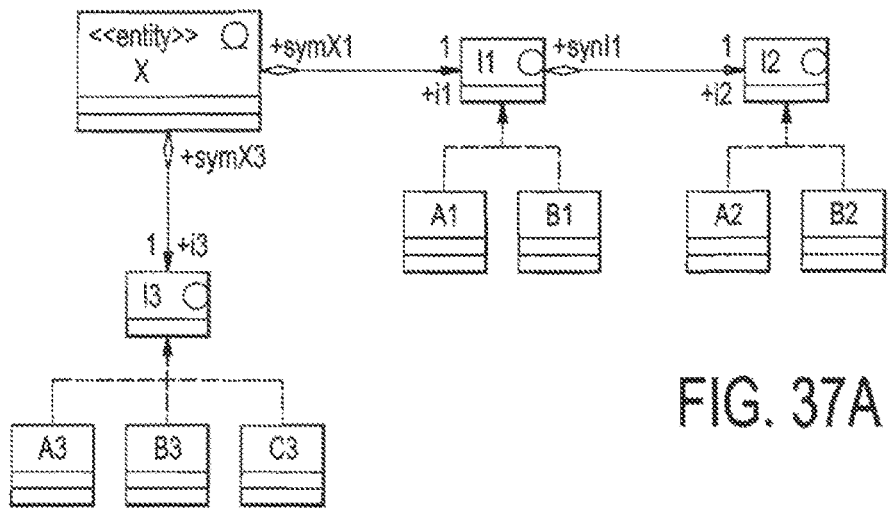
FIG. 37A is a UML diagram illustration of a queried class in a find operation is X, and that the queried fields are: +, i1.+, i1.i2.4–, i3.+.
Figure 37B:
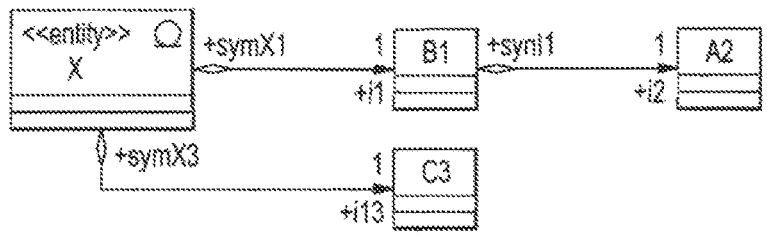
FIG. 37B is a reduced UML diagram illustration of queried class in a find operation is X, and that the queried fields are: +, i1.+, i1.i2.+, i3.+.

Considering the 9th casting possibility in our example, in which I1 is cast as B1, I2 as A2 and I3 as C3, the illustrated UML in FIG. 37A, would be reduced in this case to the second UML in FIG. 37B. Thus, the Select Executer must:
(1) Collect all the keys involved in the query.
(2) Search the collected keys for those that reference interfaces, and add them to a list.
(3) Calculate the Cartesian product of all the sets of classes that implement each interface referenced by the keys found in step 2. This gives all the casting possibilities.
(4) For each casting possibility, or combination, an atomic select operation should be performed. The casting combination should be put in the context of the operation so that later stages know how to cast each key.

The Select Executer must terminate the iteration over the casting combinations as soon as the number of assembled values reaches the maximum number of the values to be retrieved that is specified by the user. The only exception to this is when an order is also specified. In this case, each atomic operation may retrieve up to the specified maximum number—Then, the retrieved values are sorted and trimmed so that they do not exceed that number. This means that the queries that involve interfaces, order and maximum number of values to be retrieved are relatively costly.

i. PQL to SQL Example:

In the previous sample UML (FIGS. 37A and 37B), if the user perform the following PQL statement:
PQL: select +, i1.+ from X where pk>1000

The Select Executer will perform the equivalent of the following SQL queries:
(1) After casting i1 to A1: select T.*, T i1* from X T left join A1 T_i1 on •T.i1$pk-T_.i1.pk where T_i1.pk>1000

(2) After casting i1 to B1: select T.*, T_i1* from X T left join B1 T i1 on T.i1$pk=T i1.pfc where T_i1.pk>1000 j. The Interface Keys Collector

As above-mentioned, the Select Executer needs to know the keys present in a query that refer to interfaces, and so, it must iterate over all the present keys in a query to search for those that refer to interfaces. However, such keys can be found in the queried keys, the search criteria, the group functions, and the order fields. In other words, these keys are distributed in a number of structures.

The Interface Keys Collector traverses all the structures in the Select Executer context and collects the keys that refer to interfaces. The result is a map that maps each of these keys to the interface it references. This map is used by the Select Executer to generate all the casting combinations.

k. Handling One-to-N Relations

In this section, the relation between a country and a city is used as an example. This is a one-to-n relation because each country contains one or more cities. In the data store, the records in the city container must contain foreign keys mat reference records in the country container. If the name of the relation is "cities", and the name of the symmetric relation is "country", then the name of the foreign key is "countrySpk".

Consider the following PQL statement—select +, cities.+ from Country where area>1000

The obvious SQL equivalent of the PQL statement would be:

select T*, T_cities* from Country T left join City T_cities on T.pk=

T_cities.country3pk where T.area>1000 Since the result of the previous SQL statement has not tree-like structure (in fact it is a set of records that contain the fields of the country and the city) the attributes of one country is found in as many records as there are cities in that country. The only thing that differs in these records is the attributes of the city. This redundancy will consume a considerable amount of memory and network bandwidth. Plus, it requires additional computations to reduce this big set to a tree. Though such a PQL query can be carried out with a single SQL statement Referring to FIG. 41 C, let we need to execute a find operation to fetch X instances along with their Y instances, then Persistence layer—will generate a query of the shape:

select T_.accessPomt_, T_y_.x$code_, T_y_.x$pk_, T_y_.accessPoint_, T_y_.creationDate_, T_y_.creatorUserId_, T_y_.pk_, T_y_.type_, T_y_.updateDate_, T_y_.updatorUserid_, T_.creationDate_, T_.creatorUserId_, T_.pk_, T_.type_, T^updateDate^ T_.updatorUserId_from test_X_T_left join test_Y_T_y_on σ_•pk_=T_y_.x$pkJ order by T_.pk_asc Once the Data Store layer returns the vector of record instances which encapsulate the result, the assembler scans this vector twice: one for creating the X instances and the other one for creating the Y instances and combine between the created instances.

1. Further Optimizations

Figure 38:
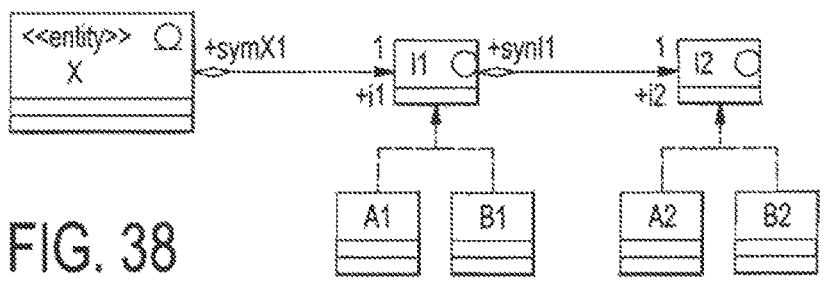
FIG. 38 is a UML diagram illustration of a search query.

Consider the following UML in FIG. 38, for example; suppose that we want to perform the following find operation:

select +, i1.+, i1.i2.+ from X where pk>1000

If we follow the previous approach, the query would be first split to four smaller queries by casting i1 and i2 as follows:

(1) II as A1, 12 as A2
(2) II as A1, 12 as B2
(3) II as B1, 12 as A2
(4) II as B1, 12 as B2

Then each of the 4 smaller queries will be split again to two atomic queries because of the one-to-n relation between i1 and i2. Let us take the first two combinations as an example:

(1) After casting II as A1 and 12 as A2 the Select Executor will perform the following two queries:

PQL1: select +, from X where pk>1000 cast i1 to A1 and ±2 to A2

'PQL2 (one-to-n): select +, 11.12.+ from X where pk>1000 cast i1 to A1 and 12 to A2

(2) After casting II as A1 and 12 as B2 me Select Executer will perform the following two queries:

PQL3: select +, i1.+ from X where pk>1000 cast i1 to A1 and 12 to B2

PQL4 (one-to-n): select +, i1.i2.+ from X where pk>1000 cast i1 to A1 and 12 to B2

Note that the second term in the casting clause in the queries PQL1 and PQL3 is not important and can be omitted because i2 is not present in the query. Plus, this casting term will not affect the generated SQL query. So, if we omit it, PQL1 and PQL3 will be identical and will retrieve the same values. Therefore, further optimization can be done if we detect such identical queries.

m. The Reduced Combinations

The solution to the previous problem is to detect the unnecessary casting terms before generating each atomic query, and omit them, generating a new reduced combination. If the Select Executer kept a set of the reduced combinations of the executed atomic queries, it will be able to skip an atomic query if its reduced combination already exists in that set.

In our example, before generating PQL1, the combination (A1, A2) will be reduced to (A1). This reduced combination will be added to the reduced combinations set after executing PQL1. Before generating PQL3, the combination (A1, B2) will be reduced to (A1), which already exists in the reduced combinations set Given this, the query PQL3 will be skipped. Detecting the unnecessary casting terms is an easy process. It will be shown that the first step in generating an atomic query is to collect all the keys present in that query. So, if the key of the casting term does not exist in the collected keys, then that casting term can be safely omitted.

n. The Mapping Stage

The mapping stage is responsible for generating a data store command from the contents of a context. If the operation is performed by executing multiple data store commands, the executer of that operation must, for each command, modify the contents of the context and invoke the appropriate mapper. In addition, the mapping stage may generate data used to optimize the work of the following assembling stage. The mapping stage is not necessarily represented by a processor object. It is a logical stage that can be represented by multiple processors.

For a given input, parts of the resulting data are always generated by the mapper. These parts can be cached, so that the mapper need not regenerate them every time it receives the same input This is true as long as we assume that these data are not dependent on the current user who performs the operation. For security reasons, the entity manager may need to modify the input of an operation (e.g. adding security conditions) depending on the current user that is performing it. This means that the same PQL query may result a Different data store command for each user.

As a result, most mapping stages should be split into two stages: an adapting stage, and a transforming stage. The adapting stage modifies the input depending on the user properties so that this input becomes independent from the user. The transforming stage transforms the user-independent input to a data store command.

The adapting stage is represented by a processor called the adapter. Whereas the transforming stage is represented by another processor called the transformer. Since the data dealt with by the transformer is adapted and is user-independent, the transformer may be cache-aware processor.

o. The Select Adapter

As stated before, the select adapter modifies the input to make it independent from the current user. It mainly invokes a processor called the Criterion Expander, which expands the input criterion object by adding the following criteria: (1) Security criteria: The criterion expander adds security criteria for the root queried class, and for each queried class that lies, directly or indirectly, an aggregation relation with the root queried class.

(2) Isolation criteria: These criteria are built from the values of the ASP fields in the root queried class. These values are retrieved from the current user properties.

p. The Criterion Expander

Implementation of the isolation criteria will not be discussed further in this document, since it is straightforward. However, adding security criteria is not as easy to implement Unlike isolation criteria, security criteria are added for the root queried class and for all queried classes that have, directly or indirectly, aggregation relations with the root queried class.

"When we invoke the security module to query the security criteria for one class, the keys in the returned criteria are relative to that class, not to the root queried class in the find operation. This means that it cannot be added as is. The keys must be translated so that they become relative to the root queried class.

Figure 39:
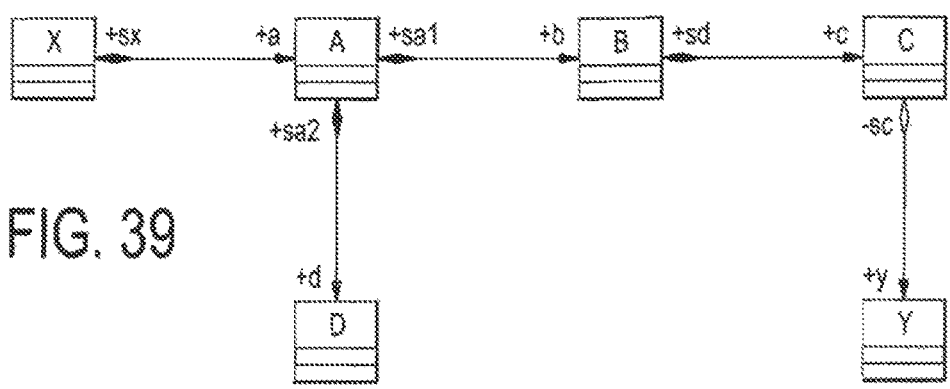
FIG. 39 is a UML diagram illustration of another search query.

Consider the UML in FIG. 39. Suppose for example, that the queried keys are:

[+, a.b. c.y.+]

In this case, security criteria should be added for class X and class Y (A, B and C have composition relations with X). Suppose that the security criterion for Y is:

sc. sb. sal. d. id==1000 We can not add this criterion as is because it is not expressed in terms of the keys of X, and so it should be translated. The simplest way to translate it is to add a prefix to the keys of the criteria as follows:

a. b.c.y. sc. sb. sal. d. id=1000

The drawback of this approach is that it may require a considerable number of join operations at the data store level, because each "dot" in a composite key represents a join operation, hi the previous example, the composite key "a.b.c.y.sc.sb.sal.d.id" can be reduced to the following key: "a.d.id". This can be done only when the relations are one-to-one relations. Table 25 illustrates the algorithm that generates a reduced composite key:

TABLE 25

Algorithm for generating a reduced composite key-

```
String concat (String key1. String key2 ) {
  (symmetric (key1) equals first (key2) ) {
  return concat (prefix (key1) , rest(key2)
} else {
return key1 + + ke 2 ;
}
``` q. The Keys Expander

Since the criterion expander needs to know all the queried keys in order to build the security criteria, the keys must be expanded before expanding the criteria, meaning that the queried keys must not contain the two used "wild cards" (i.e. and '+'). Instead, these characters must be replaced with the keys they represent, and this is the intended purpose of the keys expander.

In addition, expanding the keys is necessary for the later transforming stage.

Figure 40:
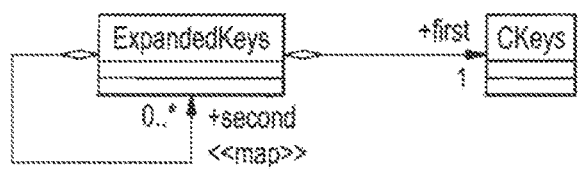
FIG. 40 is a UML class diagram illustration of expanded key structure.

However, since one-to-n keys are queried after one-to-one keys, the two types of keys must be separated. So, the keys expander does not generate a Keys structure. Instead, it generated a special structure that contains a number of split Keys structures. Each one of these Keys structures are queried in a different atomic query. This structure is illustrated in the UML class in FIG. 40.

The keys referred to by the "first" relation are the keys to be retrieved in the next atomic query, whereas the "second" relation refers to the groups of keys to be retrieved in later atomic queries. The values retrieved by these queries have one-to-n relations with the values assembled from the "first" retrieved keys. The keys to these one-to-n relations are the keys of the map of the "second" relation. In fact, this structure has the same tree-like structure of the CKeys structure it encapsulates, but it serves the purpose of splitting the CKeys structure at the keys that represent one-to-n relations.

The method that handles one-to-n relations in the Select Executer actually traverses the Expanded Keys structure recursively and performs the necessary atomic queries at each recursion level.

Though expanding keys is an early process performed by the Select Adapter, but since it depends only on meta-data, not on user data, it may be a cache-aware processor.

r. The Keys Collector

It will be shown later that the data store needs to know all the tables involved in a query, and how these tables are joked. In order to specify these tables all the keys present in a query must be collected.

The Keys Collector performs this task. It traverses a number of structures present in a select context (i.e. the queried keys, the group functions, the order keys and the criteria) and collects the keys in these structures. The output of this processor is a single Keys structure that contains all the collected keys.

The keys collector does not belong to the adapting stage. It does not belong to the transforming stage either, because it does not generate any data store structure. However, since keys collection must follow the adapting process, it may be a cache-aware processor, s. The Assembler This processor is responsible for creating Value objects out of the record list provided by the Data Store Service layer.

It iterates over this list of Record instances and creates The Value depending on the required keys expanded by the KeysExpander. In case of Find operations that require relations to be fetched the assembler scans this list more than one time in order to create the instances of these relations.

Assembling values can be an expensive step depending on the size of the value (number of fields to be set), hi order to optimize this essential step Palmyra framework uses the multithreading aspect to make the assembling step works concurrently.

Not all types of find operations can use multithreaded assembler, so, the assembler decides whether to run its work in parallel or not depending on the keys to be assembled.

t. Collecting One-to-N Keys in Criteria

Consider the following PQL statement:

select + from Country where city. opulation>1000000

Since the relation "city" is a one-to-n relation, each country tire previous query returns has at least one city that meets the search criteria. The equivalent SQL statement would be: select T.* from Country T join City T_city on T.pk=T_city. country$pk where T_city. opulation>1000000

The problem arises when we query fields from the city relation. For instance, consider the following PQL statement:

select +, city.+ from Country where city.population>1000000

This query is performed through two SQL statements. The first of which is the same SQL statement shown previously. If we follow the same steps performed by the Select Executor, the query would be":

select T.pk, T_city.* from Country T join City T_city on T.pk=T_city. country$pk where T_city.population>1000000

However, for each retrieved country this query will retrieve only those cities whose population is greater than 1000000. Synchronizing such countries later would cause the cities whose population is less than or equal to 1000000 to be deleted, and this is not the intended behavior.

The solution is to perform the following SQL statement instead:

select distinct T.pk, T_city.* from Country T join City T_city on T.pk=T_city.country$pk join City C_city on T.pk=C_city.country$pk where C_city.population>1000000

In this query, we join the City table to the Country table twice giving two different aliases to the City table. The fields of the City table are retrieved from the first alias, while the condition is specified in terms of the second alias. The "distinct" keyword is used to avoid retrieving multiple copies of each city.

Since one-to-n keys in criteria are given different aliases they must be marked by the Keys Collector so that the transformer generates the appropriate table joins.

u. The Select Transformer

The Select Transformer is invoked by the Select Executer each time the latter wants to generate a data store query. So, the Select Transformer transforms an atomic query (whose attributes are available in the context) to a data store query.

The implementation of the Select Transformer contains a sequence of invocations to other processors, or transformers. These processors transform the structures in the context to their data store counterparts as follows:

Queried/Needed Keys→Data Store Meta Record (queried fields)
  Queried Class+Collected Keys→Data Store Table Structure
  Criterion Data Store Condition
  Group Functions→Data Store Functions (sum, max, min . . . etc.)
  Group Fields (Order Fields)—Data Store Order Record
  Order Fields→Data Store Order Record The Select Transformer performs relatively. eavy operations, and so, it must be a cache-aware processor.

v. The Key Transformer

Each key in an atomic query, whether present in the queried keys or the search criteria or any other structure, should be transformed to a data store field. A data store field is a composite key whose prefix represents the table alias in which the field exists, and whose suffix is the name of the field. Since all transformers need to do such transformation of keys, this common operation should be carried out by another object that is shared by all the transformers. This object is the Key Transformer.

Some keys may appear more than once in an atomic query and in different structures. So, the key transformer might be invoked to transform the same key a number of times. To reduce the cost of such repetitive transformations, the key transformer must maintain an internal map of the transformed keys.

This means that the key transformer is a state-full object that cannot be reused in a different operation. However, the key transformer may be cached to be used later if the same query is performed again. So, the key transformer must be passed to the transformers in the context. The transformer must conform to the following rules:

(1) Relations, whether composite or simple, generate table aliases only.

(2) Keys, whether composite or simple, that represent simple attributes, generate complete data store fields (i.e. alias+field name).

(3) Identical relations or keys generate the same aliases and data store fields.

(4) Two different relations can never generate the same alias.

(5) Two different keys can never generate the same data store field, but they may generate the same alias, provided that their prefixes are identical, and that their suffixes represent simple attributes that are declared in the same class.

(6) The keys that are marked as one-to-n keys in criteria are a distinct group of keys. Transforming such keys should not generate the same aliases generated by the other keys. However, transformations in this group alone conform to the previous rules.

The Keys Transformer transforms the expanded queried keys to a meta-record of queried data store fields. The transformation is straight forward, because it only iterates over the leaf keys and invokes the key transformer for each key.

Figure 41A:
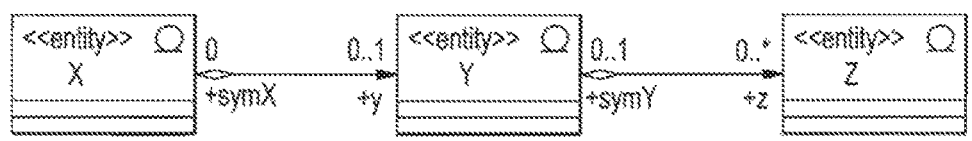
FIG. 41A is a UML class diagram illustration of a PQL query.
Figure 41B:
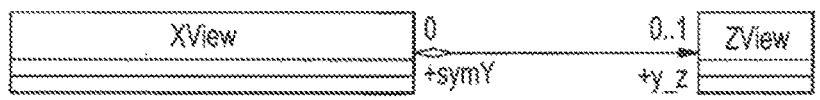
FIG. 41B is a UML class diagram illustration of a reduced PQL query.
Figure 41C:
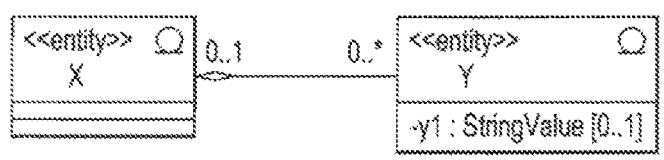
FIG. 41C is a UML class diagram illustration of a one to n relation.

For instance, consider the UML diagrams in FIGS. 41A and 41B; consider also the following PQL statement:

select +, y.+, y. ζ•.+ from 'where pk>1000

This query would be performed through executing one SQL query:

XView is a view on X and Y, whereas ZView is a view on Z. In this scenario, since no instances of class Y will be assembled, there would be no use of retrieving the primary key of Y. Instead, the primary key of X (or XView) should be retrieved, and the second query would be as follows:

select distinct T.pk, T_yz.* froan X T left Join Y T_y on T.y$pk=T_y.pk join Z T_y_2 on T_y.pk=T_y_z.symY$pk where T.pk>1000

This change was made because, by the time the second query is executed, the cache of assembled values will contain instances of class XView only, and the keys to these instances will be the primary keys of X.

In fact, it is the Select Executer's responsibility to determine the implicit keys to be added, because it is the processor that recursively iterates the one-to-n keys to be retrieved, and therefore it is the only processor that knows the primary key of the previous recursive level, w.

The Table Builder

The Table Builder builds the table structure that specifies how tables should be joined and the aliases to be given to these tables. To build this structure, the Table Builder traverses all the collected keys recursively, because the collected keys contain all the keys present in a query. The Table Builder uses the Key Transformer to determine the aliases of the tables.

Figure 46:
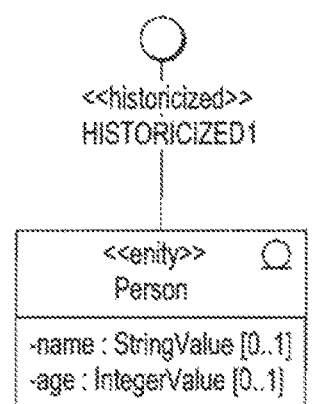
FIG. 46 is an exemplary UML diagram illustration of how to use the interface historicized.

Tables are joined as follows:
(1) Relation joins: Each relation is transformed to a join between the two tables of the two related classes.
(2) Generalization joins: Tables of super-classes are joined to the tables of their sub-classes.
(3) Conditions of relation joins are retrieved from the meta-data of the field that represents the relation.
(4) Conditions of the generalization joins are: T1,pk=T2.pk, where T1 is the alias of the table of the super-class, and T2 is the alias of the table of the subclass.
(5) Joins of non-mandatory relations are left-join. And joins of mandatory relations or generalization are inner-join 2. History Service in Palmyra Palmyra framework provides the possibility to keep images on the types instances each time they are changed ha order to do so, the type must implement an interface of type Historicized. Refer to FIG. 46.

For each Historicized type, the Persistence layer creates another table—along with its original one—in order to saves the images of that type instances. The table name is suffixed by the term: History_.

Note that this table contains the column pk_but it's not unique since images of the same instance have the pk of the, instance itself. A unique constraint is added on this table over the columns (pk_, creationDate_) and the History table has the same columns of the original table.

The images are saved in History table each time the instance is created, modified or deleted. An exception can be done using an interface of type HistoricizedOriDelete, which makes the system save an image only in deletion operations.

Saving an image is done with filling the column creationDate by the exact time of the synchronization event and the updateDate column by the value Long.max.

When another image has to be saved, the last image updateDate value will take the current synchronization date just like the new image's creationDate column and so on.

| Pk | name | age | CreationDate | UpdateDate |
|----|------|-----|--------------|------------|
| 10 | Alain | 20 | Aug. 8, 2008 | Sep. 8, 2008 |
| 10 | Alain | 25 | Sep. 8, 2008 | Oct. 8, 2008 |
| 10 | Alain | 30 | Oct. 8, 2008 | Nov. 8, 2008 |
| 10 | Alain | 35 | Nov. 8, 2008 | Long.Max |

Example

If it's required to get the images of a Person instance where pk=10 between the dates 8 Aug. 2009 and 11 Aug. 2009, then the system will execute a query like:

```
Select name, age_ from PersonHistory_ where creationDate_ <=
11/08/2008
and updateDate >= 08/08/2008
```

3. Find Operations with Massive Results Palmyra Framework is Safe Capable to Execute Find Operations that May Return Massive Results. Retrieving Big Volumes May Cause Memory Problem.

The used technique is to bring the pks of the required instances in a find operation on the column pk of the concerned table using the passed criteria, then, when some date of the result is to be iterated, the system fetched a result page using a sub list of the obtained pks.

Paged find operations is done using the class LazyPageByPageCollection. This class offers to the possibility to access the result sequentially and randomly.

Sequential access is clone by obtaining a special iterator using the method:
public Iterator iterator ( )

Random access is done by setting the page number to be obtained, then accessing it using the methods:
public void setPageNumber (int pageNumber)
and
public CollectionValue getCurrentCollection ( )

a. Synchronize Actions

To synchronize a value, the entity manager invokes the appropriate "ProcessBxecuter" depending in the action type (delete, insert, or update). All the values manipulated in Palmyra are of type Deep Map. So for tots reason the ProcessExecuter checks the integrity and the rights and calls the Traverser that traverses all the object's relations and invokes the appropriate Mapper.

b. ProcessExecuter

Figure 42:
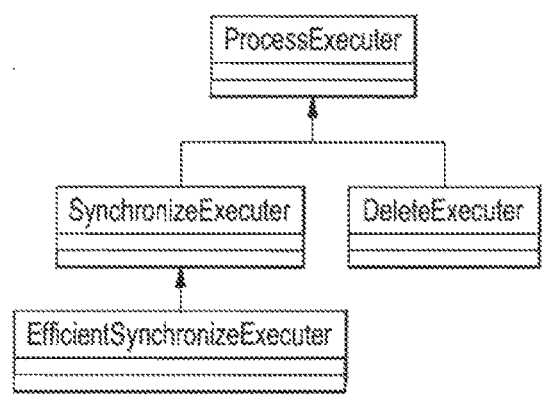
FIG. 42 is a UML diagram illustration of the Design Model of the ProcessExecuter.

The Design Model of the ProcessExecuter is given in the UML in FIG. 42.

The super class of all synchronization actions is the class "ProcessBxecuter". The treatment of a delete action is different from the two other actions (insert and update). For this reason, we have the 2 Sub-Classes "SynchronizeExecuter" and "DeleteBxecuter".

c. Traverser

Figure 43:
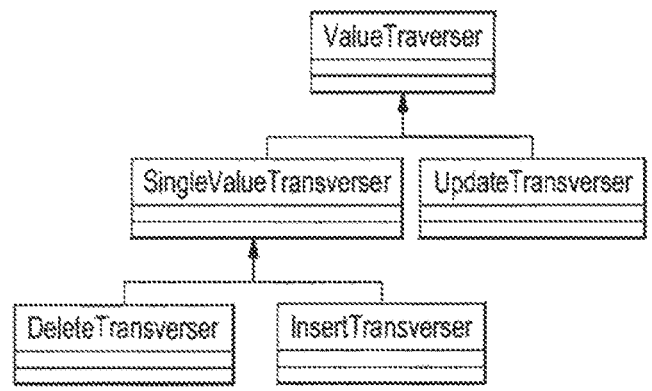
FIG. 43 is a UML diagram illustration of the Design Model of the Traverser.

The Design Model of the Traverser is given in the TJML diagram in FIG. 43.

There are two types of traversers:
(1) SingleTraverser. traverses a single value and executes the actions on this value. The singleTraverser has two Sub-Classes: DeleteTraverser and InsertTraverser. (2) UpdateTraverser traverses two values. The old value witch is obtained from database and the new one witch, is modified by the user.

d. Mapper

Figure 44:
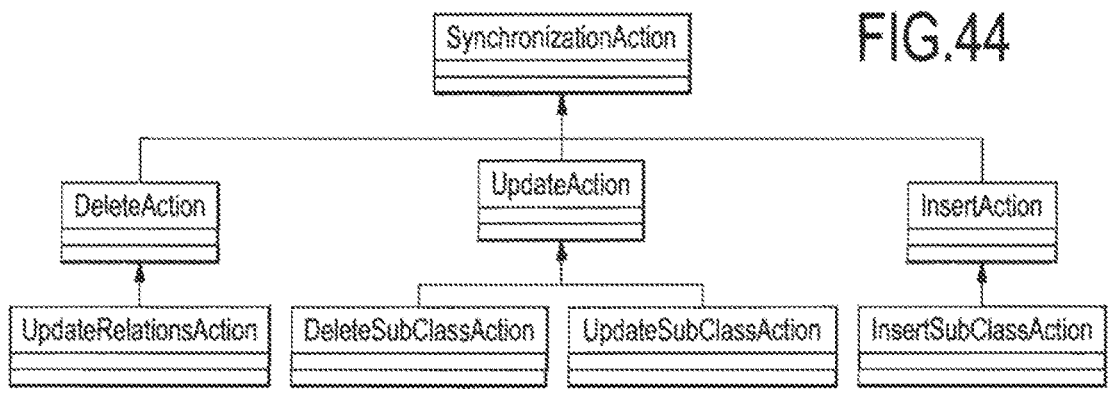
FIG. 44 is an exemplary UML diagram illustration of the design model of the Mapper.

The design model of the Mapper is given in the UML diagram in FIG. 44. The final action to execute in the Database is a delete, insert, or update action. For this reason we have these three classes: the DeleteAction class, the UpdateAction class, and the InsertAction class.

The super class of all synchronization actions is the class Synchroni2arionAction.

4. Persistence Layer Listeners

Persistence layer provides the possibility to interfere the find, assembling, saving and deletion operations.

Search listener In order to operate a listener for a search operation the programmer must implement the interface SearchListener and register the implementer in the Classe of the concerned search type. This listener is invoked before starting the analysis of the required find operation. Its typically used to change the passed criteria:

```
public interface SearchListener extends Serializable {
    public void onSearch (SearchContext context,
    SuperSearchListener listener) throws ServiceException;
}
```

Assemble Listener: just like the previous listener, the programmer must implement the interface AssembleListener and register the implementer:

```
public interface AssembleListener extends Serializable {
    public void onAssemble (AssembleContext context,
    SuperAssembleListener superListener) throws ServiceException;
}
```

For Synchronize operations, the programmer must implement the interface SynchronizeListener and register the implementer to be invoked in one or more of the following situations:
Before insert.
After insert success.
After insert failure.
Before update.
After update success.
After update failure.

```
public interface SynchronizeListener extends Serializable {
    public void onSynchronize (SynchronizeContext context,
    SuperSynchronizeListener superListener) throws ServiceException;
}
```

Note that the registration uses the persistence driver obtained using the BSFactory.getPersistenceDriverO;

Note: Since the registration is done in the runtime, then, the programmer has the control on the situations of when the listener must act using the conditional clauses.

Invocation of these listeners is accumulative, which means that Persistence layer invokes—beside the concerned type listener—all the listeners registered for the interfaces implemented by the concerned type. Collecting these listeners takes place using a listener adapter that groups all the listeners that must be invoked for the concerned type.
The listener adapters are cached so that Persistence layer shouldn't recalculate them each time they are required.

a. Database Connection Service

The persistence layer is based on a database connection service which communicates directly with the database via JDBC. In order to optimize the performance database, vendors usually provide specific drivers that support better their products. Having a database connection service separated from the entity manager enables using the right driver for each provider without making any modifications in the persistence layer.

These and other advantages of the preferred embodiment will be apparent to those skilled in the art from the foregoing specification. Accordingly, it will be recognized by those skilled in the art that changes or modifications may be made to the above described embodiments without departing from the broad inventive concepts of the invention. It should therefore be understood that this invention is not limited to the particular embodiments described herein, but is rather intended to include all changes and modifications that are within the scope and spirit of the invention.

This layer is responsible for dealing with different RDBMS which are for the moment Oracle, MySql, MS SqlServer and DB2.

Date Store layer, just like the Persistence layer, uses the Context pattern. Beside that, this layer uses the polymorphism extensively in order to establish a dialect for each KDBMS.

Data Store layer deals with DBMS using the standard SQL specification, but, in some cases, some deviation may occur caused by the differences between the standard SQL and the vendor specific one.

Figure 45:
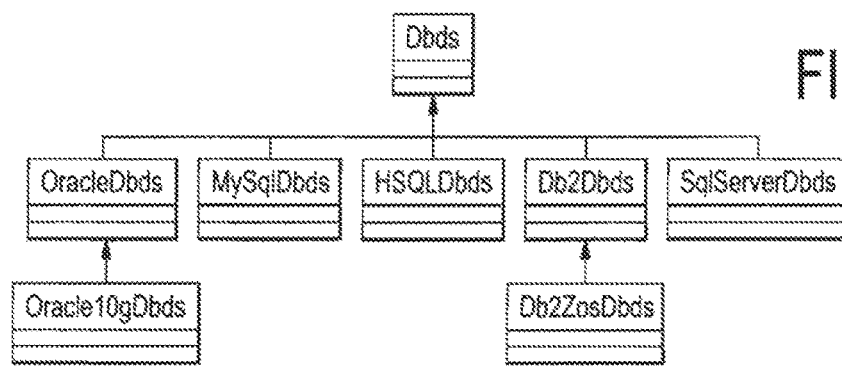
FIG. 45 is an exemplary UML diagram illustration of the design model of the DBDS vendor specific subclasses.

The default class that manages the communication with the RDBMS is Dbds, and for the deviations mentioned above, Palmyra framework made sub classes of this main class. Refer to the FIG. 45.

Dealing with KDBMS is done in Data Store layer using procedures, a procedure can do a whole operation by itself or it may invoke some other procedures to get the job done.

The class Dbds provides access to the different procedures which are responsible for executing the operations transformed from the Persistence layer. The polymorphism clearly appears when a sub class of Dbds overrides some procedure getter in order to provide the RDBMS suitable one.

All Data Store procedures implement the interface: Procedure.

```
public interface Procedure {
    /**
    * This method executes the operation represented by this
    Procedure object.
    * It takes its input from the specified context parameter,
    and writes.
    * Its output to the same context parameter.
    * @param context Context The state, input, and output of
    the Procedure
    * object.
    */
    public void execute (Context context) throws
    DataStoreException;
}
```

Example

In MySql, in order to obtain the row number, SQL statement should use the expression: @rn instead of rownum which is used in Oracle, this means that the procedure responsible for insert-from-select statements must be vendor specific, hence, the method that returns this type of procedure in Dbds is overridden in the related RDBMS Dbds class.

In Dbds:

```
public SqlExec getVolumeInsertSqlExec ( ) {
    return VolumeSqlExec.getVolumeSqlExec ( );
}
```

LaMySqlDbds:

```
public SclExec getVolumeInsertSqlExec ( ) {
    return
    MySqlVolumeInsertSqlExec.mySqlVolumeInsertSqlExec ( );
}
```

These and other advantages of the preferred embodiment will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the appended claims.

What is claimed is:

1. A method for generating a software application using a computer system, comprising the steps of:
   modeling business processes in a graphical modeling design tool, the graphical modeling and design tool being a layer that sits on top of a unified model language (UML) visual modeling tool;
   creating a UML model by using tagged values in a data model to define an exclusive dependency between a current field and another field in a same entity type of the data model or in another entity type of the data model with a relation;
   validating the UML model; and,
   generating code automatically by:
      converting the UML model into an XML file;
      using the XML file to generate Java source code; and
      compiling the generated Java source code using a compiler and creating at least one Java Archive (JAR) file.

2. The method of claim 1, further comprising determining whether the UML model conforms to pre-defined rules of the graphical modeling and design tool.

3. The method of claim 2, wherein the determining whether the UML model conforms to pre-defined rules further comprises validating initial values, multiplicities, and/or types.

4. The method of claim 1, further comprising transforming the validated UML model into metadata.

5. The method of claim 4, further comprising using the metadata to generate functional and non-functional aspects of the software application.

6. The method of claim 4, wherein related elements of the graphical modeling and design tool are added to the metadata.

7. The method of claim 1, further comprising generating a trace in a specific file to analyze tasks performed and/or to log technical problems.

8. The method of claim 7, further comprising determining a location, a size, and a name of a file to be generated to store the trace.

* * * * *